United States Patent
Holzer et al.

(10) Patent No.: US 11,605,151 B2
(45) Date of Patent: Mar. 14, 2023

(54) VEHICLE UNDERCARRIAGE IMAGING

(71) Applicant: Fyusion, Inc., San Francisco, CA (US)

(72) Inventors: Stefan Johannes Josef Holzer, San Mateo, CA (US); Krunal Ketan Chande, San Francisco, CA (US); Matteo Munaro, San Francisco, CA (US); Pavel Hanchar, Minsk (BY); Aidas Liaudanskas, San Francisco, CA (US); Wook Yeon Hwang, San Francisco, CA (US); Blake McConnell, San Francisco, CA (US); Johan Nordin, San Francisco, CA (US); Milos Vlaski, San Francisco, CA (US); Martin Markus Hubert Wawro, Dortmund (DE); Nick Stetco, San Francisco, CA (US); Martin Saelzle, San Francisco, CA (US)

(73) Assignee: Fyusion, Inc., San Francisco, CA (US)

(*) Notice: Subject to any disclaimer, the term of this patent is extended or adjusted under 35 U.S.C. 154(b) by 0 days.

(21) Appl. No.: 17/190,268

(22) Filed: Mar. 2, 2021

(65) Prior Publication Data

US 2022/0284544 A1 Sep. 8, 2022

(51) Int. Cl.
*G06T 3/40* (2006.01)
*G06T 7/50* (2017.01)
*G06T 7/00* (2017.01)

(52) U.S. Cl.
CPC .......... *G06T 3/4038* (2013.01); *G06T 7/0004* (2013.01); *G06T 7/50* (2017.01); *G06T 2207/10028* (2013.01); *G06T 2207/20221* (2013.01); *G06T 2207/30252* (2013.01)

(58) Field of Classification Search
CPC ....... G06T 3/4038; G06T 7/50; G06T 7/0004; G06T 2207/10028
See application file for complete search history.

(56) References Cited

U.S. PATENT DOCUMENTS

| 5,764,306 A | 6/1998 | Steffano |
| 5,923,380 A | 7/1999 | Yang |
| 6,067,369 A | 5/2000 | Kamei |
| 6,453,069 B1 | 9/2002 | Matsugu |

(Continued)

FOREIGN PATENT DOCUMENTS

| GB | 2573170 A | 10/2019 |
| WO | 2016064921 A1 | 4/2016 |

(Continued)

OTHER PUBLICATIONS

Office Action (Notice of Allowance and Fees Due (PTOL-85)) dated Apr. 7, 2022 for U.S. Appl. No. 17/215,596 (pp. 1-9).

(Continued)

*Primary Examiner* — Myron Wyche
(74) *Attorney, Agent, or Firm* — Kwan & Olynick LLP

(57) ABSTRACT

Images of an undercarriage of a vehicle may be captured via one or more cameras. A point cloud may be determined based on the images. The point cloud may includes points positioned in a virtual three-dimensional space. A stitched image may be determined based on the point cloud by projecting the point cloud onto a virtual camera view. The stitched image may be stored on a storage device.

18 Claims, 55 Drawing Sheets
(30 of 55 Drawing Sheet(s) Filed in Color)

(56) References Cited

U.S. PATENT DOCUMENTS

| | | |
|---|---|---|
| 6,788,309 B1 | 9/2004 | Swan |
| 6,856,344 B2 | 2/2005 | Franz |
| 6,879,956 B1 | 4/2005 | Honda |
| 6,912,313 B2 | 6/2005 | Li |
| 7,249,019 B2 | 7/2007 | Culy |
| 7,292,257 B2 | 11/2007 | Kang |
| 7,565,004 B2 | 7/2009 | Hashimoto |
| 7,949,529 B2 | 5/2011 | Weider |
| 9,182,229 B2 | 11/2015 | Grässer |
| 9,218,698 B2 | 12/2015 | Ricci |
| 9,467,750 B2 | 10/2016 | Banica |
| 9,495,764 B1 | 11/2016 | Boardman |
| 9,886,636 B2 | 2/2018 | Zhang |
| 9,886,771 B1 | 2/2018 | Chen |
| 10,319,094 B1 | 6/2019 | Chen |
| 10,373,387 B1 | 8/2019 | Fields |
| 10,573,012 B1 | 2/2020 | Collins |
| 10,636,148 B1 | 4/2020 | Chen |
| 10,657,647 B1 | 5/2020 | Chen |
| 10,698,558 B2 * | 6/2020 | Holzer .................. G06V 20/10 |
| 10,893,213 B2 | 1/2021 | Magnuszewski et al. |
| 11,004,188 B2 | 5/2021 | Holzer |
| 2002/0063714 A1 | 5/2002 | Haas |
| 2002/0198713 A1 | 12/2002 | Franz |
| 2004/0258306 A1 | 12/2004 | Hashimoto |
| 2007/0253618 A1 | 11/2007 | Kim |
| 2008/0101656 A1 | 5/2008 | Barnes |
| 2008/0180436 A1 | 7/2008 | Kraver |
| 2009/0289957 A1 | 11/2009 | Sroka |
| 2010/0111370 A1 | 5/2010 | Black |
| 2010/0251101 A1 | 9/2010 | Haussecker |
| 2011/0218825 A1 | 9/2011 | Hertenstein |
| 2013/0297353 A1 | 11/2013 | Strange |
| 2014/0119604 A1 | 5/2014 | Mai |
| 2014/0172245 A1 | 6/2014 | Soles |
| 2015/0029304 A1 | 1/2015 | Park |
| 2015/0097931 A1 | 4/2015 | Hatzilias |
| 2015/0103170 A1 | 4/2015 | Nelson |
| 2015/0125049 A1 | 5/2015 | Taigman |
| 2015/0278987 A1 | 10/2015 | Mihara |
| 2015/0317527 A1 | 11/2015 | Graumann |
| 2015/0347845 A1 | 12/2015 | Benson |
| 2015/0365661 A1 | 12/2015 | Hayashi |
| 2016/0035096 A1 | 2/2016 | Rudow |
| 2017/0109930 A1 | 4/2017 | Holzer |
| 2017/0199647 A1 | 7/2017 | Richman |
| 2017/0208246 A1 | 7/2017 | Kimura |
| 2017/0277363 A1 | 9/2017 | Holzer |
| 2017/0293894 A1 | 10/2017 | Taliwal |
| 2018/0027178 A1 | 1/2018 | Macmillan |
| 2018/0160102 A1 | 6/2018 | Luo |
| 2018/0190017 A1 | 7/2018 | Mendez |
| 2018/0225858 A1 | 8/2018 | Jie |
| 2018/0260793 A1 | 9/2018 | Li |
| 2018/0293552 A1 | 10/2018 | Zhang |
| 2018/0315260 A1 | 11/2018 | Anthony |
| 2018/0322623 A1 | 11/2018 | Memo |
| 2018/0338126 A1 | 11/2018 | Trevor |
| 2018/0349746 A1 | 12/2018 | Vallespi-Gonzalez |
| 2019/0012394 A1 | 1/2019 | Endras |
| 2019/0035165 A1 | 1/2019 | Gausebeck |
| 2019/0073641 A1 | 3/2019 | Utke |
| 2019/0098277 A1 | 3/2019 | Takama |
| 2019/0116322 A1 | 4/2019 | Holzer |
| 2019/0147221 A1 | 5/2019 | Grabner |
| 2019/0147583 A1 | 5/2019 | Stefan |
| 2019/0164301 A1 | 5/2019 | Kim |
| 2019/0189007 A1 | 6/2019 | Herman |
| 2019/0196698 A1 | 6/2019 | Cohen |
| 2019/0197196 A1 | 6/2019 | Yang |
| 2019/0205086 A1 | 7/2019 | Mcnulty |
| 2019/0317519 A1 | 10/2019 | Chen |
| 2019/0318759 A1 | 10/2019 | Doshi |
| 2019/0335156 A1 | 10/2019 | Rusu |
| 2019/0349571 A1 * | 11/2019 | Herman ................ H04N 5/247 |
| 2019/0392569 A1 * | 12/2019 | Finch ..................... G06T 19/20 |
| 2020/0111201 A1 | 4/2020 | Kuruvilla |
| 2020/0118342 A1 * | 4/2020 | Varshney ............... G06T 13/20 |
| 2020/0151860 A1 | 5/2020 | Safdarnejad |
| 2020/0231286 A1 | 7/2020 | Movsesian |
| 2020/0233892 A1 | 7/2020 | Calhoun |
| 2020/0234397 A1 | 7/2020 | Holzer |
| 2020/0234398 A1 | 7/2020 | Holzer |
| 2020/0234424 A1 | 7/2020 | Holzer |
| 2020/0234451 A1 | 7/2020 | Holzer |
| 2020/0234488 A1 | 7/2020 | Holzer |
| 2020/0236296 A1 | 7/2020 | Holzer |
| 2020/0236343 A1 | 7/2020 | Holzer |
| 2020/0257862 A1 | 8/2020 | Kar |
| 2020/0258309 A1 | 8/2020 | Holzer |
| 2020/0312028 A1 * | 10/2020 | Charvat ................. G05D 1/101 |
| 2020/0322546 A1 * | 10/2020 | Carolus ................ H04N 5/2254 |
| 2020/0349757 A1 | 11/2020 | Holzer |

FOREIGN PATENT DOCUMENTS

| | | | | |
|---|---|---|---|---|
| WO | 2017115149 A1 | | 7/2017 | |
| WO | 2017195228 A1 | | 11/2017 | |
| WO | WO2019229912 | * | 12/2019 | ............. G02B 21/36 |
| WO | 2020009948 A1 | | 1/2020 | |
| WO | WO2020125726 | * | 6/2020 | ....... B64C 2201/027 |
| WO | 2020154096 A1 | | 7/2020 | |

OTHER PUBLICATIONS

Office Action (Notice of Allowance and Fees Due (PTOL-85)) dated Sep. 15, 2021 for U.S. Appl. No. 16/518,570 (pp. 1-8).

Office Action dated Jul. 16, 2021 for U.S. Appl. No. 16/518,501 (pp. 1-23).

Office Action dated Jul. 26, 2021 for U.S. Appl. No. 16/518,558 (pp. 1-17).

Office Action dated Jun. 14, 2021 for U.S. Appl. No. 16/518,570 (pp. 1-24).

Office Action dated May 18, 2021 for U.S. Appl. No. 16/692,219 (pp. 1-13).

Riza Alp Guler et al., "DensePose: Dense Human Pose Estimation In The Wild", arXiv:1802.00434v1 [cs.CV] Feb. 1, 2018, 12 pages.

Shubham Tulsiani and Jitendra Malik, "Viewpoints and Keypoints", arXiv:1411.6067v2 [cs.CV] Apr. 26, 2015, 10 pages.

Wenhao Lu, et al., "Parsing Semantic Parts of Cars Using Graphical Models and Segment Appearance Consistency", arXiv:1406.2375v2 [cs.CV] Jun. 11, 2014, 12 pages.

Alberto Chavez-Aragon, et al., "Vision-Based Detection and Labelling of Multiple Vehicle Parts", 2011 14th International IEEE Conference on Intelligent Transportation Systems Washington, DC, USA. Oct. 5-7, 2011, 6 pages.

U.S. Appl. No. 16/518,501, CTFR—Final Rejection, dated Dec. 9, 2020, 16 pgs.

U.S. Appl. No. 16/518,501, Examiner Interview Summary Record (PTOL-413), dated Nov. 23, 2020, 2 pgs.

U.S. Appl. No. 16/518,501, Non-Final Rejection, dated Sep. 1, 2020, 15 pgs.

U.S. Appl. No. 16/518,512, Examiner Interview Summary Record (PTOL-413), dated Nov. 19, 2020, 3 pgs.

U.S. Appl. No. 16/518,512, Non-Final Rejection, dated Oct. 1, 2020, 24 pgs.

U.S. Appl. No. 16/518,512, Office Action Appendix, dated Nov. 19, 2020, 1 pg.

U.S. Appl. No. 16/518,558, Non-Final Rejection, dated Sep. 8, 2020, 14 pgs.

U.S. Appl. No. 16/518,585, Non-Final Rejection, dated Sep. 3, 2020, 13 pgs.

U.S. Appl. No. 16/596,516, Non-Final Rejection, dated Jun. 23, 2020, 37 pgs.

U.S. Appl. No. 16/596,516, Notice Of Allowance And Fees Due (PTOL-85), dated Sep. 21, 2020, 10 pgs.

U.S. Appl. No. 16/692,133, Non-Final Rejection, dated Jul. 24, 2020, 17 pgs.

(56) References Cited

OTHER PUBLICATIONS

U.S. Appl. No. 16/692,170, Non-Final Rejection, dated Nov. 20, 2020, 13 pgs.
U.S. Appl. No. 16/692,219, Non-Final Rejection, dated Dec. 8, 2020, 9 pgs.
U.S. Appl. No. 16/861,100, Non-Final Rejection, dated Oct. 8, 2020, 11 pgs.
U.S. Appl. No. 16/518,512, Notice of Allowance dated Jan. 25, 2021, 7 pgs.
U.S. Appl. No. 16/518,512, Notice of Allowance dated Dec. 16, 2020, 9 pgs.
U.S. Appl. No. 16/518,558, Examiner Interview Summary dated Dec. 16, 2020, 1 pg.
U.S. Appl. No. 16/518,558, Final Office Action dated Dec. 16, 2020, 16 pgs.
U.S. Appl. No. 16/518,570, Non-Final Office Action dated Jan. 6, 2021, 17 pgs.
U.S. Appl. No. 16/518,585, Notice of Allowance dated Dec. 14, 2020, 5 pgs.
U.S. Appl. No. 16/692,133, Notice of Allowance dated Dec. 15, 2020, 7pgs.
U.S. Appl. No. 16/692,170, Notice of Allowance dated Feb. 9, 2021, 8 pgs.
U.S. Appl. No. 16/861,100, Advisory Action dated Jun. 10, 2021, 3 pgs.
U.S. Appl. No. 16/861,100, Examiner Interview Summary dated Feb. 10, 2021, 2 pgs.
U.S. Appl. No. 16/861,100, Examiner Interview Summary dated Jun. 10, 2021, 1 pg.
U.S. Appl. No. 16/861,100, Examiner Interview Summary dated Jun. 3, 2021, 2 pgs.
U.S. Appl. No. 16/861,100, Final Office Action dated Feb. 26, 2021, 15 pgs.
Gerd Lindner et al., "Structure-Preserving Sparsification of Social Networks", arXiv:1505.00564vl [cs.SI] May 4, 2015, 8 pages.
Int'l Application Serial No. PCT/US20/12592, Int'l Search Report and Written Opinion dated Apr. 21, 2020. 9 pages.
International Search Report and Written Opinion for App. No. PCT/US2021/013431, dated May 6, 2021, 10 pages.
International Search Report and Written Opinion for App. No. PCT/US2021/013471, dated May 6, 2021, 10 pages.
International Search Report and Written Opinion for App. No. PCT/US2021/013472, dated May 11, 2021, 10 pages.
Jeff Donahue et al., "DeCAF: ADeep Convolutional Activation Feature for Generic Visual Recognition", arXiv: 1310.153vl [cs. CV] Oct. 6, 2013, 10 pages.
Office Action (Final Rejection) dated Jan. 19, 2022 for U.S. Appl. No. 16/861,097 (pp. 1-16).
Office Action (Final Rejection) dated Jan. 19, 2022 for U.S. Appl. No. 16/861,100 (pp. 1-19).
Office Action (Final Rejection) dated Jan. 20, 2022 for U.S. Appl. No. 17/215,596 (pp. 1-16).
Office Action (Final Rejection) dated Mar. 3, 2022 for U.S. Appl. No. 17/174,250 (pp. 1-24).
Office Action (Final Rejection) dated Apr. 19, 2022 for U.S. Appl. No. 16/692,219 (pp. 1-13).
Office Action (Final Rejection) dated Nov. 9, 2021 for U.S. Appl. No. 16/518,558 (pp. 1-17).
Office Action (Final Rejection) dated Dec. 7, 2021 for U.S. Appl. No. 16/518,501 (pp. 1-21).
Office Action (Final Rejection) dated Jun. 14, 2021 for U.S. Appl. No. 16/518,570 (pp. 1-23).
Office Action (Non-Final Rejection) dated Mar. 28, 2022 for U.S. Appl. No. 16/518,501 (pp. 1-21).
Office Action (Non-Final Rejection) dated Mar. 29, 2022 for U.S. Appl. No. 16/518,558 (pp. 1-16).
Office Action (Non-Final Rejection) dated Apr. 14, 2022 for U.S. Appl. No. 17/144,879 (pp. 1-12).
Office Action (Non-Final Rejection) dated Sep. 2, 2021 for U.S. Appl. No. 17/174,250 (pp. 1-22).
Office Action (Non-Final Rejection) dated Sep. 20, 2021 for U.S. Appl. No. 16/861,100 (pp. 1-19).
Office Action (Non-Final Rejection) dated Sep. 24, 2021 for U.S. Appl. No. 17/215,596 (pp. 1-14).
Office Action (Non-Final Rejection) dated Oct. 4, 2021 for U.S. Appl. No. 16/861,097 (pp. 1-15).
Office Action (Non-Final Rejection) dated Dec. 7, 2021 for U.S. Appl. No. 16/692,219 (pp. 1-12).
IVUS Intelligent Vehicle Undercarriage Scanner Brochusre, GatekeeperSecurity.com, 2 pages.
Green, et al., "Vehicle Underscarriage Scanning for use in Crash Reconstruction," FARO White Paper, 2015, 5 pages.
Kiong, Frederick Chong Chuen, "Vehicle Undercarriage Scanning System," A disseration for ENG 4111 and ENG 4112 Research Project, University of Southern Queensland (USQ), Oct. 27, 2005, 163 pages.
Giegerich, et al., "Automated Classification of "Bad Images" by Means of Machine Learning for Improvied Analysis of Vehicle Undercarriages," TechConnect Briefs 2022, pp. 1-4.
Office Action (Final Rejection) dated Aug. 31, 2022 for U.S. Appl. No. 17/144,879 (pp. 1-14).
Office Action (Non-Final Rejection) dated Sep. 16, 2022 for U.S. Appl. No. 16/937,884 (pp. 1-29).
Office Action (Notice of Allowance and Fees Due (PTOL-85)) dated Sep. 19, 2022 for U.S. Appl. No. 17/144,885 (pp. 1-7).
Extended European Search Report issued in App. No. EP20744281. 5, dated Aug. 12, 2022, 7 pages.
Office Action (Final Rejection) dated Aug. 12, 2022 for U.S. Appl. No. 16/518,501 (pp. 1-21).
Office Action (Final Rejection) dated Aug. 12, 2022 for U.S. Appl. No. 16/518,558 (pp. 1-18).
Office Action (Non-Final Rejection) dated Jun. 15, 2022 for U.S. Appl. No. 16/861,097 (pp. 1-17).
Office Action (Non-Final Rejection) dated Jun. 15, 2022 for U.S. Appl. No. 16/861,100 (pp. 1-18).
Office Action (Non-Final Rejection) dated Jul. 22, 2022 for U.S. Appl. No. 17/351,124 (pp. 1-12).
Office Action (Non-Final Rejection) dated Aug. 18, 2022 for U.S. Appl. No. 17/174,250 (pp. 1-17).
Office Action (Notice of Allowance and Fees Due (PTOL-85)) dated Aug. 17, 2022 for U.S. Appl. No. 16/692,219 (pp. 1-7).

* cited by examiner

Figure 22 — Damage multi-view close-up

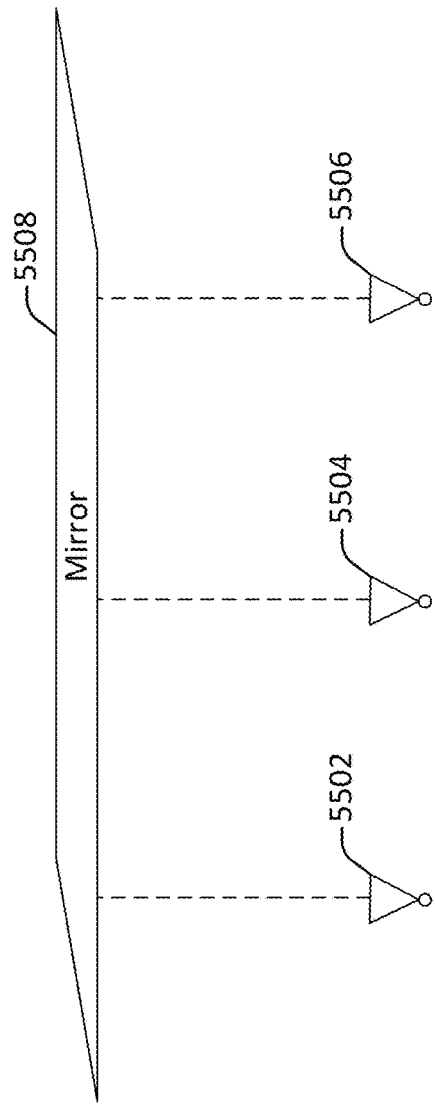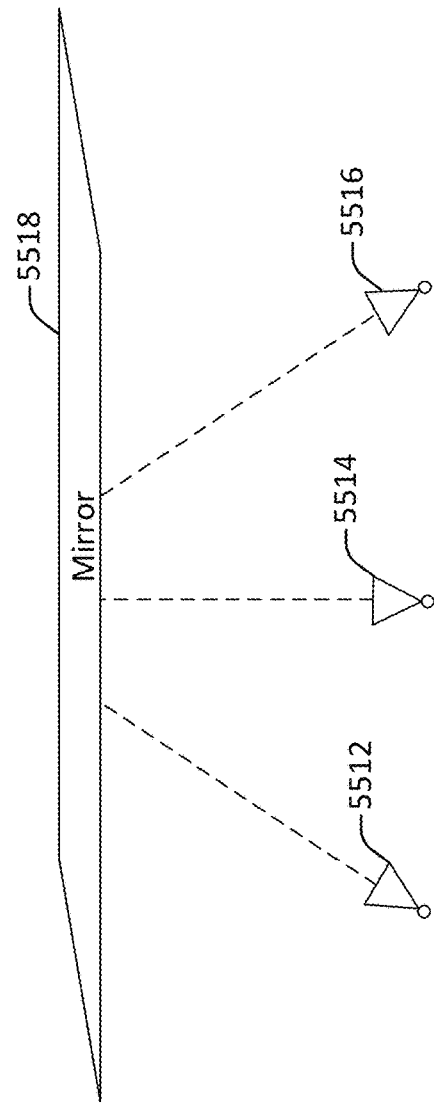

VEHICLE UNDERCARRIAGE IMAGING

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the capture and presentation of image data of an object, and more specifically to image data of a vehicle undercarriage.

DESCRIPTION OF RELATED ART

Vehicles need to be inspected for damage on different occasions. For example, a vehicle may be inspected after an accident to evaluate or support an insurance claim or police report. As another example, a vehicle may be inspected before and after the rental of a vehicle, or before buying or selling a vehicle.

Vehicle inspection using conventional approaches is a largely manual process. Typically, a person walks around the vehicle and manually notes damage and conditions. This process is time-intensive, resulting in significant costs. The manual inspection results also vary based on the person. For example, a person may be more or less experienced in evaluating damage. The variation in results can yield a lack of trust and potential financial losses, for example when buying and selling vehicles or when evaluating insurance claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 55A and 55B illustrate examples of configurations of an undercarriage imaging system with multiple mirrors, arranged in accordance with one or more embodiments.

TECHNICAL DESCRIPTION

Figure 1:
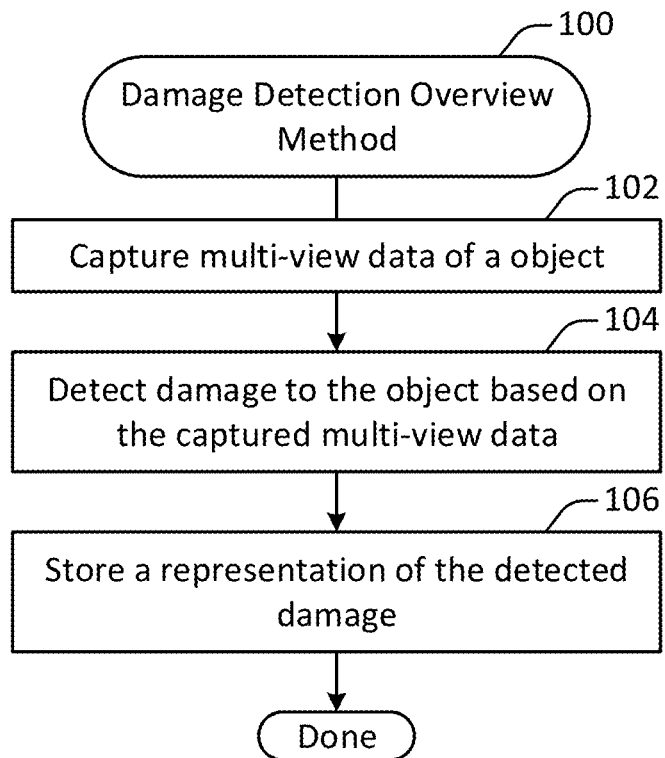
FIG. 1 illustrates a method for damage detection, performed in accordance with one or more embodiments.

The undercarriage of a vehicle often includes various components that are vital to the vehicle's continued operation and performance. However, inspecting a vehicle's undercarriage using conventional techniques is a difficult task. Typically a vehicle must be driven over a bay in which a human can move beneath the vehicle and manually inspect the vehicle's undercarriage for wear and damage.

Conventional techniques for providing visual data present specific challenges when applied to the undercarriage of a vehicle. A vehicle's undercarriage is typically relatively close to the ground, which means that a traditional camera would have a limited field of view even if it were positioned beneath the vehicle. Moreover, different vehicles have different ground clearances, so conventional techniques do not provide for reliably capturing and interpreting image data of different vehicle's undercarriages in an automated fashion. Also, for many vehicles the undercarriage is an assortment of three-dimensional parts, and not a relatively flat surface. Conventional techniques typically fail to capture this dimensionality.

Conventional techniques for providing visual data of a vehicle undercarriage require significantly more ground clearance than is typically available. For example, a vehicle may be driven over a ramp or open bay in which a camera is positioned. However, many such approaches require modifications to existing infrastructure, such as digging a hole in a roadway. Other such approaches require careful vehicle navigation, such as driving the vehicle over a ramp with an open middle component.

According to various embodiments, techniques and mechanisms described herein provide for capturing and processing visual data associated with a vehicle's undercarriage. The visual data may be used to detect damage to the undercarriage or otherwise present the undercarriage for visual inspection. Moreover, techniques and mechanisms described herein may function in a configuration where one or more cameras are positioned directly on the ground and then driven over by the vehicle.

In some embodiments, image data may be presented in a way that stiches together multiple images of the vehicle's undercarriage. Alternatively, or additionally, an MVIDMR of a vehicle's undercarriage may be constructed. The MVIDMR may present a view of the vehicle's undercarriage that may be navigated in one or more dimensions.

According to various embodiments, techniques and mechanisms described herein may be used to identify and represent damage to an object such as a vehicle. The damage detection techniques may be employed by untrained individuals. For example, an individual may collect multi-view data of an object, and the system may detect the damage automatically.

According to various embodiments, various types of damage may be detected. For a vehicle, such data may include, but is not limited to: scratches, dents, flat tires, cracked glass, broken glass, or other such damage.

In some implementations, a user may be guided to collect multi-view data in a manner that reflects the damage detection process. For example, when the system detects that damage may be present, the system may guide the user to take additional images of the portion of the object that is damaged.

According to various embodiments, techniques and mechanisms described herein may be used to create damage estimates that are consistent over multiple captures. In this way, damage estimates may be constructed in a manner that is independent of the individual wielding the camera and does not depend on the individual's expertise. In this way, the system can automatically detect damage in an instant, without requiring human intervention.

Although various techniques and mechanisms are described herein by way of example with reference to detecting damage to vehicles, these techniques and mechanisms are widely applicable to detecting damage to a range of objects. Such objects may include, but are not limited to: houses, apartments, hotel rooms, real property, personal property, equipment, jewelry, furniture, offices, people, and animals.

FIG. 1 illustrates a method 100 for damage detection, performed in accordance with one or more embodiments. According to various embodiments, the method 100 may be performed at a damage detection portal or computing device in communication with a damage detection portal. Alternately, or additionally, some or all of the method 100 may be performed at a remote computing device such as a server. The method 100 may be used to detect damage to any of various types of objects. However, for the purpose of illustration, many examples discussed herein will be described with reference to vehicles.

At 102, multi-view data of an object is captured. According to various embodiments, the multi-view data may include images captured from different viewpoints. For example, a user may walk around a vehicle and capture images from different angles. In some configurations, the multi-view data may include data from various types of sensors. For example, the multi-view data may include data from more than one camera. As another example, the multi-view data may include data from a depth sensor. As another example, the multi-view data may include data collected from an inertial measurement unit (IMU). IMU data may include position information, acceleration information, rotation information, or other such data collected from one or more accelerometers or gyroscopes.

In particular embodiments, the multi-view data may be aggregated to construct a multi-view representation. Additional details regarding multi-view data and damage detection are discussed in co-pending and commonly assigned U.S. patent application Ser. No. 16/692,133, "DAMAGE DETECTION FROM MULTI-VIEW VISUAL DATA", by Holzer et al., filed Nov. 22, 2019, which is hereby incorporated by reference in its entirety and for all purposes.

At 104, damage to the object is detected based on the captured multi-view data. In some implementations, the damage may be detected by evaluating some or all of the multi-view data with a neural network, by comparing some or all of the multi-view data with reference data, and/or any other relevant operations for damage detection. Additional details regarding damage detection are discussed throughout the application.

At 106, a representation of the detected damage is stored on a storage medium or transmitted via a network. According to various embodiments, the representation may include some or all of a variety of information. For example, the representation may include an estimated dollar value. As another example, the representation may include a visual depiction of the damage. As still another example, a list of damaged parts may be provided. Alternatively, or additionally, the damaged parts may be highlighted in a 3D CAD model.

In some embodiments, a visual depiction of the damage may include an image of actual damage. For example, once the damage is identified at 104, one or more portions of the multi-view data that include images of the damaged portion of the object may be selected and/or cropped.

In some implementations, a visual depiction of the damage may include an abstract rendering of the damage. An abstract rendering may include a heatmap that shows the probability and/or severity of damage using a color scale. Alternatively, or additionally, an abstract rendering may represent damage using a top-down view or other transformation. By presenting damage on a visual transformation of the object, damage (or lack thereof) to different sides of the object may be presented in a standardized manner.

Figure 2:
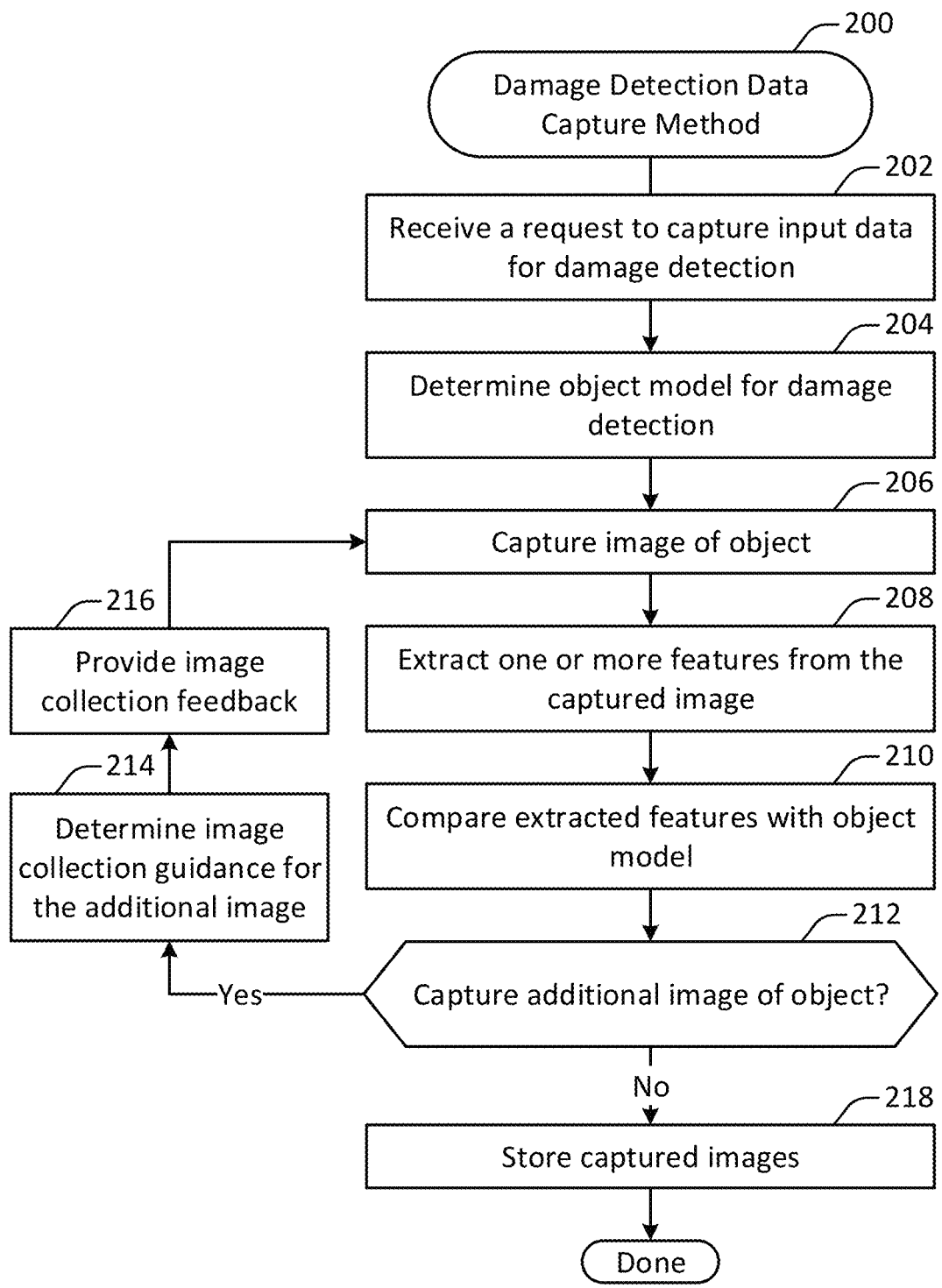
FIG. 2 illustrates a method of damage detection data capture, performed in accordance with one or more embodiments.

FIG. 2 illustrates a method 200 of damage detection data capture, performed in accordance with one or more embodiments. According to various embodiments, the method 200 may be performed at a damage detection portal or computing device in communication with a damage detection portal. The method 200 may be used to detect damage to any of various types of objects. However, for the purpose of illustration, many examples discussed herein will be described with reference to vehicles.

A request to capture input data for damage detection for an object is received at 202. In some implementations, the request to capture input data may be received at a damage detection portal or computing device in communication with a damage detection portal. In particular embodiments, the object may be a vehicle such as a car, truck, or sports utility vehicle.

An object model for damage detection is determined at 204. According to various embodiments, the object model may include reference data for use in evaluating damage and/or collecting images of an object. For example, the object model may include one or more reference images of similar objects for comparison. As another example, the object model may include a trained neural network. As yet another example, the object model may include one or more reference images of the same object captured at an earlier point in time. As yet another example, the object model may include a 3D model (such as a CAD model) or a 3D mesh reconstruction of the corresponding vehicle.

In some embodiments, the object model may be determined based on user input. For example, the user may identify a vehicle in general or a car, truck, or sports utility vehicle in particular as the object type.

In some implementations, the object model may be determined automatically based on data captured as part of the method 200. In this case, the object model may be determined after the capturing of one or more images at 206.

At 206, an image of the object is captured. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

According to various embodiments, a camera or other sensor located at a computing device may be communicably coupled with the computing device in any of various ways. For example, in the case of a mobile phone or laptop, the camera may be physically located within the computing device. As another example, in some configurations a camera or other sensor may be connected to the computing device via a cable. As still another example, a camera or other sensor may be in communication with the computing device via a wired or wireless communication link.

According to various embodiments, as used herein the term "depth sensor" may be used to refer to any of a variety of sensor types that may be used to determine depth information. For example, a depth sensor may include a projector and camera operating in infrared light frequencies. As another example, a depth sensor may include a projector and camera operating in visible light frequencies. For instance, a line-laser or light pattern projector may project a visible light pattern onto an object or surface, which may then be detected by a visible light camera.

One or more features of the captured image or images are extracted at 208. In some implementations, extracting one or more features of the object may involve constructing a multi-view capture that presents the object from different viewpoints. If a multi-view capture has already been constructed, then the multi-view capture may be updated based on the new image or images captured at 206. Alternatively, or additionally, feature extraction may involve performing one or more operations such as object recognition, component identification, orientation detection, or other such steps.

At 210, the extracted features are compared with the object model. According to various embodiments, comparing the extracted features to the object model may involve making any comparison suitable for determining whether the captured image or images are sufficient for performing damage comparison. Such operations may include, but are not limited to: applying a neural network to the captured image or images, comparing the captured image or images to one or more reference images, and/or performing any of the operations discussed with respect to FIGS. 3 and 4.

A determination is made at 212 as to whether to capture an additional image of the object. In some implementations, the determination may be made at least in part based on an analysis of the one or more images that have already been captured.

In some embodiments, a preliminary damage analysis may be implemented using as input the one or more images that have been captured. If the damage analysis is inconclusive, then an additional image may be captured. Techniques for conducting damage analysis are discussed in additional detail with respect to the methods 300 and 400 shown in FIGS. 3 and 4.

In some embodiments, the system may analyze the captured image or images to determine whether a sufficient portion of the object has been captured in sufficient detail to support damage analysis. For example, the system may analyze the capture image or images to determine whether the object is depicted from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

If the determination is made to capture an additional image, then at 214 image collection guidance for capturing the additional image is determined. In some implementations, the image collection guidance may include any suitable instructions for capturing an additional image that may assist in changing the determination made at 212. Such guidance may include an indication to capture an additional image from a targeted viewpoint, to capture an additional image of a designated portion of the object, or to capture an additional image at a different level of clarity or detail. For example, if possible damage is detected, then feedback may be provided to capture additional detail at the damaged location.

At 216, image collection feedback is provided. According to various embodiments, the image collection feedback may include any suitable instructions or information for assisting a user in collecting additional images. Such guidance may include, but is not limited to, instructions to collect an image at a targeted camera position, orientation, or zoom level. Alternatively, or additionally, a user may be presented with instructions to capture a designated number of images or an image of a designated portion of the object.

For example, a user may be presented with a graphical guide to assist the user in capturing an additional image from a target perspective. As another example, a user may be presented with written or verbal instructions to guide the user in capturing an additional image.

When it is determined to not capture an additional image of the object, then at 218 the captured image or images are stored. In some implementations, the captured images may be stored on a storage device and used to perform damage detection, as discussed with respect to the methods 300 and 400 in FIGS. 3 and 4. Alternatively, or additionally, the images may be transmitted to a remote location via a network interface.

Figure 3:
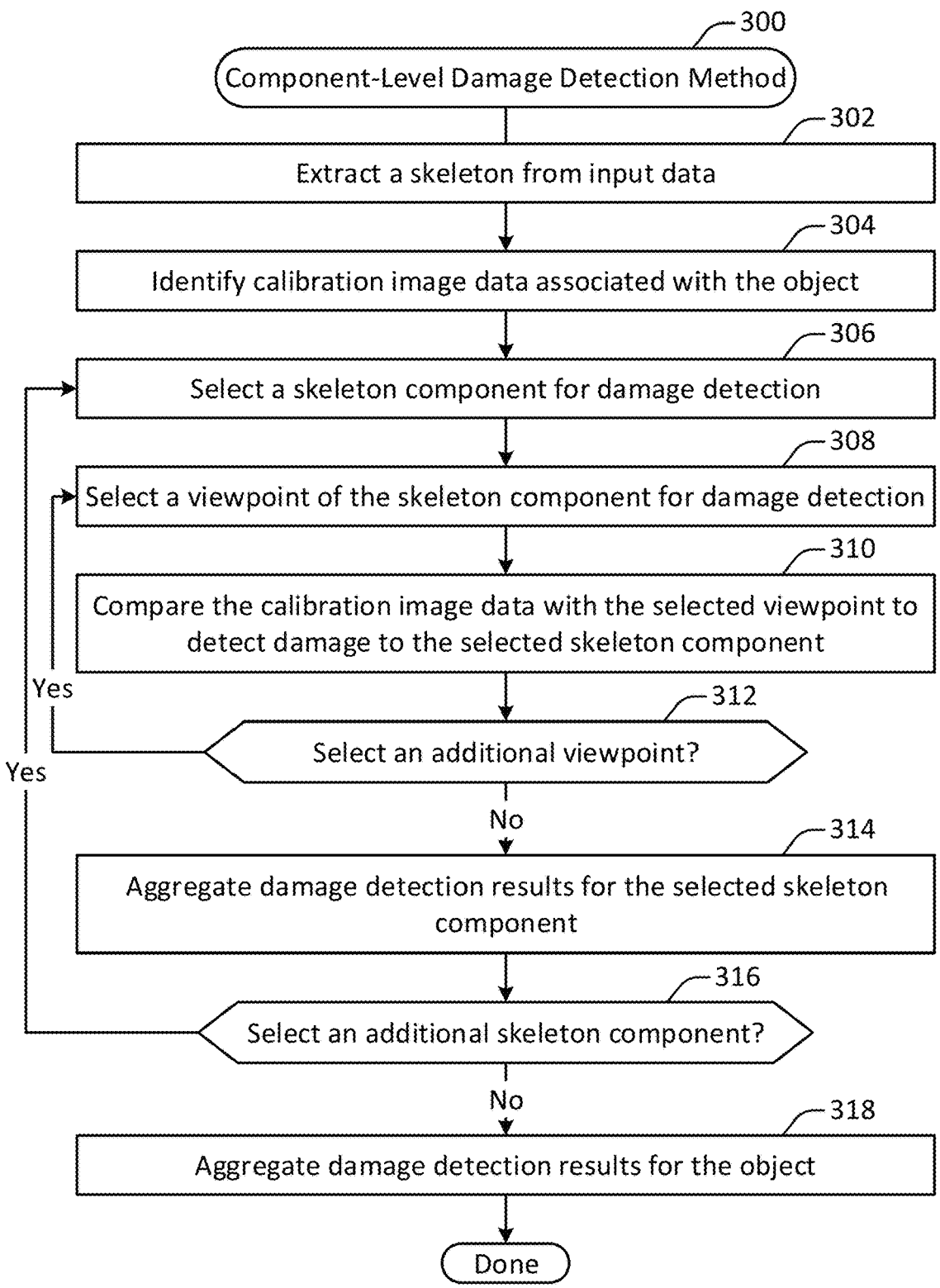
FIG. 3 illustrates a method for component-level damage detection, performed in accordance with one or more embodiments.

FIG. 3 illustrates a method 300 for component-level damage detection, performed in accordance with one or more embodiments. According to various embodiments, the method 300 may be performed at a damage detection portal or computing device in communication with a damage detection portal. The method 300 may be used to detect damage to any of various types of objects. However, for the purpose of illustration, many examples discussed herein will be described with reference to vehicles.

A skeleton is extracted from input data at 302. According to various embodiments, the input data may include visual data collected as discussed with respect to the method 300 shown in FIG. 3. Alternatively, or additionally, the input data may include previously collected visual data, such as visual data collected without the use of recording guidance.

In some implementations, the input data may include one or more images of the object captured from different perspectives. Alternatively, or additionally, the input data may include video data of the object. In addition to visual data, the input data may also include other types of data, such as IMU data.

According to various embodiments, skeleton detection may involve one or more of a variety of techniques. Such techniques may include, but are not limited to: 2D skeleton detection using machine learning, 3D pose estimation, and 3D reconstruction of a skeleton from one or more 2D skeletons and/or poses.

Calibration image data associated with the object is identified at 304. According to various embodiments, the calibration image data may include one or more reference images of similar objects or of the same object at an earlier point in time. Alternatively, or additionally, the calibration image data may include a neural network used to identify damage to the object.

A skeleton component is selected for damage detection at 306. In some implementations, a skeleton component may represent a panel of the object. In the case of a vehicle, for example, a skeleton component may represent a door panel, a window, or a headlight. Skeleton components may be selected in any suitable order, such as sequentially, randomly, in parallel, or by location on the object.

According to various embodiments, when a skeleton component is selected for damage detection, a multi-view capture of the skeleton component may be constructed. Constructing a multi-view capture of the skeleton component may involve identifying different images in the input data that capture the skeleton component from different viewpoints. The identified images may then be selected, cropped, and combined to produce a multi-view capture specific to the skeleton component.

A viewpoint of the skeleton component is selected for damage detection at 304. In some implementations, each viewpoint included in the multi-view capture of the skeleton component may be analyzed independently. Alternatively, or additionally, more than one viewpoint may be analyzed simultaneously, for instance by providing the different viewpoints as input data to a machine learning model trained to identify damage to the object. In particular embodiments, the input data may include other types of data, such as 3D visual data or data captured using a depth sensor or other type of sensor.

According to various embodiments, one or more alternatives to skeleton analysis at 302-310 may be used. For example, an object part (e.g., vehicle component) detector may be used to directly estimate the object parts. As another example, an algorithm such as a neural network may be used to map an input image to a top-down view of an object such as a vehicle (and vice versa) in which the components are defined. As yet another example, an algorithm such as a neural network that classifies the pixels of an input image as a specific component can be used to identify the components. As still another example, component-level detectors may be used to identify specific components of the object. As yet another alternative, a 3D reconstruction of the vehicle may be computed and a component classification algorithm may be run on that 3D model. The resulting classification can then be back-projected into each image. As still another alternative, a 3D reconstruction of the vehicle can be computed and fitted to an existing 3D CAD model of the vehicle in order to identify the single components.

At 310, the calibration image data is compared with the selected viewpoint to detect damage to the selected skeleton component. According to various embodiments, the comparison may involve applying a neural network to the input data. Alternatively, or additionally, an image comparison between the selected viewpoint and one or more reference images of the object captured at an earlier point in time may be performed.

A determination is made at 312 as to whether to select an additional viewpoint for analysis. According to various embodiments, additional viewpoints may be selected until all available viewpoints are analyzed. Alternatively, viewpoints may be selected until the probability of damage to the selected skeleton component has been identified to a designated degree of certainty.

Damage detection results for the selected skeleton component are aggregated at 314. According to various embodiments, damage detection results from different viewpoints to a single damage detection result per panel resulting in a damage result for the skeleton component. For example, a heatmap may be created that shows the probability and/or severity of damage to a vehicle panel such as a vehicle door. According to various embodiments, various types of aggregation approaches may be used. For example, results determined at 310 for different viewpoints may be averaged. As another example, different results may be used to "vote" on a common representation such as a top-down view. Then, damage may be reported if the votes are sufficiently consistent for the panel or object portion.

A determination is made at 316 as to whether to select an additional skeleton component for analysis. In some implementations, additional skeleton components may be selected until all available skeleton components are analyzed.

Damage detection results for the object are aggregated at 314. According to various embodiments, damage detection results for different components may be aggregated into a single damage detection result for the object as a whole. For example, creating the aggregated damage results may involve creating a top-down view. As another example, creating the aggregated damage results may involve identifying standardized or appropriate viewpoints of portions of the object identified as damaged. As yet another example, creating the aggregated damage results may involve tagging damaged portions in a multi-view representation. As still another example, creating the aggregated damage results may involve overlaying a heatmap on a multi-view representation. As yet another example, creating the aggregated damage results may involve selecting affected parts and presenting them to the user. Presenting may be done as a list, as highlighted elements in a 3D CAD model, or in any other suitable fashion.

In particular embodiments, techniques and mechanisms described herein may involve a human to provide additional input. For example, a human may review damage results, resolve inconclusive damage detection results, or select damage result images to include in a presentation view. As another example, human review may be used to train one or more neural networks to ensure that the results computed are correct and are adjusted as necessary.

Figure 4:
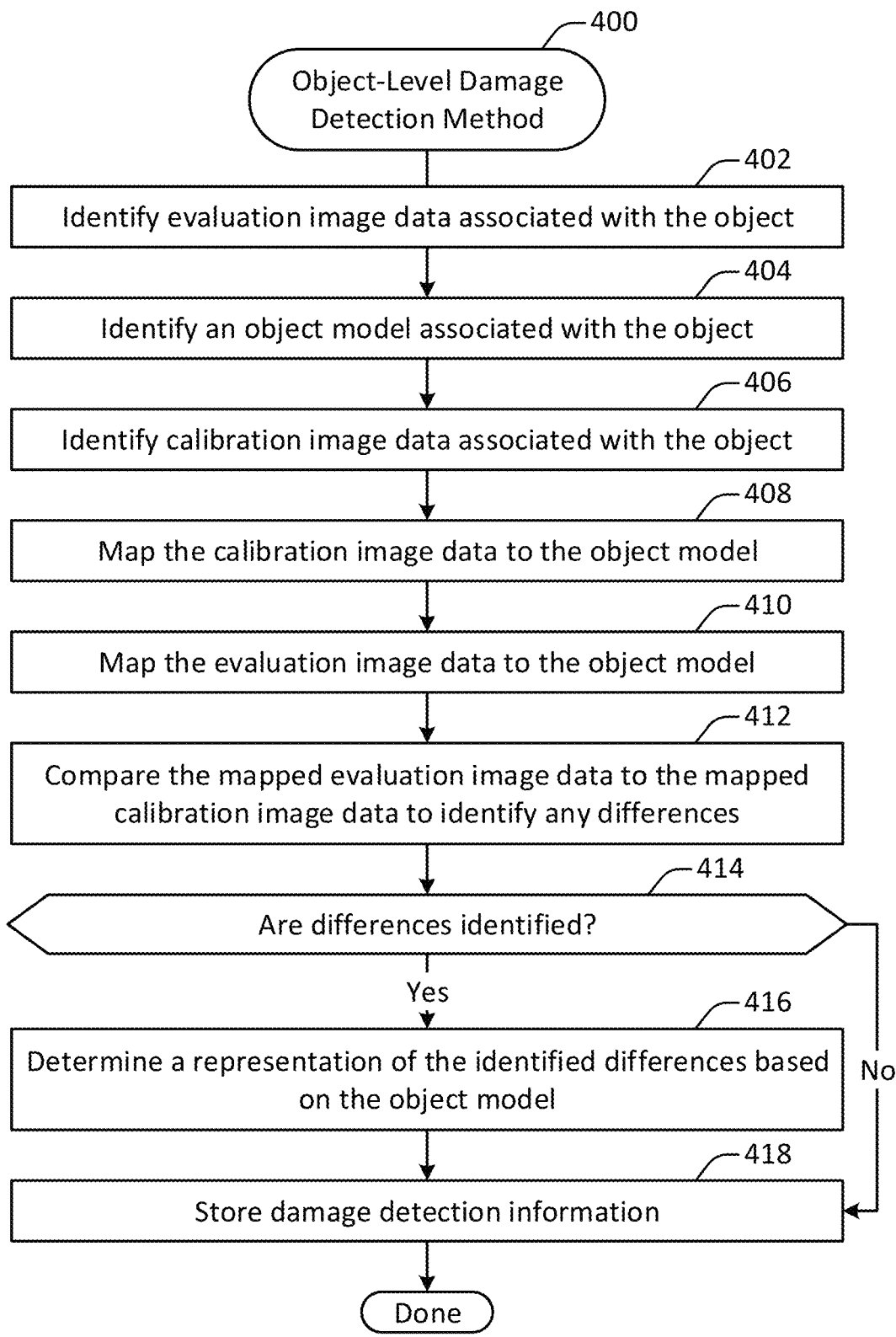
FIG. 4 illustrates an object-level damage detection method, performed in accordance with one or more embodiments.

FIG. 4 illustrates an object-level damage detection method 400, performed in accordance with one or more embodiments. The method 400 may be performed at a damage detection portal or computing device in communication with a damage detection portal. The method 400 may be used to detect damage to any of various types of objects.

Evaluation image data associated with the object is identified at 402. According to various embodiments, the evaluation image data may include single images captured from different viewpoints. As discussed herein, the single images may be aggregated into a multi-view capture, which may include data other than images, such as IMU data.

An object model associated with the object is identified at 404. In some implementations, the object model may include a 2D or 3D standardized mesh, model, or abstracted representation of the object. For instance, the evaluation image data may be analyzed to determine the type of object that is represented. Then, a standardized model for that type of object may be retrieved. Alternatively, or additionally, a user may select an object type or object model to use. The object model may include a top-down view of the object.

Calibration image data associated with the object is identified at 406. According to various embodiments, the calibration image data may include one or more reference images. The reference images may include one or more images of the object captured at an earlier point in time. Alternatively, or additionally, the reference images may include one or more images of similar objects. For example, a reference image may include an image of the same type of car as the car in the images being analyzed.

In some implementations, the calibration image data may include a neural network trained to identify damage. For instance, the calibration image data may be trained to analyze damage from the type of visual data included in the evaluation data.

The calibration data is mapped to the object model at 408. In some implementations, mapping the calibration data to the object model may involve mapping a perspective view of an object from the calibration images to a top-down view of the object.

The evaluation image data is mapped to the object model at 410. In some implementations, mapping the evaluation image data to the object model may involve determine a pixel-by-pixel correspondence between the pixels of the image data and the points in the object model. Performing such a mapping may involve determining the camera position and orientation for an image from IMU data associated with the image.

In some embodiments, a dense per-pixel mapping between an image and the top-down view may be estimated at 410. Alternatively, or additionally, location of center of an image may be estimated with respect to the top-down view. For example, a machine learning algorithm such as deep net may be used to map the image pixels to coordinates in the top-down view. As another example, joints of a 3D skeleton of the object may be estimated and used to define the mapping. As yet another example, component-level detectors may be used to identify specific components of the object.

In some embodiments, the location of one or more object parts within the image may be estimated. Those locations may then be used to map data from the images to the top-down view. For example, object parts may be classified on a pixel-wise basis. As another example, the center location of object parts may be determined. As another example, the joints of a 3D skeleton of an object may be estimated and used to define the mapping. As yet another example, component-level detectors may be used for specific object components.

In some implementations, images may be mapped in a batch via a neural network. For example, a neural network may receive as input a set of images of an object captured from different perspectives. The neural network may then detect damage to the object as a whole based on the set of input images.

The mapped evaluation image data is compared to the mapped calibration image data at 412 to identify any differences. According to various embodiments, the data may be compared by running a neural network on a multi-view representation as a whole.

Alternatively, or additional, the evaluation and image data may be compared on an image-by-image basis.

If it is determined at 414 that differences are identified, then at 416 a representation of the identified differences is determined. According to various embodiments, the representation of the identified differences may involve a heatmap of the object as a whole. For example, a heatmap of a top-down view of a vehicle showing damage is illustrated in FIG. 2. Alternatively, one or more components that are damaged may be isolated and presented individually.

At 418, a representation of the detected damage is stored on a storage medium or transmitted via a network. In some implementations, the representation may include an estimated dollar value. Alternatively, or additionally, the representation may include a visual depiction of the damage. Alternatively, or additionally, affected parts may be presented as a list and/or highlighted in a 3D CAD model.

In particular embodiments, damage detection of an overall object representation may be combined with damage representation on one or more components of the object. For example, damage detection may be performed on a closeup of a component if an initial damage estimation indicates that damage to the component is likely.

Figure 5:
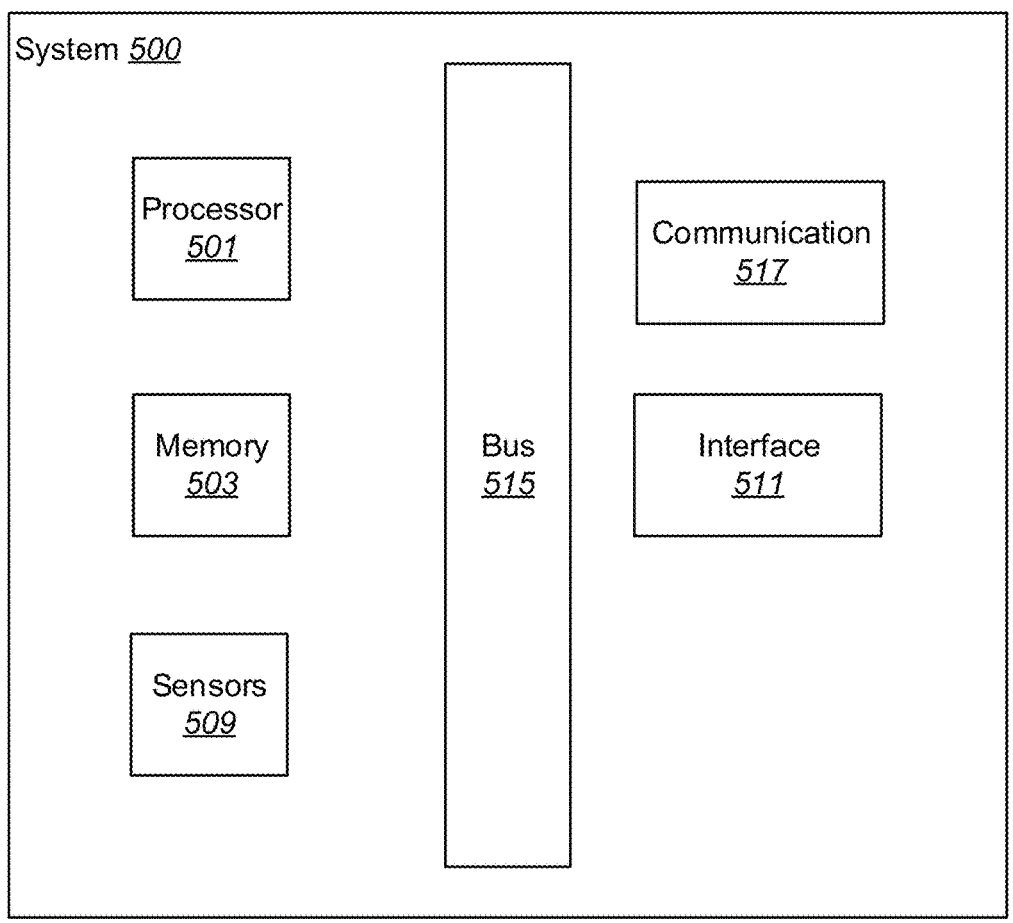
FIG. 5 illustrates a computer system that can be used in accordance with one or more embodiments.

With reference to FIG. 5, shown is a particular example of a computer system that can be used to implement particular examples. For instance, the computer system 500 can be used to provide MVIDMRs according to various embodiments described above. According to various embodiments, a system 500 suitable for implementing particular embodiments includes a processor 501, a memory 503, an interface 511, and a bus 515 (e.g., a PCI bus).

The system 500 can include one or more sensors 509, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 5, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 511 may include separate input and output interfaces, or may be a unified interface supporting both operations. Examples of input and output interfaces can include displays, audio devices, cameras, touch screens, buttons and microphones. When acting under the control of appropriate software or firmware, the processor 501 is responsible for such tasks such as optimization. Various specially configured devices can also be used in place of a processor 501 or in addition to processor 501, such as graphical processor units (GPUs). The complete implementation can also be done in custom hardware. The interface 511 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 500 uses memory 503 to store data and program instructions and maintained a local side cache. The program instructions may control the operation of an operating system and/or one or more applications, for example. The memory or memories may also be configured to store received metadata and batch requested metadata.

The system 500 can be integrated into a single device with a common housing. For example, system 500 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 500 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Figure 6:
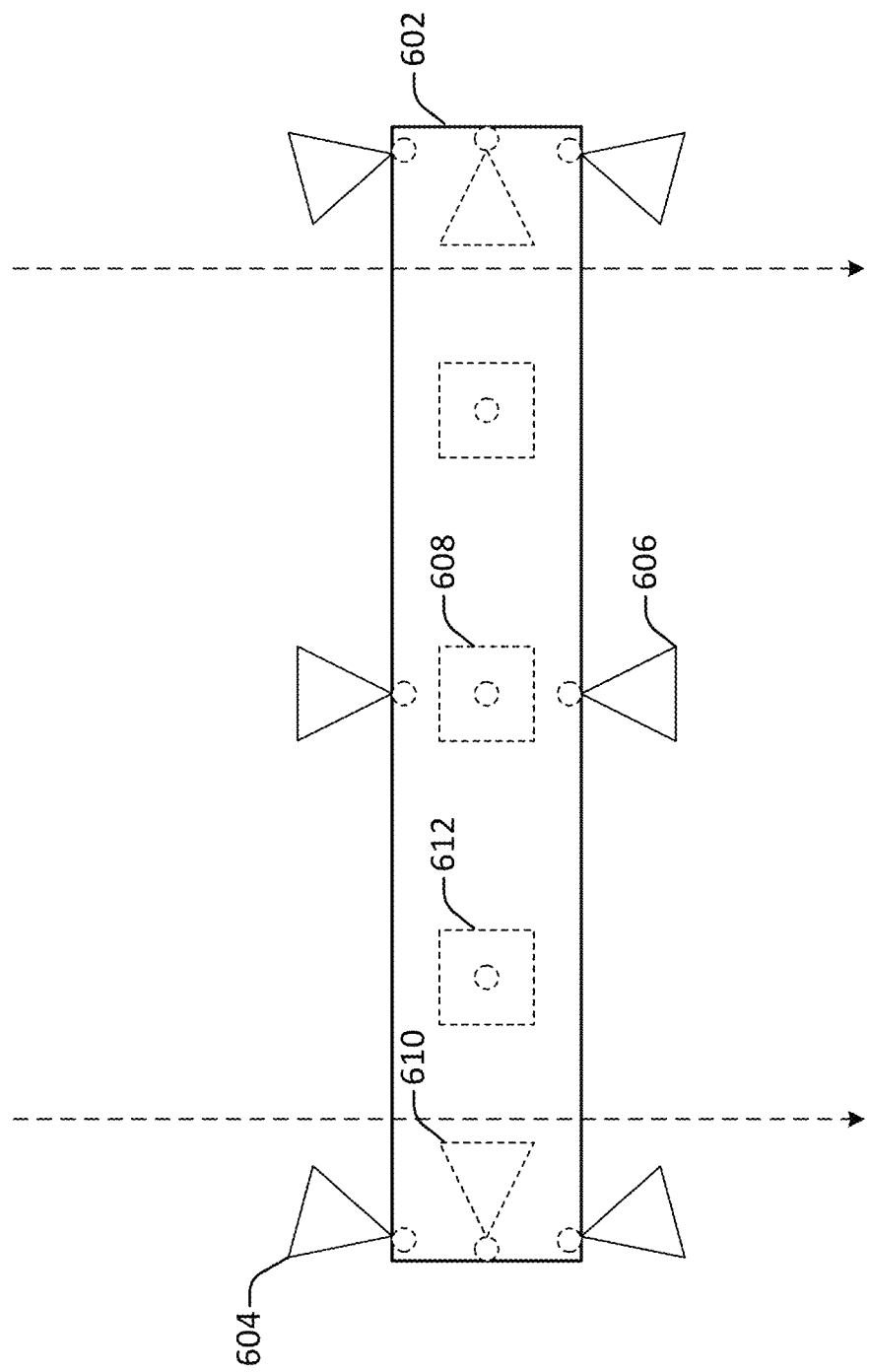
FIG. 6 shows a top-down diagram of a damage detection portal arranged as a gate, configured in accordance with one or more embodiments.
Figure 7:
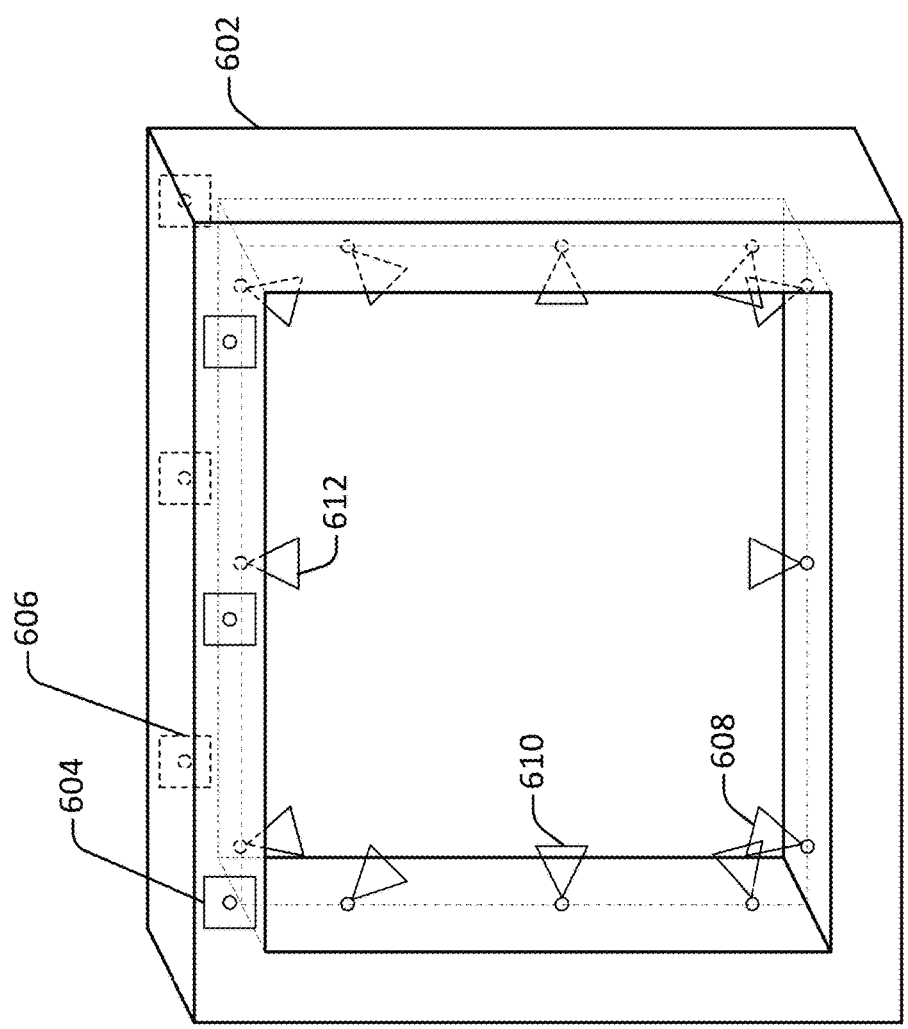
FIG. 7 shows a perspective diagram of a damage detection portal arranged as a gate, configured in accordance with one or more embodiments.

FIG. 6 shows a top-down diagram of a damage detection portal 602 arranged as a gate, configured in accordance with one or more embodiments. FIG. 7 shows a perspective diagram of the same damage portal 602. The damage detection portal 602 is configured as a gate through which a vehicle may be driven. The damage detection portal 602 includes a number of cameras, such as the cameras 604, 606, 608, and 610. The camera 604 is configured to point toward the front as the vehicle drives through the gate. The camera 606 is configured to point toward the back as the vehicle leaves the gate. The camera 610 is configured to point toward the interior area of the gate. The camera 608 is configured to point down toward the top of the vehicle. The camera 612 is configured to point up toward the undercarriage of the vehicle. Various configurations of cameras are possible.

In particular embodiments, an image of a vehicle, for instance an image of the vehicle's undercarriage, may be created from two or more images captured by one, two, or more cameras. For example, the vehicle may be driven over two or more undercarriage cameras, which may each capture images of a portion of the vehicle's undercarriage. Those images may then be combined to yield a more complete image of the vehicle's undercarriage, for example, by including portions of the undercarriage that are not visible at the same time to a single camera.

In particular embodiments, an image of a vehicle may be created in an interactive fashion. For example, by creating an image of a vehicle's undercarriage based on different images captured with multiple cameras, a user may be able to change the view direction and look behind portions of the undercarriage by switching to a camera with a different view. As another example, one or more cameras may be movable, for instance by being mounted on a track and/or gimbal. In this way, the system may allow a camera to be repositioned to attain a different viewpoint, for instance to look behind an object in the undercarriage.

In particular embodiments, two or more of the cameras associated with the damage detection portal 602 may be synchronized. When cameras are synchronized, they may be configured to capture images at the same time or at nearly the same time. Alternatively, or additionally, synchronized cameras may be configured to capture images that are staggered in time by a fixed time period. By employing synchronized cameras, the images captured from the cameras may be more easily linked. For instance, synchronizing cameras on the left and right side of the damage detection portal may ensure that in a given image precisely the same portion of the vehicle is captured on the right side as by the corresponding camera on the left side.

Figure 8:
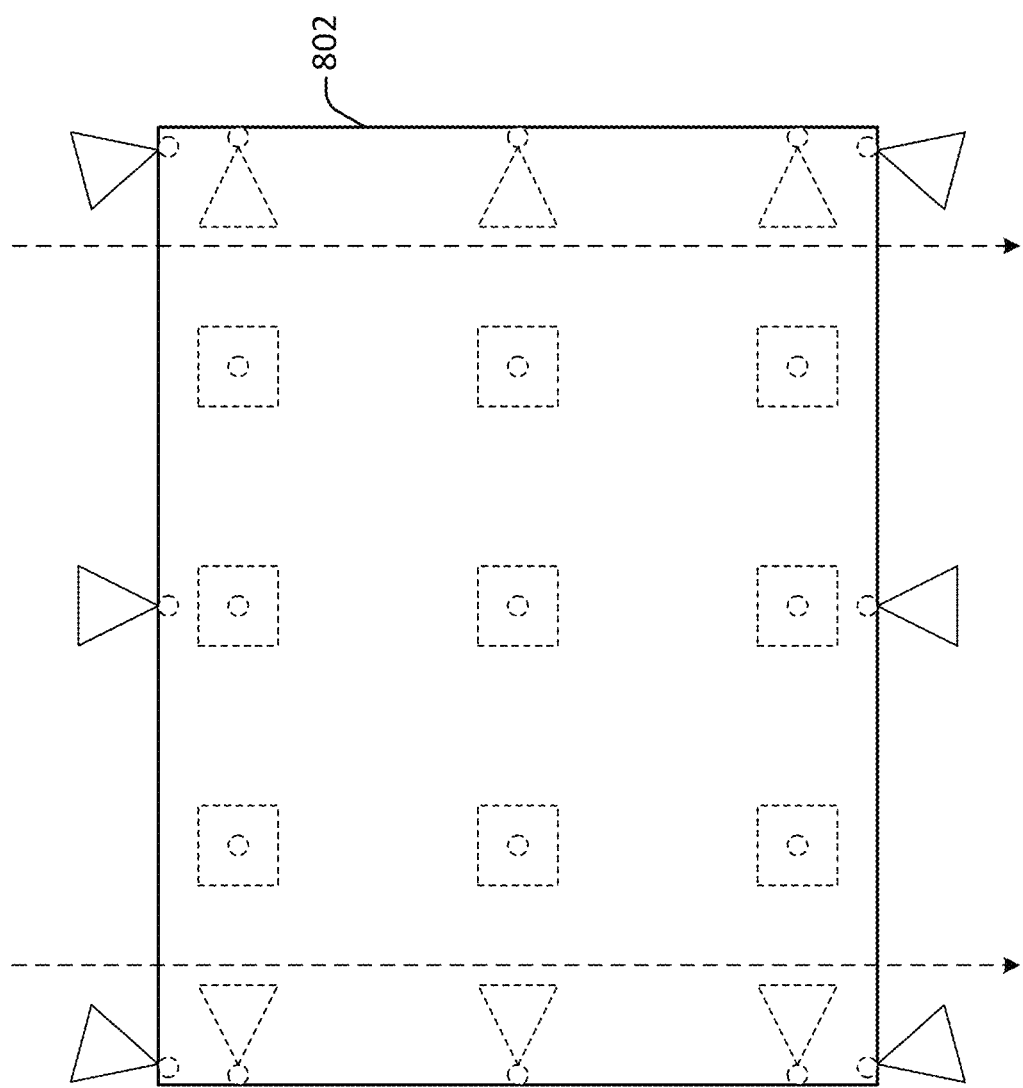
FIG. 8 shows a top-down diagram of a damage detection portal arranged as a tunnel, configured in accordance with one or more embodiments.
Figure 9:
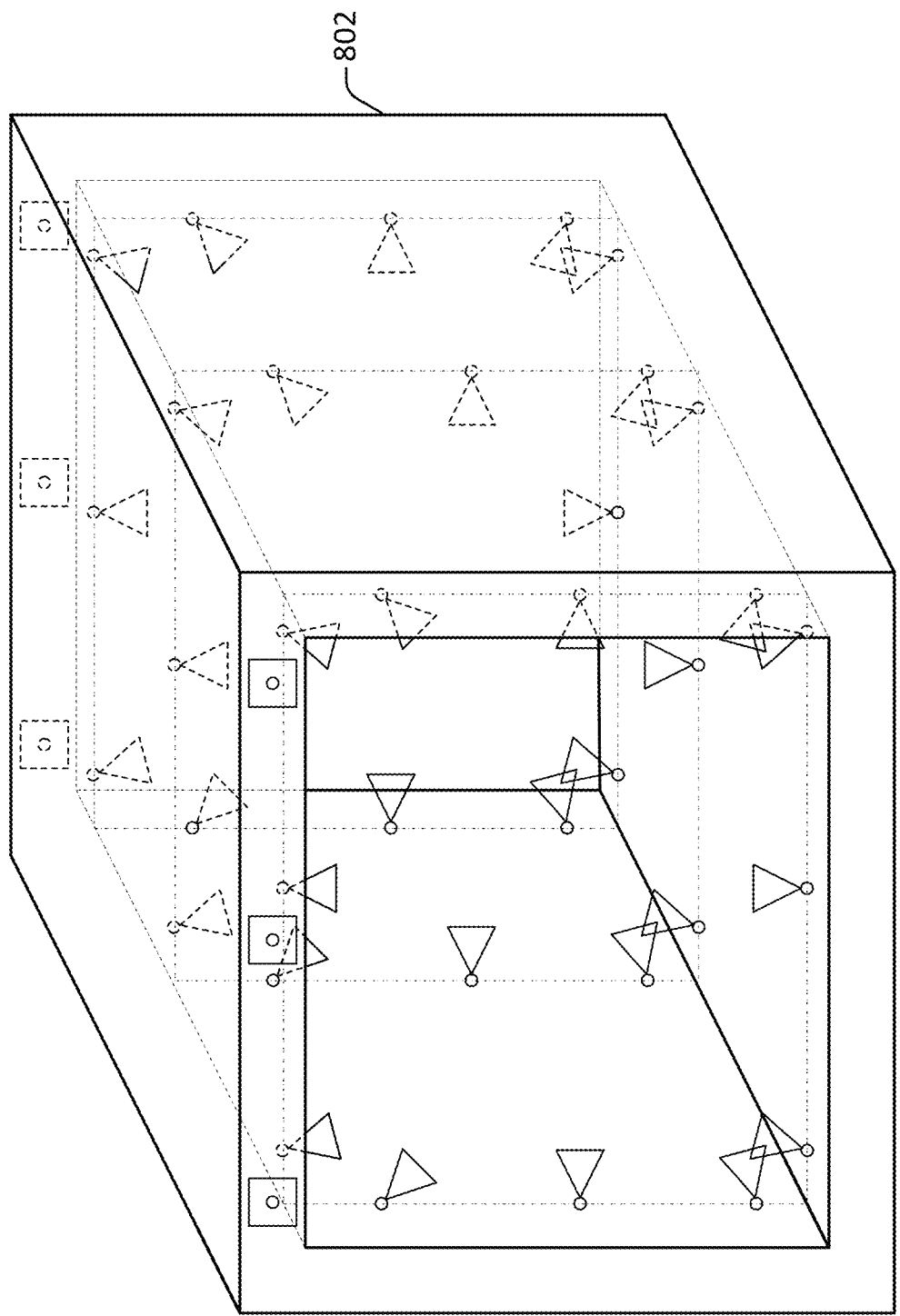
FIG. 9 shows a perspective diagram of a damage detection portal arranged as a tunnel, configured in accordance with one or more embodiments.

FIG. 8 shows a top-down diagram of a damage detection portal 802 arranged as a tunnel, configured in accordance with one or more embodiments. FIG. 9 shows a perspective diagram of the same damage portal 802.

In particular embodiments, a damage detection portal may be configured as a turntable. In such a configuration, a vehicle may first be positioned onto the turntable. The turntable may then rotate to present the vehicle at different angles to one or more fixed cameras. Alternatively, a turntable configuration may leave the vehicle in a fixed position while a camera assembly rotates around the vehicle. As yet another example, both the vehicle and the camera assembly may be rotated, for instance in opposite directions.

According to various embodiments, in a turntable configuration, the turntable may rotate any suitable amount. For instance, the turntable may rotate 360 degrees, 720 degrees, or 180 degrees.

Figure 10B:
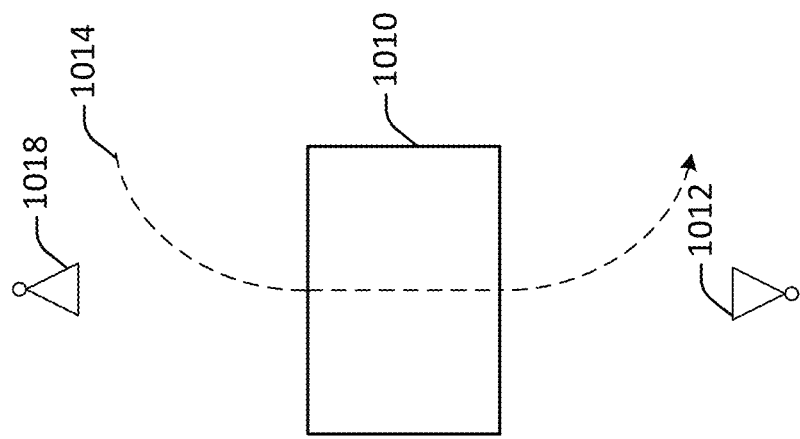
FIGS. 10A and 10B show top-down views of a damage detection portal, configured in accordance with one or more embodiments.
Figure 10A:
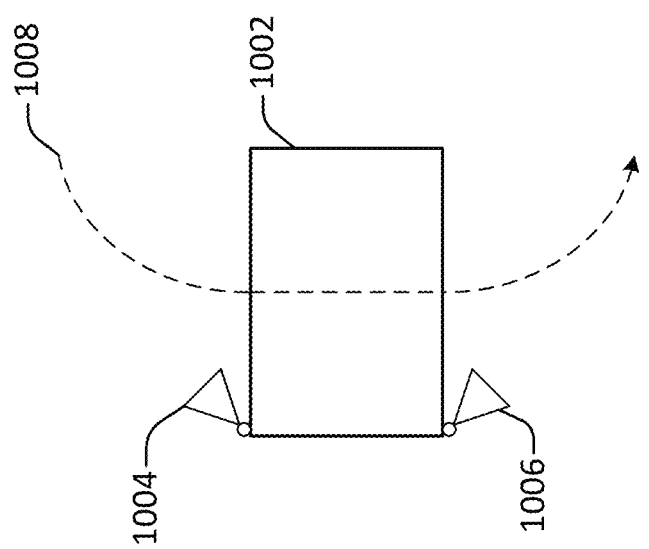

FIG. 10A shows a top-down views of a damage detection portal 1002, configured in accordance with one or more embodiments. The damage detection portal 1002 is configured to employ a drive path 1008 that is curved both entering and leaving the damage detection portal 1002. Due to the configuration of the cameras and the drive path, the camera 1004 is configured to capture images of a vehicle head-on at a neutral elevation (also referred to as a "hero shot") as the vehicle drives toward the camera and then turns into the damage detection portal. Similarly, the camera 1006 is configured to capture images of the vehicle tail-on at a neutral elevation as the vehicle leaves the damage detection portal 1002 and then curves away from the portal.

FIG. 10B shows a top-down views of a damage detection portal 1010, configured in accordance with one or more embodiments. The damage detection portal 1010 is configured to employ a drive path 1014 that is curved both entering and leaving the damage detection portal 1010. Due to the configuration of the cameras and the drive path, the camera 1018 is configured to capture images of a vehicle tail-on at a neutral elevation as the vehicle drives toward the camera and then turns into the damage detection portal. Similarly, the camera 1012 is configured to capture images of the vehicle head-on at a neutral elevation as the vehicle leaves the damage detection portal 1002 and then curves away from the portal.

Figure 11B:
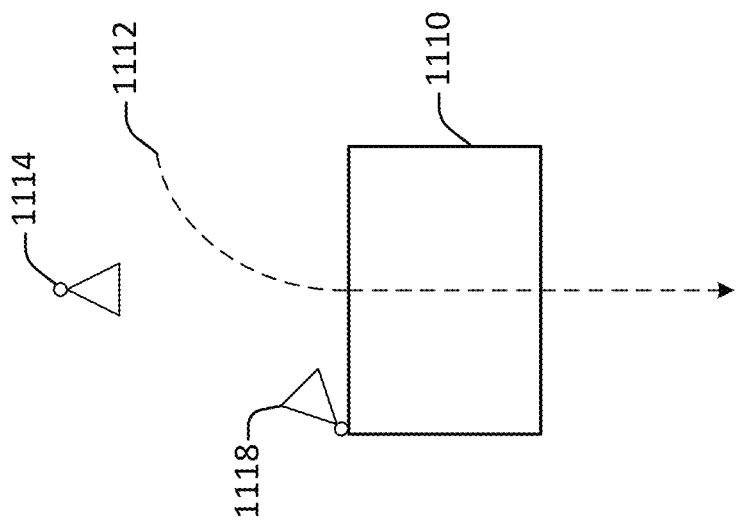
FIGS. 11A and 11B show a top-down views of a damage detection portal, configured in accordance with one or more embodiments.
Figure 11A:
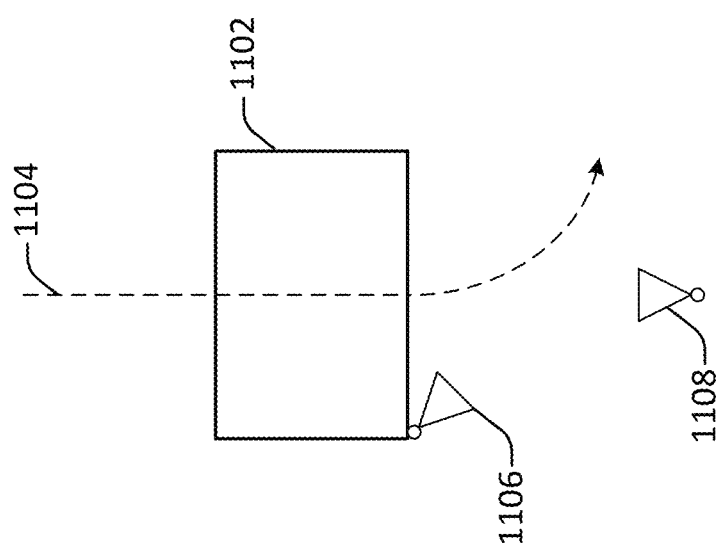

FIG. 11A shows a top-down views of a damage detection portal 1102, configured in accordance with one or more embodiments. The damage detection portal 1102 is configured to employ a drive path 1108 that is straight entering but curved leaving the damage detection portal 1102. Due to the configuration of the cameras and the drive path, the camera 1108 is configured to capture images of a vehicle head-on at a neutral elevation as the vehicle leaves the damage detection portal 1102 and then curves away from the portal. Similarly, the camera 1106 is configured to capture images of the vehicle tail-on at a neutral elevation as the vehicle leaves the damage detection portal 1102 and then curves away from the portal.

FIG. 11B shows a top-down views of a damage detection portal 1110, configured in accordance with one or more embodiments. The damage detection portal 1110 is configured to employ a drive path 1114 that is curved entering and straight leaving the damage detection portal 1110. Due to the configuration of the cameras and the drive path, the camera 1118 is configured to capture images of a vehicle head-on at a neutral elevation as the vehicle drives toward the camera and then turns into the damage detection portal. Similarly, the camera 1114 is configured to capture images of the vehicle tail-on at a neutral elevation as the vehicle turns into the damage detection portal.

Figure 12:
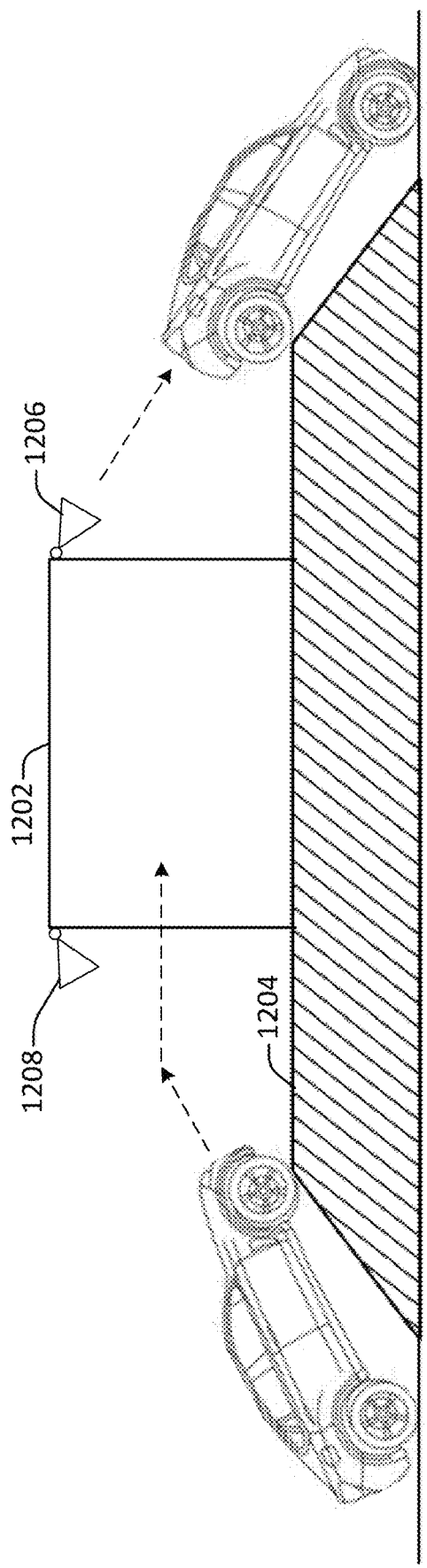
FIG. 12 shows a side-view diagram of a damage detection portal as a vehicle drives through it, configured in accordance with one or more embodiments.

FIG. 12 shows a side-view diagram of a damage detection portal 1202 as a vehicle drives through it, configured in accordance with one or more embodiments. The damage detection portal 1202 is positioned on a ramp 1204. In this way, the camera 1208 can capture a frontal view of the vehicle head-on (i.e., a "hero shot") as the vehicle drives up the ramp before it levels off into the damage detection portal. Similarly, the camera 1206 can capture a rear view of the vehicle tail-on as the vehicle leaves the damage detection portal and drives down the ramp.

Figure 27:
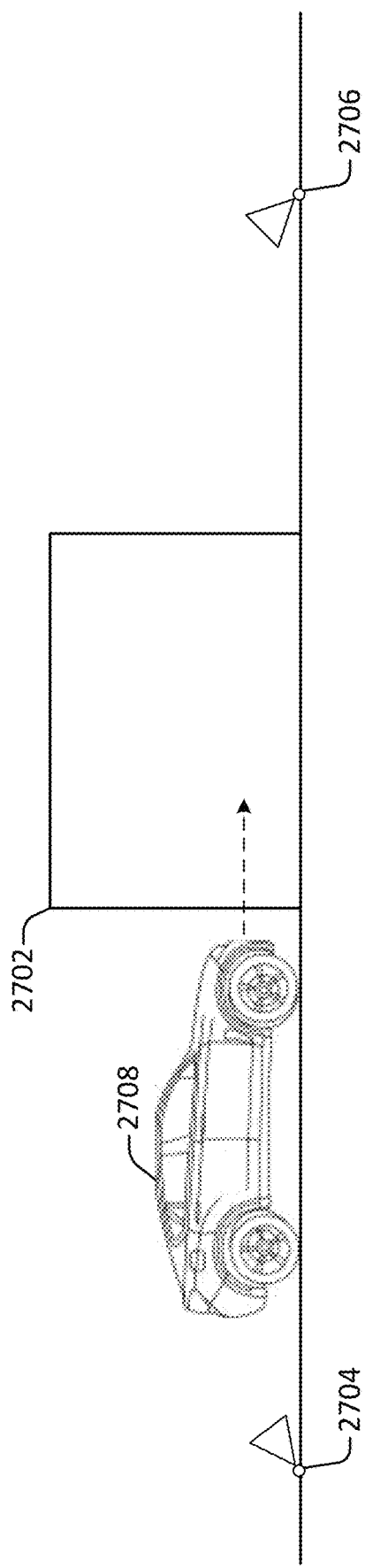
FIG. 27 shows a side-view of a damage detection portal as a vehicle drives through it, configured in accordance with one or more embodiments.

FIG. 27 shows a side-view of a damage detection portal 2702 as a vehicle 2708 drives through it, configured in accordance with one or more embodiments. The damage detection portal 2702 may include some number of cameras arranged as described with respect to FIGS. 6-12 or arranged in a different configuration. In addition, the damage detection portal 2702 may be configured to communicate with the cameras 2704 and/or 2706, which may capture images of the vehicle 2708 before and/or after it enters the damage detection portal 2702.

According to various embodiments, the diagrams shown in FIGS. 6-12 and 27 illustrate only a few of the possible configurations of a damage detection portal. Various configurations are possible and in keeping with the techniques and mechanisms described herein.

Figure 13:
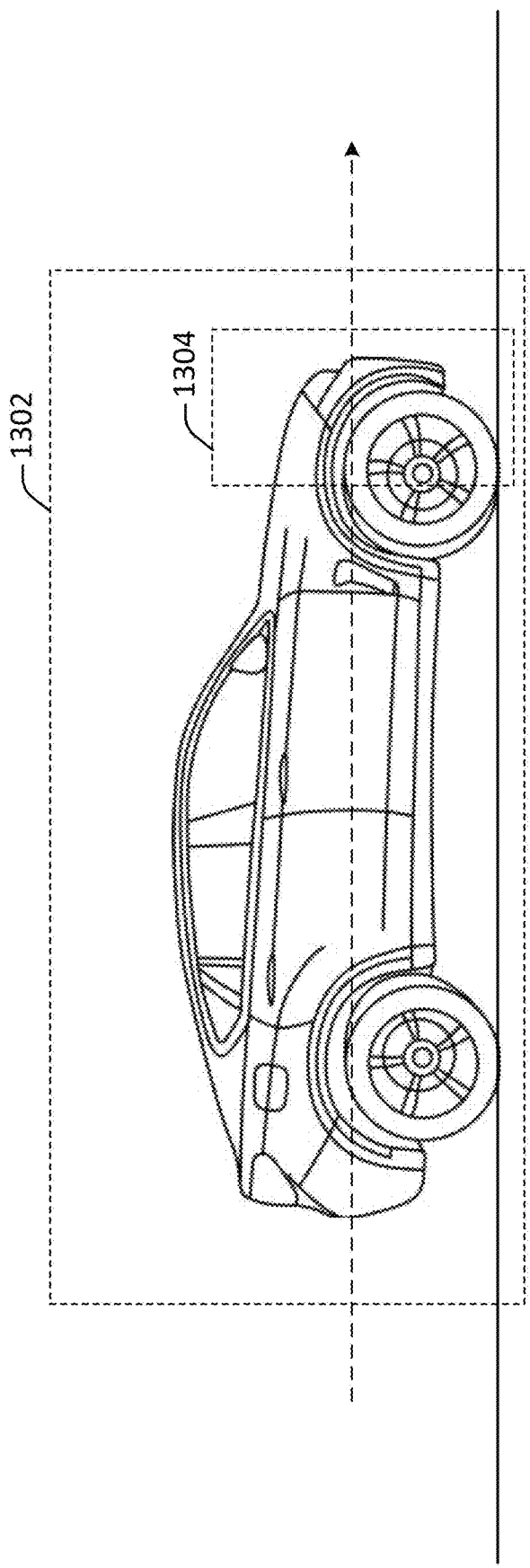
FIG. 13 illustrates the capture of image data via a damage detection portal, configured in accordance with one or more embodiments.

FIG. 13 illustrates the capture of image data via a damage detection portal, configured in accordance with one or more embodiments. According to various embodiments, one or more cameras may be configured to capture a whole-vehicle image such as the image 1302 as the vehicle drives through the portal. Alternatively, or additionally, one or more cameras may be configured to capture a closeup view such as the image 1304 as the vehicle drives through the portal. By combining these views, a user may be able to select a portion of a whole-vehicle image and then zoom in to a view captured by a closeup camera.

Figure 14:
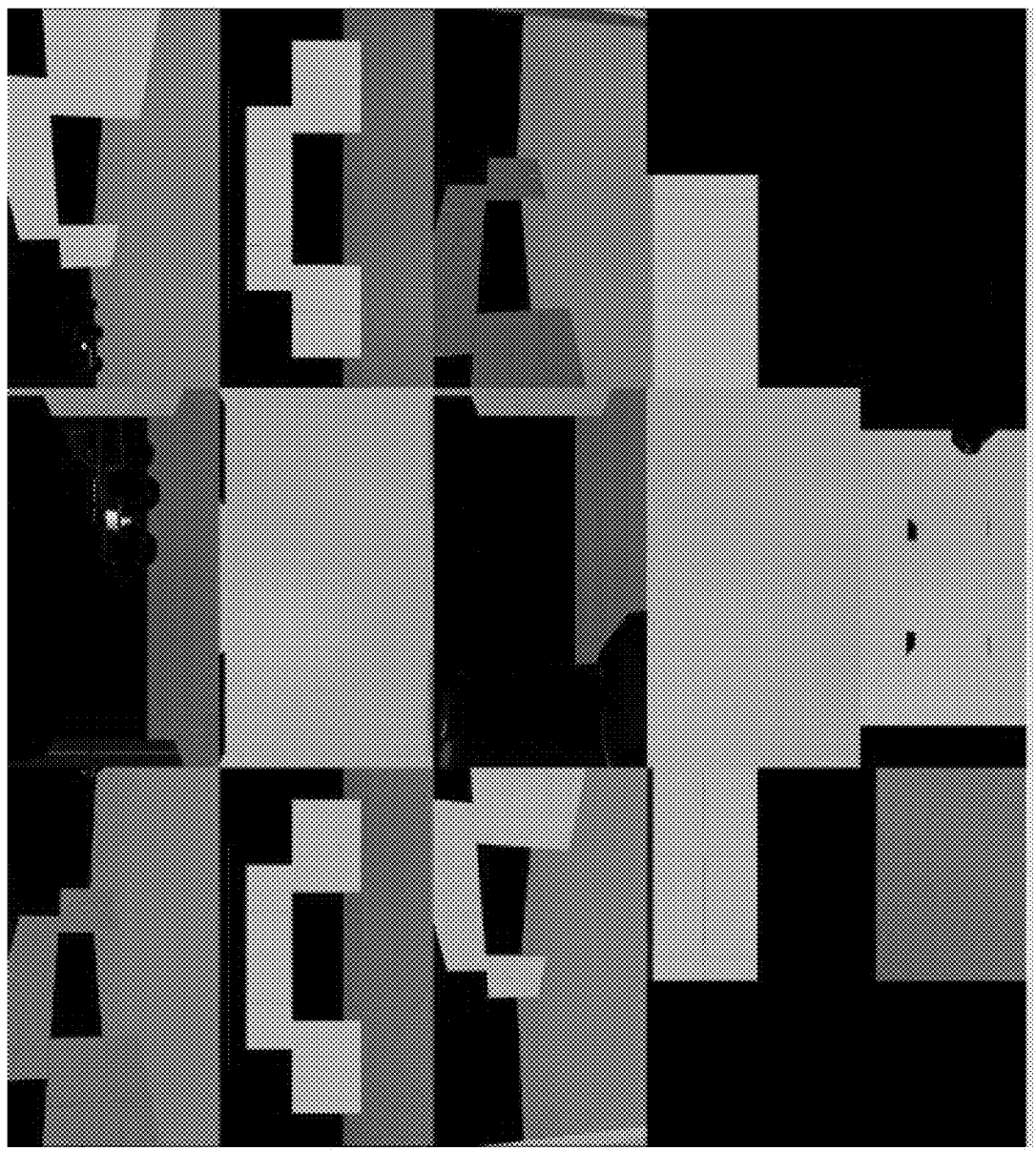
FIGS. 14-16 show simulated images generated from a damage detection portal, configured in accordance with one or more embodiments.
Figure 15:
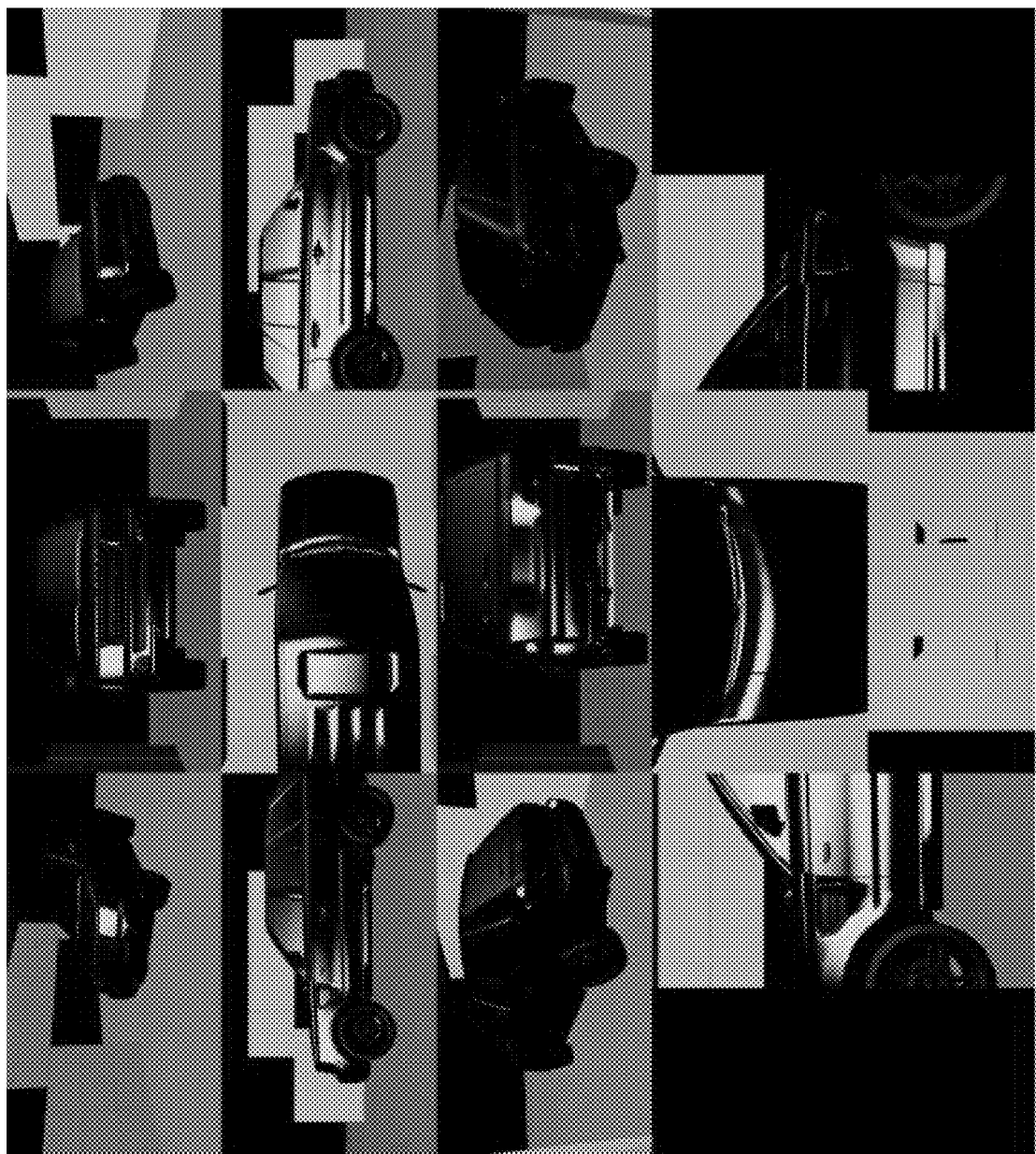
Figure 16:
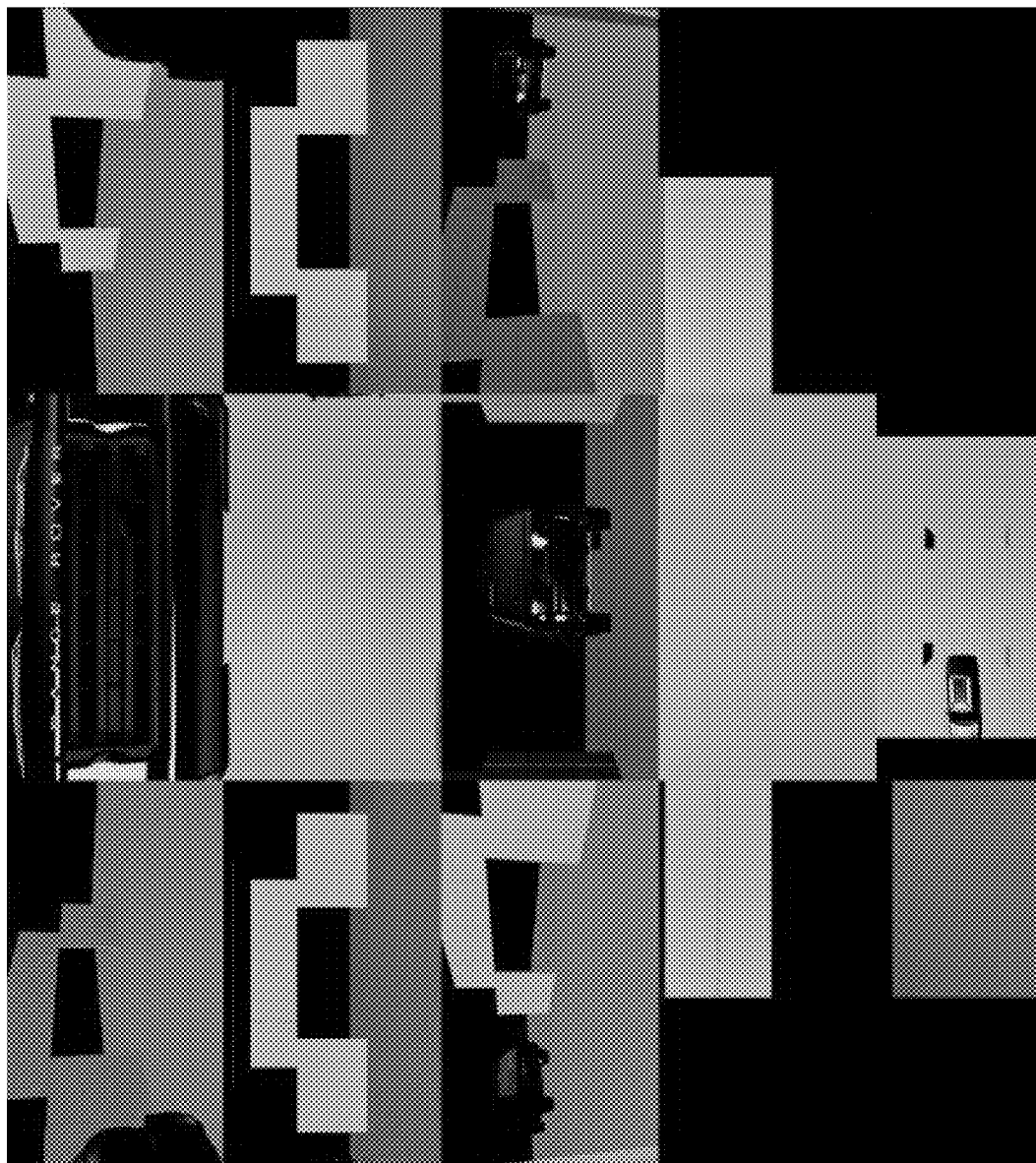

FIGS. 14-16 show simulated images generated from a damage detection portal, configured in accordance with one or more embodiments. In FIG. 14, a vehicle is shown prior to entering into the portal. In FIG. 15, the vehicle is shown in the portal. In FIG. 16, a vehicle is shown leaving the portal.

Figure 17:
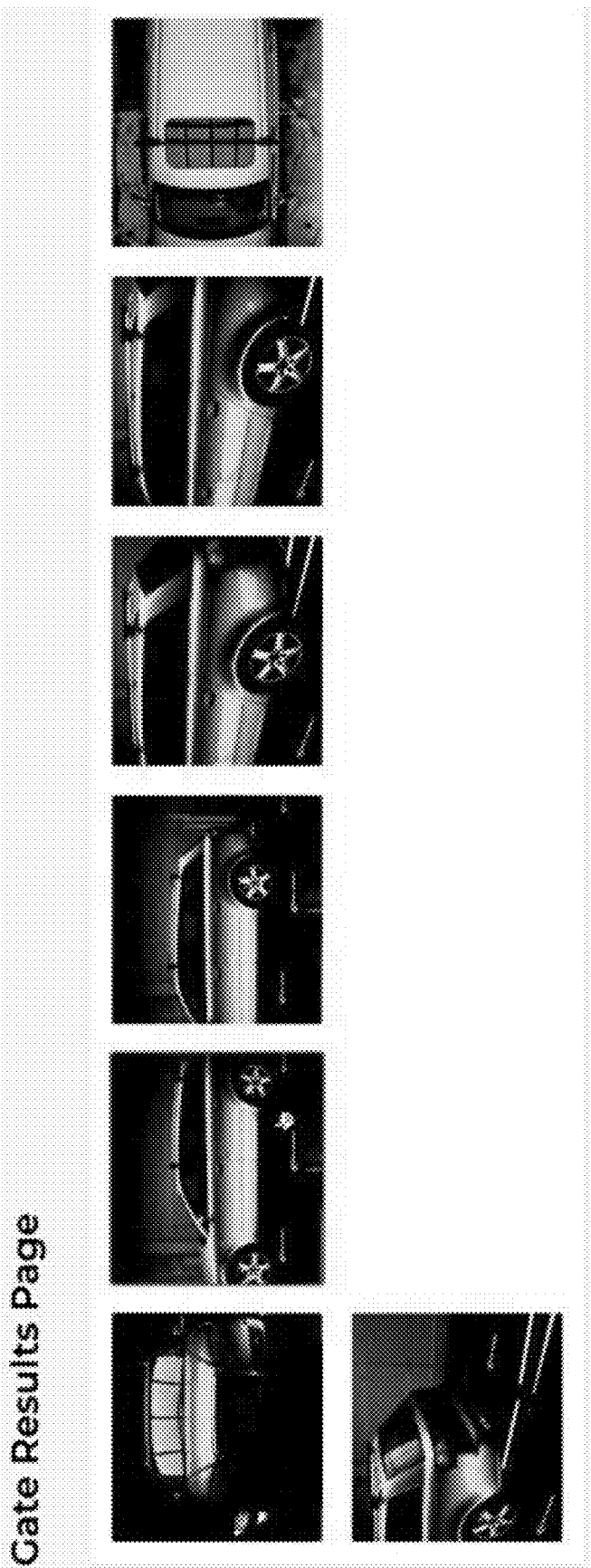
FIGS. 17-19 show images captured via a damage detection portal and presented in a user interface, generated in accordance with one or more embodiments.
Figure 18:
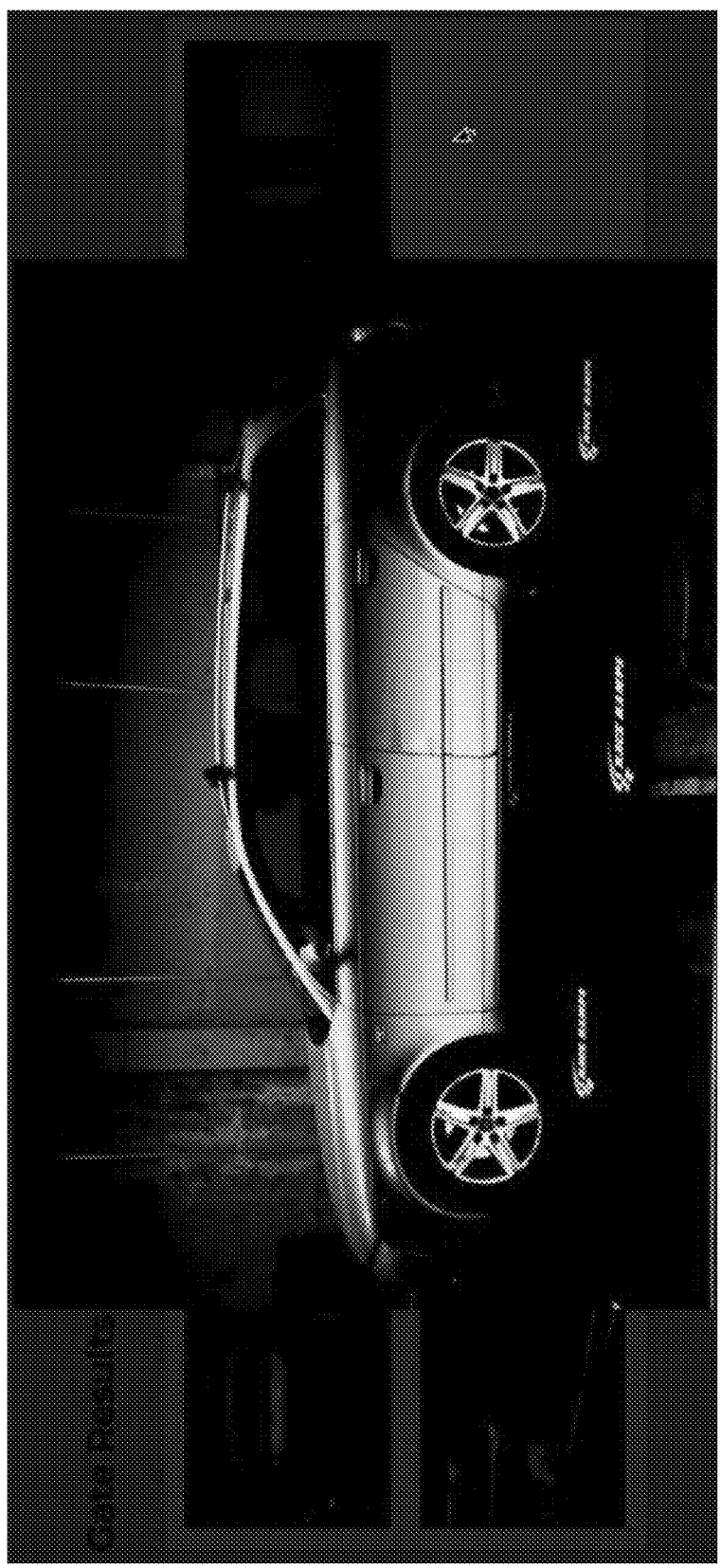
Figure 19:
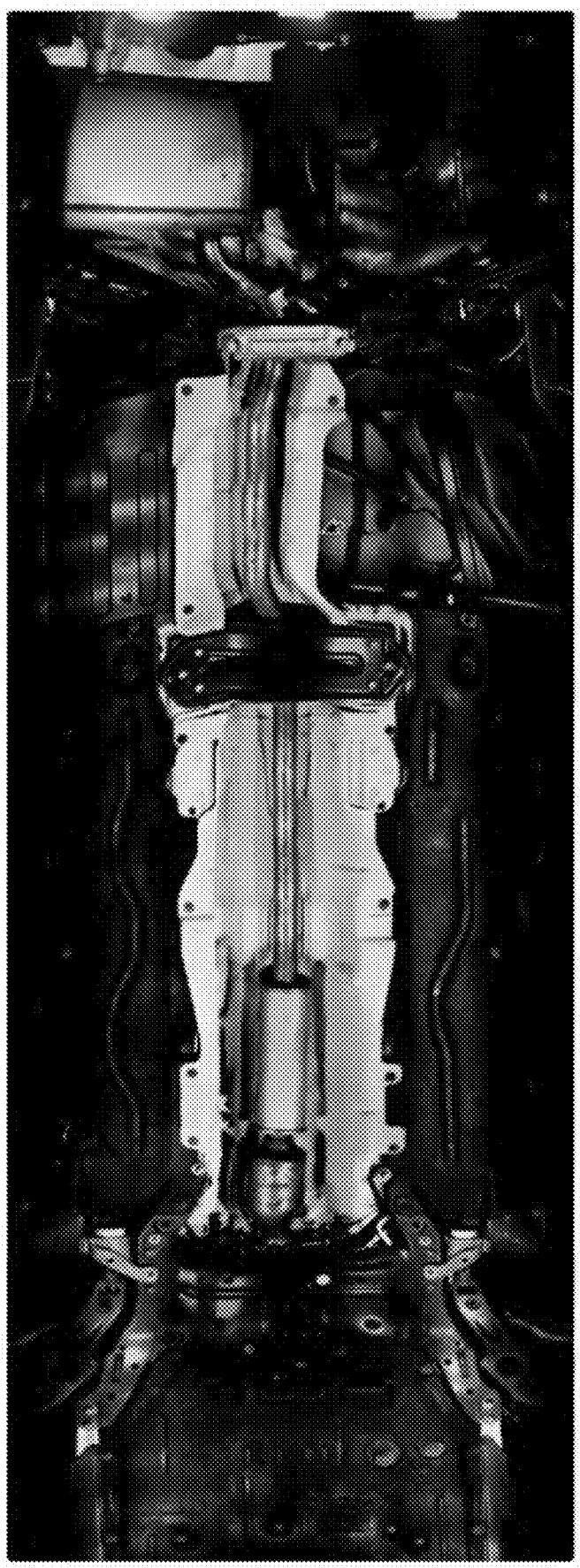

FIGS. 17-19 show images captured via a damage detection portal and presented in a user interface, generated in accordance with one or more embodiments. In FIG. 17, images of a vehicle captured from different perspectives are shown. When one of the images is selected, it may be enlarged, as shown in FIG. 18. As shown in FIG. 19, one or more images may be captured of the undercarriage of the vehicle.

Figure 20:
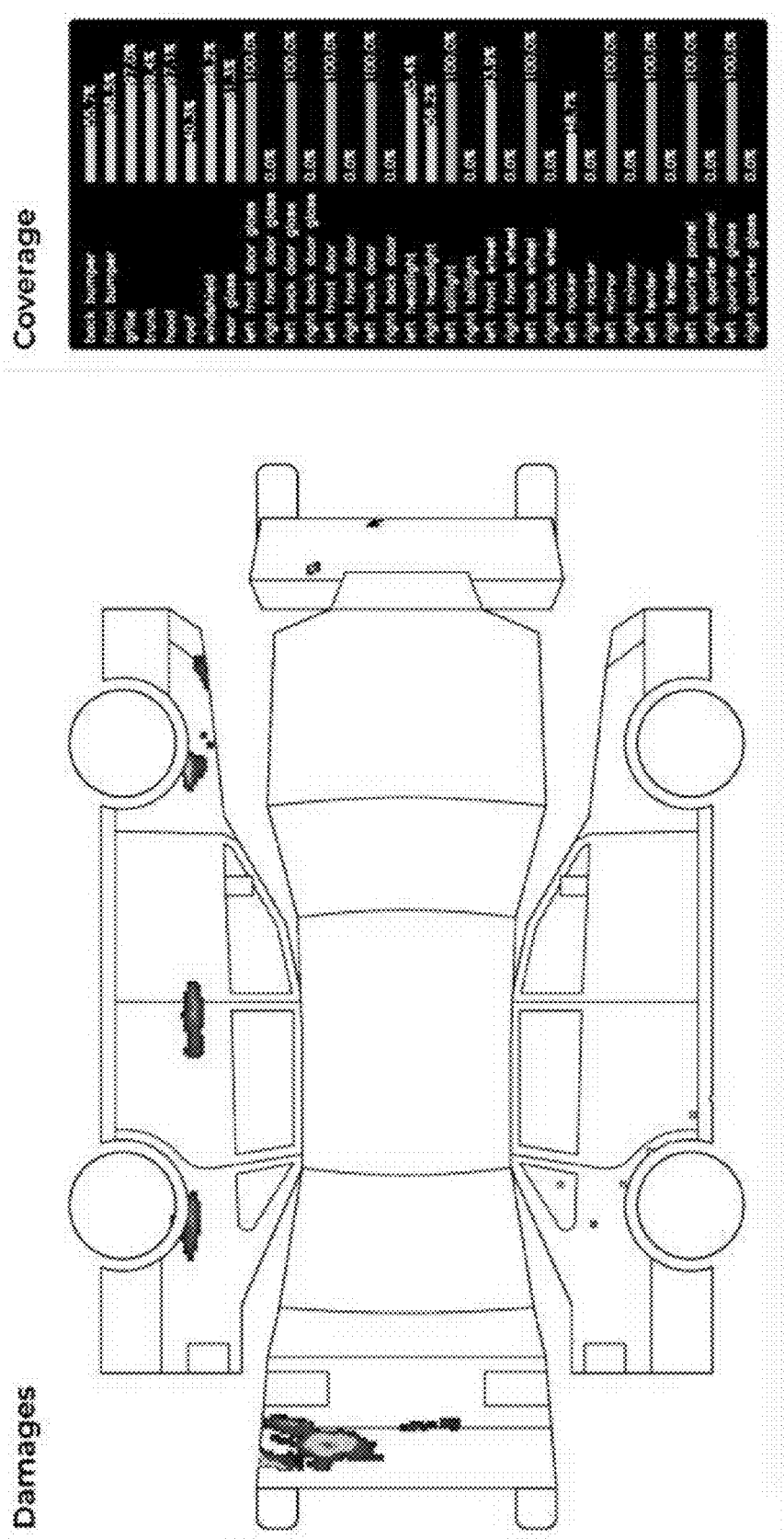
FIG. 20 illustrate a portion of the user interface in which detected damage is shown, configured in accordance with one or more embodiments.
Figure 21:
FIGS. 21-25 illustrate images captured via the damage detection portal and presented in the user interface, configured in accordance with one or more embodiments.
Figure 22:

FIG. 20 illustrate a portion of the user interface in which detected damage is shown, configured in accordance with one or more embodiments. In FIG. 20, detected damage is illustrated on a top-down view of the vehicle as a heatmap. On the right, a list of components of the vehicle is shown, along with a status bar and percentage indicating the degree of coverage provided by the captured images.

FIGS. 21-25 illustrate images captured via the damage detection portal and presented in the user interface, configured in accordance with one or more embodiments. In some embodiments, an image may be selected by clicking on or touching damage represented in the top-down view. For instance, clicking on or touching the damage shown on the left door panels in FIG. 20 may lead to the presentation of the image shown in FIG. 21.

Figure 23:
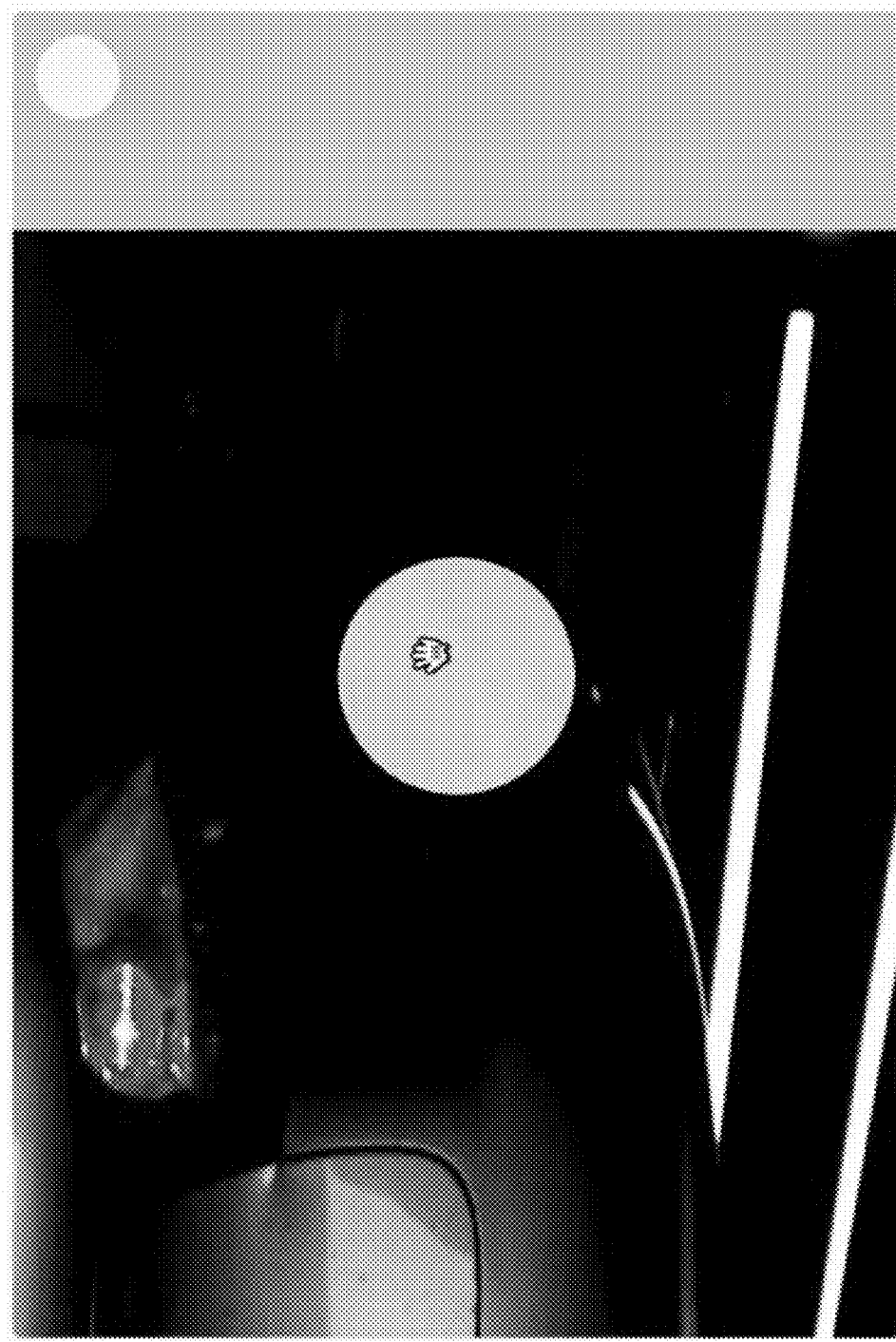
Figure 24:

In some implementations, a selected image may be a portion of a closeup multi-view interactive digital media representation (MVIDMR) of the selected region. The closeup MVIDMR may depict the selected portion of the vehicle from different perspectives. The user may navigate between these different perspectives by, for example, clicking and dragging a mouse, or touching and dragging on a touch screen. For example, in FIG. 21, the user has selected an area in the center of the image and then dragged to one side, leading the user interface to present the image shown in FIG. 22, which depicts the same area of the vehicle from a different perspective. A similar operation is shown in FIGS. 23 and 24, which depict a different closeup MVIDMR of the back left area of the vehicle.

Figure 25:
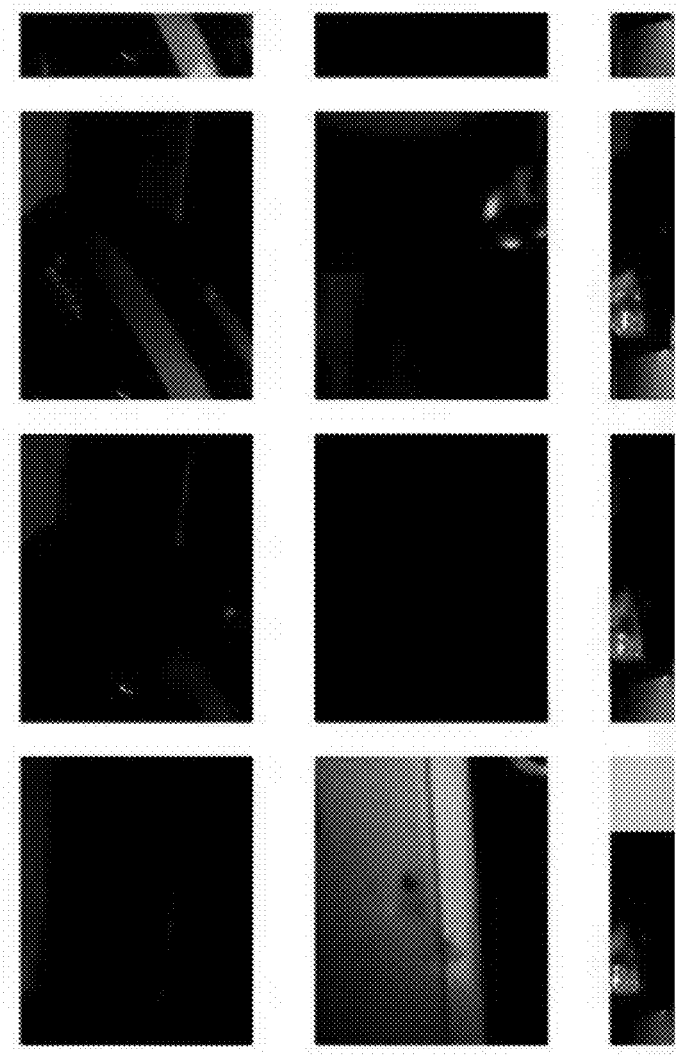

According to various embodiments, damage to the vehicle may be identified in a list, such as that shown in FIG. 25. The identified damage may include information such as the location that was damaged, the type of damage (e.g., a dent, or paint damage), a confidence level associated with the detected damage, and/or the severity of the damage.

Figure 26:
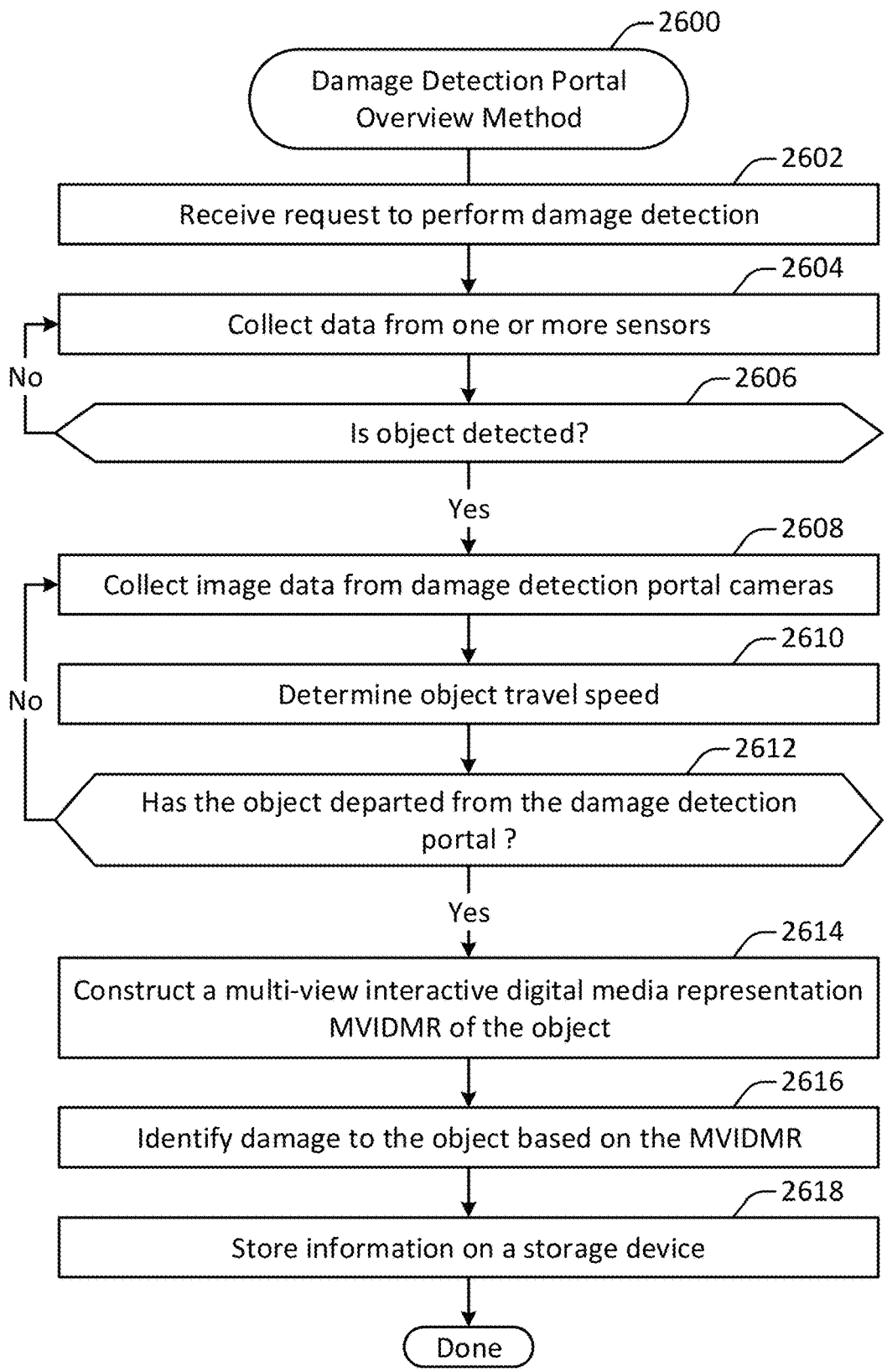
FIG. 26 illustrates an overview method for the operation of a damage detection portal, configured in accordance with one or more embodiments.

FIG. 26 illustrates an overview method 2600 for the operation of a damage detection portal, configured in accordance with one or more embodiments. According to various embodiments, the method 2600 may be performed at a damage detection portal or computing device in communication with a damage detection portal. Alternately, or additionally, some or all of the method 2600 may be performed at a remote computing device such as a server. The method 2600 may be used to detect damage to any of various types of objects. However, for the purpose of illustration, many examples discussed herein will be described with reference to vehicles.

A request to perform damage detection is received at 2602. According to various embodiments, the request may be based on user input. For instance, a user may transmit a request to initiate damage detection. Alternatively, or additionally, the request may be automatically generated. For instance, damage detection may begin automatically when the system is activated.

Data from one or more sensors is collected at 2604. According to various embodiments, the sensor data may include information collected from one or more pressure sensors, cameras, light sensors, or any other suitable sensors.

A determination is made at 2606 as to whether an object is detected. In some implementations, the sensor data may be used to determine when an object is approaching the damage detection portal. The determination may be limited, for instance detecting whether a laser sensor has been interrupted or a pressure panel has been tripped. Alternatively, the determination may involve performing sophisticated object recognition based on visual data collected from one or more cameras.

When an object is detected, then at 2608 image data from one or more damage detection portal cameras is collected. As discussed herein, a damage detection portal may have multiple cameras that capture image data of the object at different angles and from different viewpoints.

Object travel speed is determined at 2610. In some implementations, the object travel speed may be determined based on one or more sensors such as cameras, pressure sensors, laser sensers, radar sensors, sonar sensors, or any other suitable sensors. The object travel speed may be used to inform the rate at which visual data is captured. For instance, visual data capture may be adjusted so as to capture a relatively constant amount of visual data regardless of object speed. When a vehicle is traveling faster, for example, cameras may be configured to capture images at a more rapid pace than when a vehicle is traveling more slowly.

A determination is made at 2612 as to whether the object has departed from the damage detection portal. According to various embodiments, the determination may be made based on one or more of a combination of data sources. For example, a pressure sensor may detect when an object has moved away from the portal. As another example, image information may be used to determine that an object is no longer present in the area of the portal. As yet another example, a laser or other sensor may be detect when an object has passed a designated point along a path.

When the object has departed from the damage detection platform, an MVIDMR of the object is constructed at 2614. According to various embodiments, image data may be used to construct an overall MVIDMR of the entire object. Additionally, one or more focused MVIDMRs may be constructed of particular areas or components of the object. For example, a focused MVIDMR of a vehicle component may be constructed. As another example, a focused MVIDMR of a portion of a vehicle in which damage has been detected may be constructed.

Damage to the object based on the MVIDMR is identify at 2616. According to various embodiments, any of a variety of techniques may be used to perform damage detection. Examples of such damage detection techniques are described throughout the application, for instance with respect to the FIGS. 1-5.

Information is stored on a storage device at 2618. According to various embodiments, storing the information may involve transmitting information via a communication interface over a network to a remote storage location and/or storing the information on a local storage device. The information stored may include, but is not limited to: raw image and/or video data, sound data captured as the object passed through the portal, one or more MVIDMRs constructed as discussed at operation 2616, and/or damage detection information determined as discussed at operation 2616.

According to various embodiments, although the configuration of cameras is referred to herein as a damage detection portal, the configuration of cameras may be used for other purposes, such as to record a video of the vehicle that includes multiple perspectives.

According to various embodiments, although the object captured by the damage detection portal is referred to herein as a vehicle, information about other types of objects may be captured in a similar fashion. For example, a damage detection portal may be used to capture information about a patient in a medical setting. As another example, a damage detection portal may be used to capture information about an individual for security purposes. As yet another example, a damage detection portal may be used to capture information about animals. As still another example, a damage detection portal may be used to capture information about objects on an assembly line. A variety of configurations and applications are possible.

Figure 28:
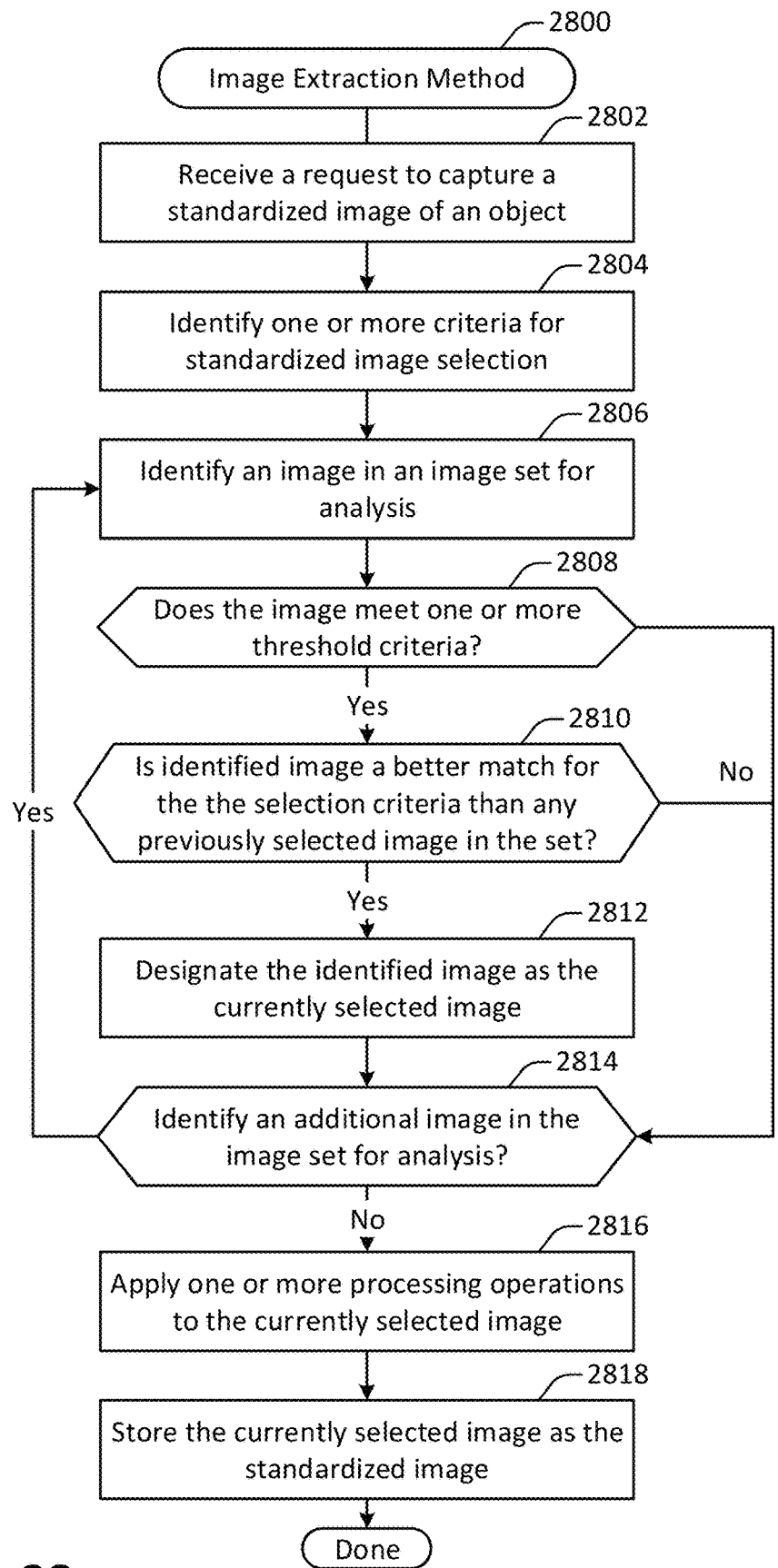
FIG. 28 illustrates an image extraction method, performed in accordance with one or more embodiments.

FIG. 28 illustrates an image extraction method 2800, performed in accordance with one or more embodiments. The method 2800 may be used to select one or more standardized images from a set of images.

In some implementations, a standard image may be an image of an object that is captured from a relatively standardized position relative to an object. For example, one standard image of a vehicle may be captured by a camera located directly in front of and slightly above the vehicle. As another example, another standard image of the vehicle may be captured by a camera located at a 30-degree angle from the front right of the vehicle. As discussed herein, various types of criteria may be used to specify a standardized image.

According to various embodiments, standard images may be used in a variety of contexts. For example, automotive wholesale and retail operations often employ a set of standard images to present cars to potential buyers. When using conventional techniques, obtaining these images in a consistent and efficient way is often challenging and requires a significant amount of training for human camera operators.

At 2802, a request to capture a standardized image of an object is received. In some implementations, the request may be generated based on user input. Alternatively, the request may be generated as part of an automatic process.

One or more criteria for selecting a standardized image are identified at 2804. According to various embodiments, a variety of selection criteria may be used. A few of the possible selection criteria are described in the following paragraphs.

In a first example, a selection criteria may be related to the portion of an image frame occupied by an object. For instance, an image of an object in which the object occupies a greater percentage of the image frame may be designated as a superior standardized image.

In a second example, a selection criteria may be related to a location within the image frame occupied by the object. For instance, an image of an object in which the object occupies a central position within the image frame, and/or a portion of the image frame with the best focus, may be designated as a superior standardized image.

In a third example, a selection criteria may be related to a distance between the object and the camera. For instance, an image of an object may be designated as a superior standardized image when the distance between the object and the camera is closer to a designated distance.

In a fourth example, a selection criteria may be related to object orientation. For instance, an image of an object may be designated as a superior standardized image when the object is located more closely with a designated orientation with respect to the camera.

In a fifth example, a selection criteria may be related to feature coverage. For instance, an image of an object may be designated as a superior standardized image when one or more designated features of the object are captured more completely in the image frame.

In particular embodiments, more than one selection criteria may be used. In such a configuration, one or more configuration parameters may be used to specify how to balance between the various selection criteria. For example, a standardized image may be identified as (1) being captured from within a particular range of angular orientations with respect to the object, (2) being captured from within a particular range of distances from the object, (3) including all of the object within the image frame, and (4) maximizing the portion of the image frame occupied by the object.

At 2806, an image in an image set is identified for analysis. According to various embodiments, image sets may be captured in any of various ways. For example, a fixed camera setup may be used, where the object (e.g., a vehicle) is moved past one or more cameras. As another example, the object may remain fixed, while one or more cameras are moved around the object. For instance, a person may capture images of the object using a hand-held camera or mobile computing device such as a mobile phone.

In particular embodiments, images may be analyzed from the image set in any suitable order. For example, images may be analyzed in sequence, in parallel, at random, or in any suitable order. As another example, images may be pre-processed to identify candidate images that are more likely to meet one or more selection criteria.

At 2808, a determination is made as to whether the identified image meets one or more threshold criteria. According to various embodiments, as discussed above, one or more selection criteria may be used. For instance, an image may only be suitable as a standardized image if it is identified as (1) being captured from within a particular range of angular orientations with respect to the object, (2) being captured from within a particular range of distances from the object, and (3) including all of the object within the image frame.

At 2812, a determination is made as to whether the identified image is a better match for the selection criteria than any previously selected image in the set. When the image is so identified, then at 2812 it is designated as the currently selected standardized image. For example, of the images identified at 2808 as meeting the threshold selection criteria, the image in which the object occupies a greater proportion of the image frame may be identified as the superior image.

At 2814, a determination is made as to whether to identify an additional image in the image set for analysis. In some implementations, each image in the image set may be analyzed. Alternatively, or additionally, successive images may be analyzed until one is identified that sufficiently meets the criteria for a standardized image.

At 2816, one or more processing operations are optionally applied to the currently selected image. In some implementations, one or more of a variety of processing operations may be employed. For example, an image may be improved, for instance by blurring the background around the object. As another example, the object may be segmented out from the frame and background, and the background may be blurred or replaced with a custom background for imaging purposes.

At 2818, the currently selected image is stored as the standardized image. According to various embodiments, storing the image may involve transmitting the image to a local or remote storage device.

Figure 29:
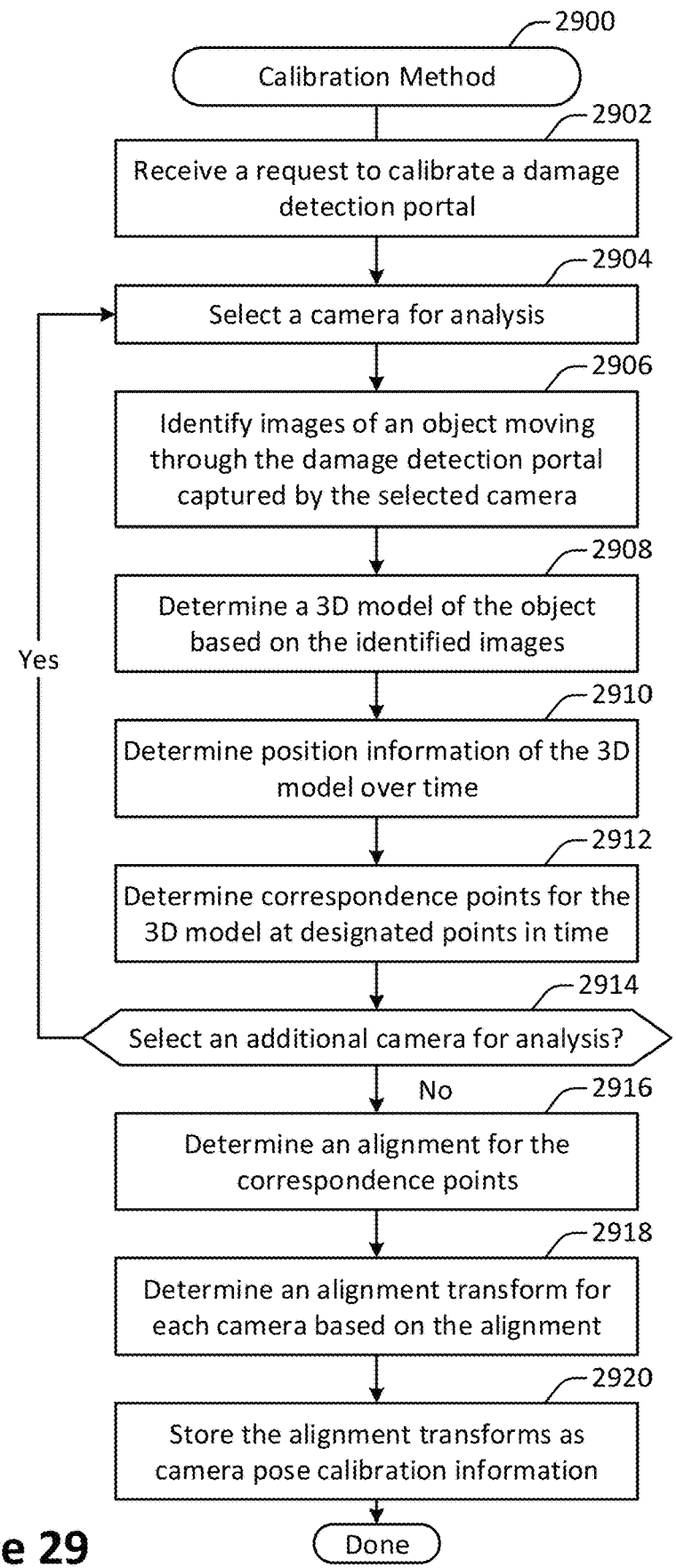
FIG. 29 describes a method for calibrating a damage detection portal, performed in accordance with one or more embodiments.

FIG. 29 describes a method 2900 for calibrating a damage detection portal, performed in accordance with one or more embodiments. The method 2900 may be performed at a computing device in communication with a damage detection portal such as the portals discussed throughout the application as filed.

A request to calibrate a damage detection portal is received at 2902. In some implementations, the request may be generated based on user input. Alternatively, or additionally, the request may be generated automatically. For instance, the request may be generated when the damage detection portal is first activated, when the position of a camera changes, or at periodic intervals.

A camera is selected for analysis at 2904. As discussed herein, a damage detection portal may be associated with multiple cameras configured in fixed positions. According to various embodiments, cameras may be selected for analysis in sequence, at random, in parallel, or in any suitable order.

Images of an object moving through the damage detection portal captured by the selected camera are identified at 2906. In some implementations, the images may be of a three-dimensional object such as a vehicle. Alternately, a two-dimensional object such as an flat surface may be used.

In some implementations, the object moving through the damage detection portal may be an object for which the portal is configured to detect damage. Alternatively, a calibration object such as a checkerboard printed on a flat surface may be used.

If a three-dimensional object is used, then at 2908 a three-dimensional model of the object is determined based on the identified images. Then, at 2910, timing information identifying when the images were captured may be used to determine a position of the 3D model with respect to the camera over time. At 2912, one or more correspondence points for the 3D model at designated points in time may be determined. Each correspondence point may correspond to a particular identifiable portion of the object, such as a joint in a skeleton frame of the object.

In the event that a two-dimensional calibration print such as a checkerboard is used for calibration, then operations 2908-2912 may involve determining a position of the camera relative to one or more points on the calibration print at one or more designated points in time.

A determination is made at 2914 as to whether to select an additional camera for analysis. In some implementations, each camera in the damage detection portal may be analyzed until all cameras have been calibrated.

An alignment for the correspondence points is determined at 2916. For example, the alignment may be determined by identifying correspondence points that are known to two or more cameras at the same time. For instance, different three-dimensional models may be constructed based on images captured from two different cameras. However, the different three-dimensional models may share correspondence points such as the same joint in a three-dimensional skeleton of the object. Because the time at which each image is captured is recorded, a determination can be made that a given alignment point has a first position with respect to one camera and a second position with respect to a second camera. Such information may be determined for multiple alignment points and multiple cameras.

An alignment transform is then determined at 2918 for each camera based on the alignment. The alignment transform may identify the relative position and direction of the camera with respect to the alignment points at a designated point in time. The alignment transforms are stored as camera pose calibration information at 2920. That is, the relative position of the cameras with respect to known correspondence points provides the alignment information that may be subsequently used to process and aggregate visual data collected by the cameras.

Figure 30:
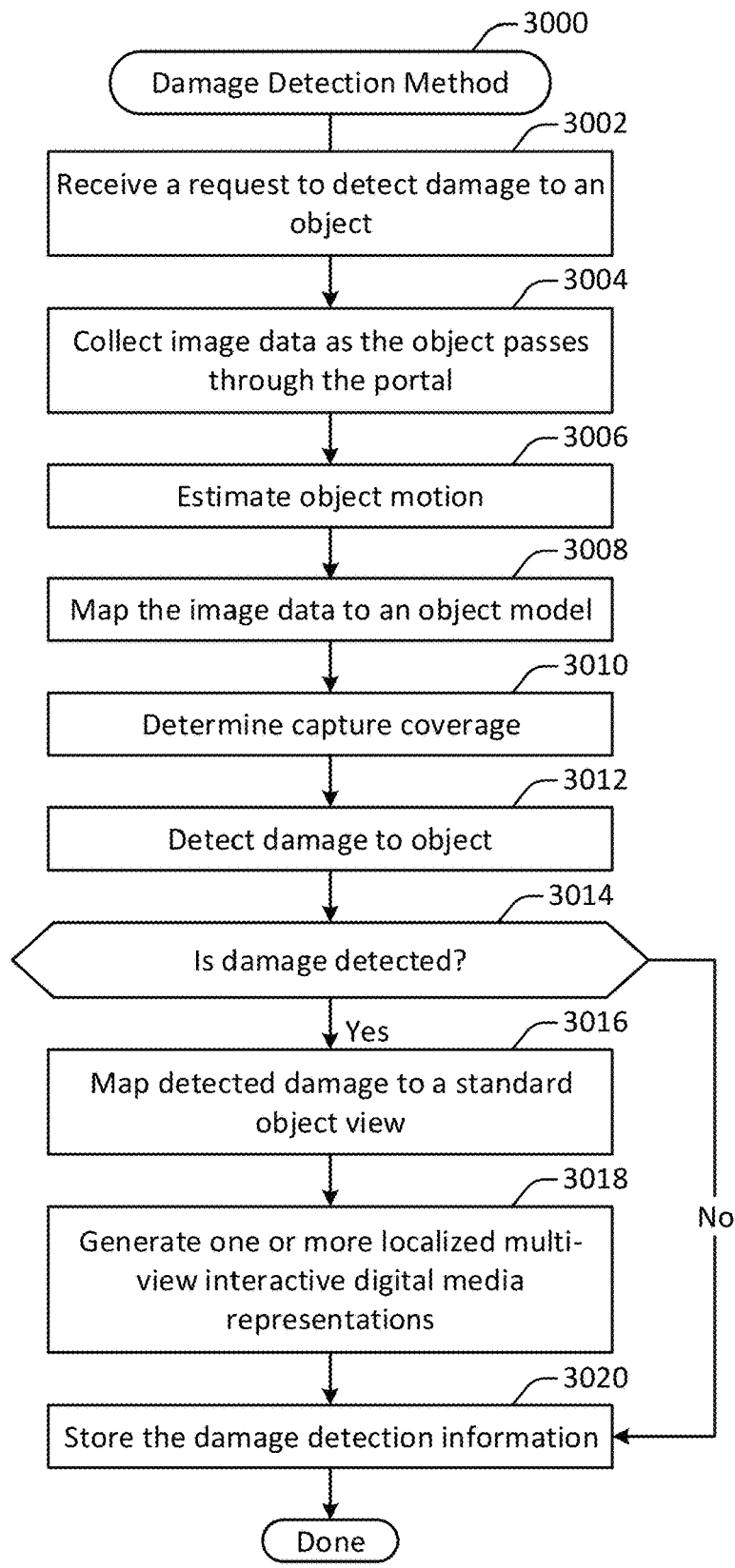
FIG. 30 illustrates a method for damage detection, performed in accordance with one or more embodiments.

FIG. 30 illustrates a method 3000 for damage detection, performed in accordance with one or more embodiments. According to various embodiments, the method 3000 may be performed at a computing device in communication with a damage detection portal.

A request to detect damage to an object is detected at 3002. In some implementations, the request may be generated based on user input. Alternatively, or additionally, the request may be generated automatically. For instance, the request may be generated when the damage detection portal detects that an object has entered or is predicted to enter the damage detection portal. Such a determination may be made based on input from one or more cameras, pressure sensors, laser sensors, or other such sensors.

Image data of the object is collected at 3004. In some implementations, the image data may include sets of images captured by different cameras associated with the damage detection portal. Each of the images may be associated with a synchronized time stamp. In particular embodiments, the cameras may be synchronized to capture images at the same time so that the object may be captured simultaneously from different perspectives.

Motion of the object is estimated at 3006. According to various embodiments, motion may be estimated for images captured by one or more of the cameras. Then, motion estimation information may be propagated to other cameras associated with the damage detection portal. The motion information may be determined by estimating an object model associated with the object. Then, a location of the object model may be determined at successive points in time.

The image data is mapped to an object model at 3008. In some implementations, image data may be mapped if the damage detection portal has been calibrated. In such a configuration, a semantic mesh may be generated according to the motion estimation. The mesh may then be mapped to each frame based on the extrinsic camera calibration information. For instance, after the motion of an object such as a vehicle has been estimated, then the position of the object model with respect to each camera at a designated point in time may be determined based on the known relation of the cameras to one another. Then, damage may be mapped to the object model (e.g., a two-dimensional top-down view) through the semantic mesh.

FIGS. 32-35 illustrate examples of a semantic mesh, generated in accordance with one or more embodiments. The semantic mesh is generated based on multiple perspective view images. Because each image is mapped to a top-down view, the semantic mesh can be mapped back to the perspective view images.

FIGS. 36-41 illustrate examples of a component analysis applied to the semantic mesh, performed in accordance with one or more embodiments. In FIGS. 36-41, different components of the vehicle, such as door panels, wheels, windshields, and windows, are shown in different colors.

According to various embodiments, image data may be mapped if the damage detection portal is uncalibrated. In such a configuration, a procedure such as a neural network may be run for each frame to map the pixels of the frame to a standardized object model such as a two-dimensional top-down view of an object.

Capture coverage information is determined at 3010. In some implementations, the capture coverage information may indicate portions of the vehicle that have been captured, or not, in the detected image data. For example, the capture coverage information may indicate which panels of a vehicle are covered in the image data, and provide an indication of the degree of coverage, such as a percentage. Such information may be determined by reasoning about the object model (e.g., a two-dimensional top-down image or a three-dimensional skeleton model of the object).

Damage to the object is detected at 3012. Techniques for detecting damage are discussed throughout the application. At 3014, a determination is made as to whether damage is detected. If damage is detected, then the detected damage is mapped to a standard object view at 3016.

In some implementations, damage detection may involve aggregating information from various cameras. For example, multiple cameras may each capture multiple views of a vehicle door from multiple viewpoints as the vehicle passes through the damage detection portal. When the damage detection portal has been calibrated, these different viewpoints may be correlated so that the same portion of the vehicle is captured from different known perspectives at the same point in time. This information may then be used to provide an aggregated and/or filtered damage estimate, for instance in a standard top-down view of the object.

In particular embodiments, damage detection information may be used to reason about the damage in a standard object model such as a two-dimensional top-down view or a three-dimensional skeleton. For example, the aggregated information may be used to determine that a dent to a vehicle covers half of the right front door in the object model, so the aggregated damage information may include information indicating that 50% of the right front door has been damaged.

One or more localized multi-view interactive digital media representations (MVIDMRs) at 3018. In some implementations, an MVIDMR of a portion of the object identified as damaged may be automatically generated when damage is detected. Alternatively, or additionally, an MVIDMR may be generated of a designated portion of the object regardless of whether damage has been detected. Additional techniques relating to localized MVIDMR generation are discussed with respect to the method 3100 shown in FIG. 31.

The damage detection information is stored at 3020. In some implementations, storing the damage detection information may involve accessing a local storage device. Alternatively, or additionally, the damage detection information may be transmitted to a remote device via a network.

Figure 31:
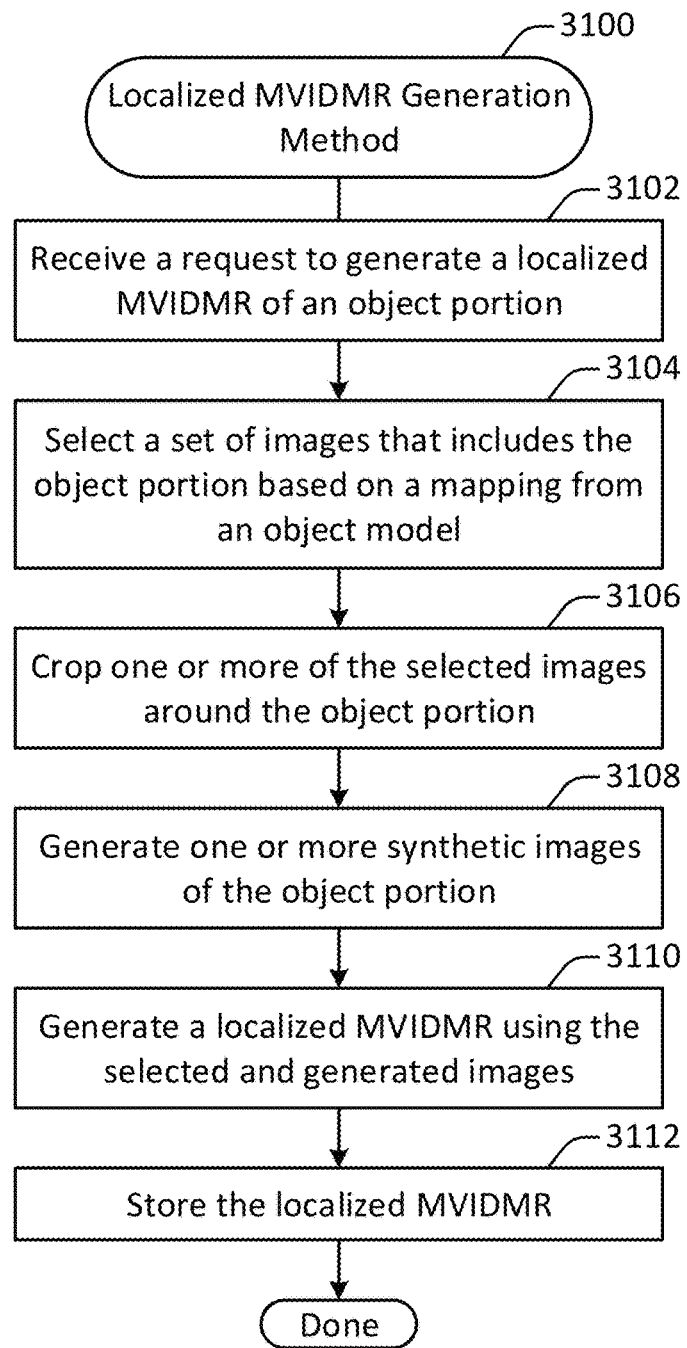
FIG. 31 illustrates a method for localized MVIDMR generation, performed in accordance with one or more embodiments.
Figure 32:
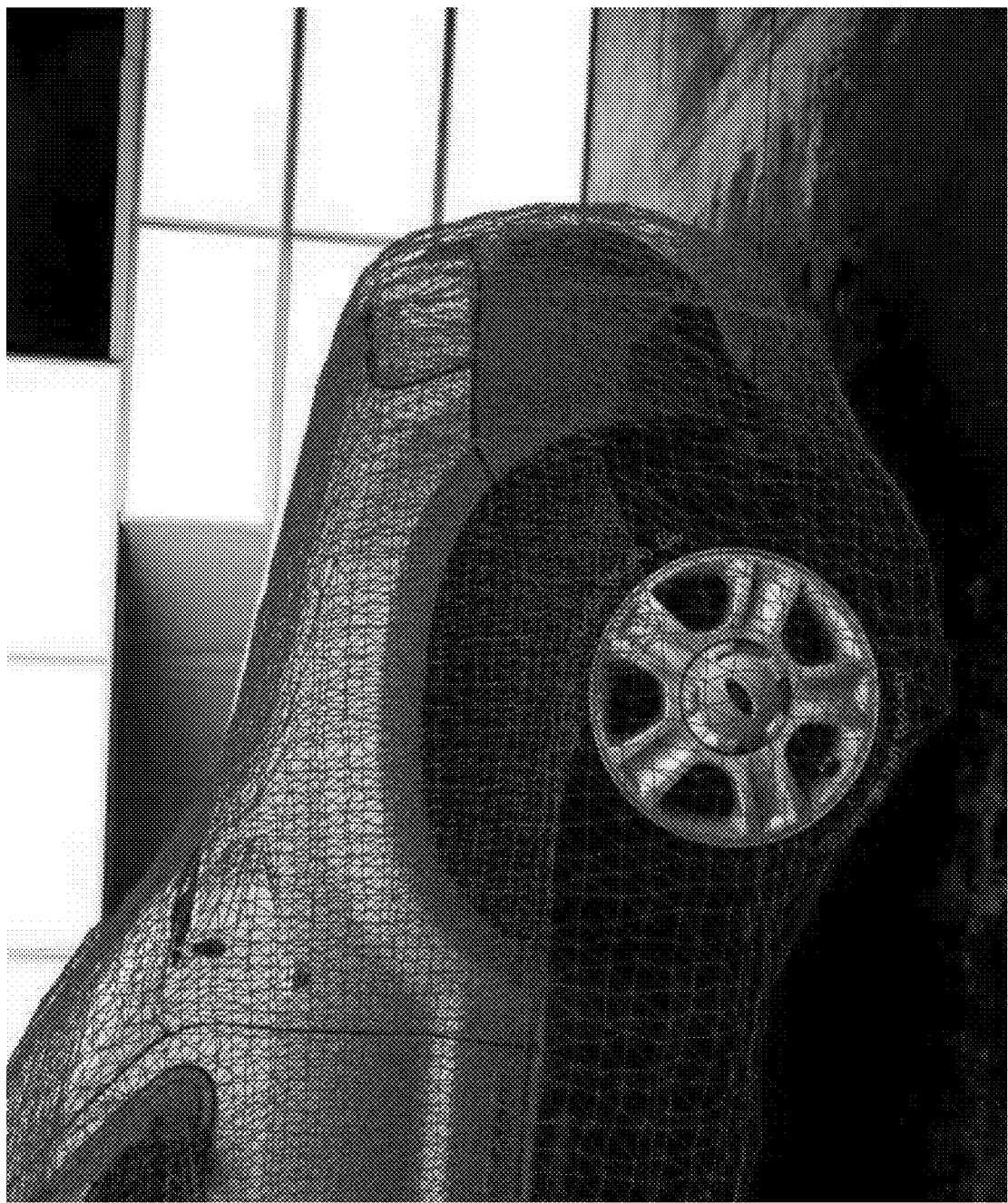
FIGS. 32-35 illustrate examples of a semantic mesh, generated in accordance with one or more embodiments.
Figure 33:
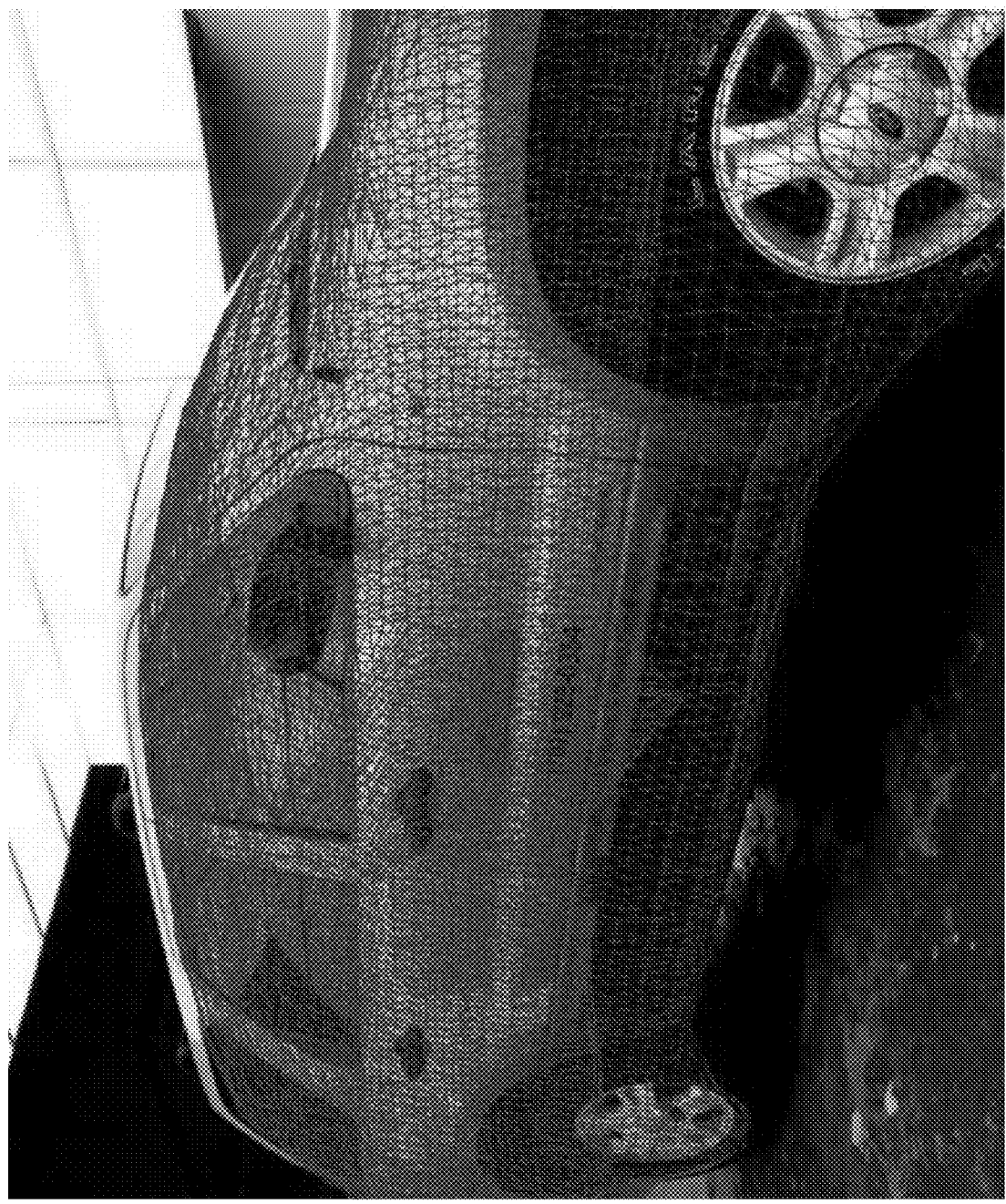
Figure 34:
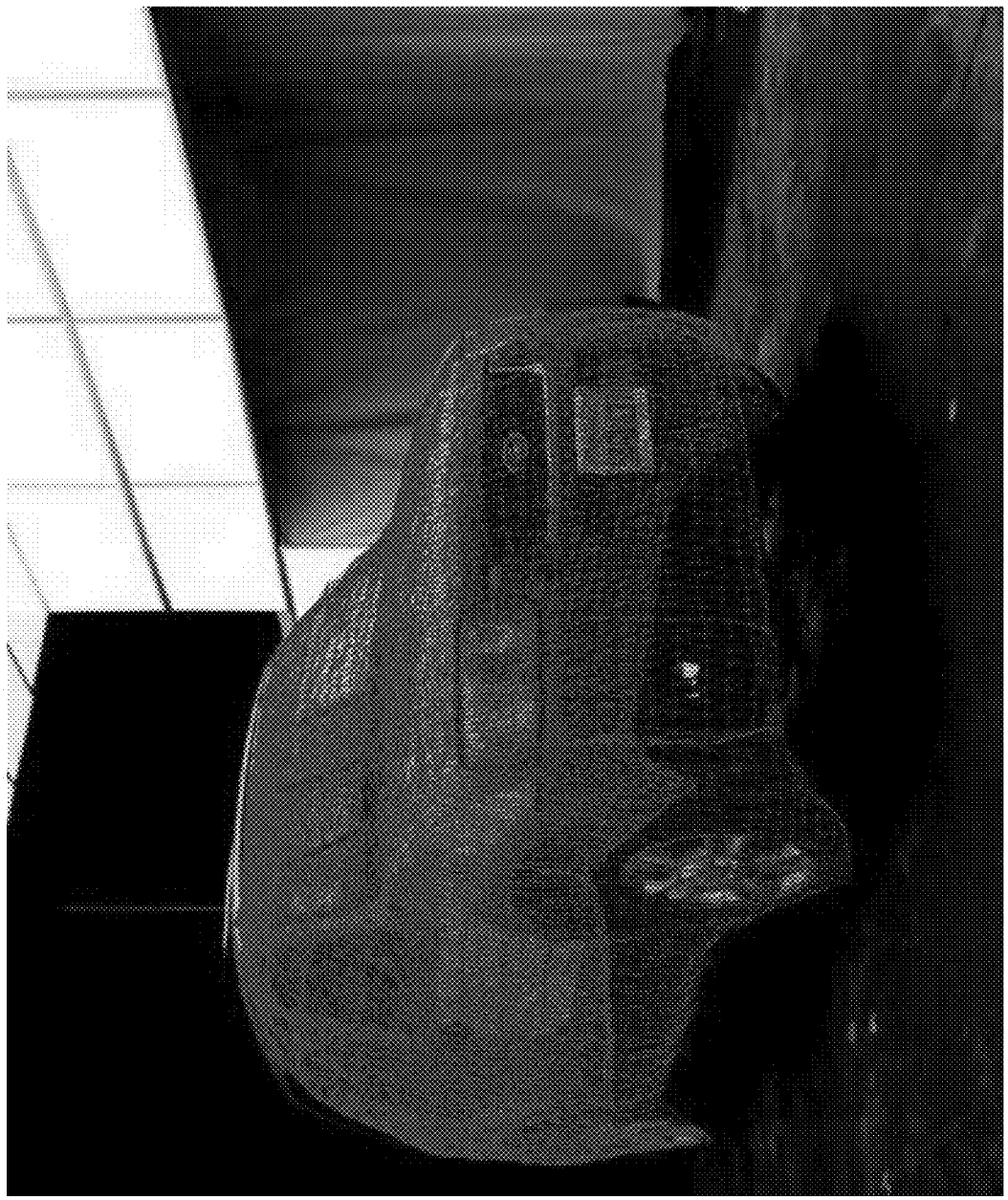
Figure 35:
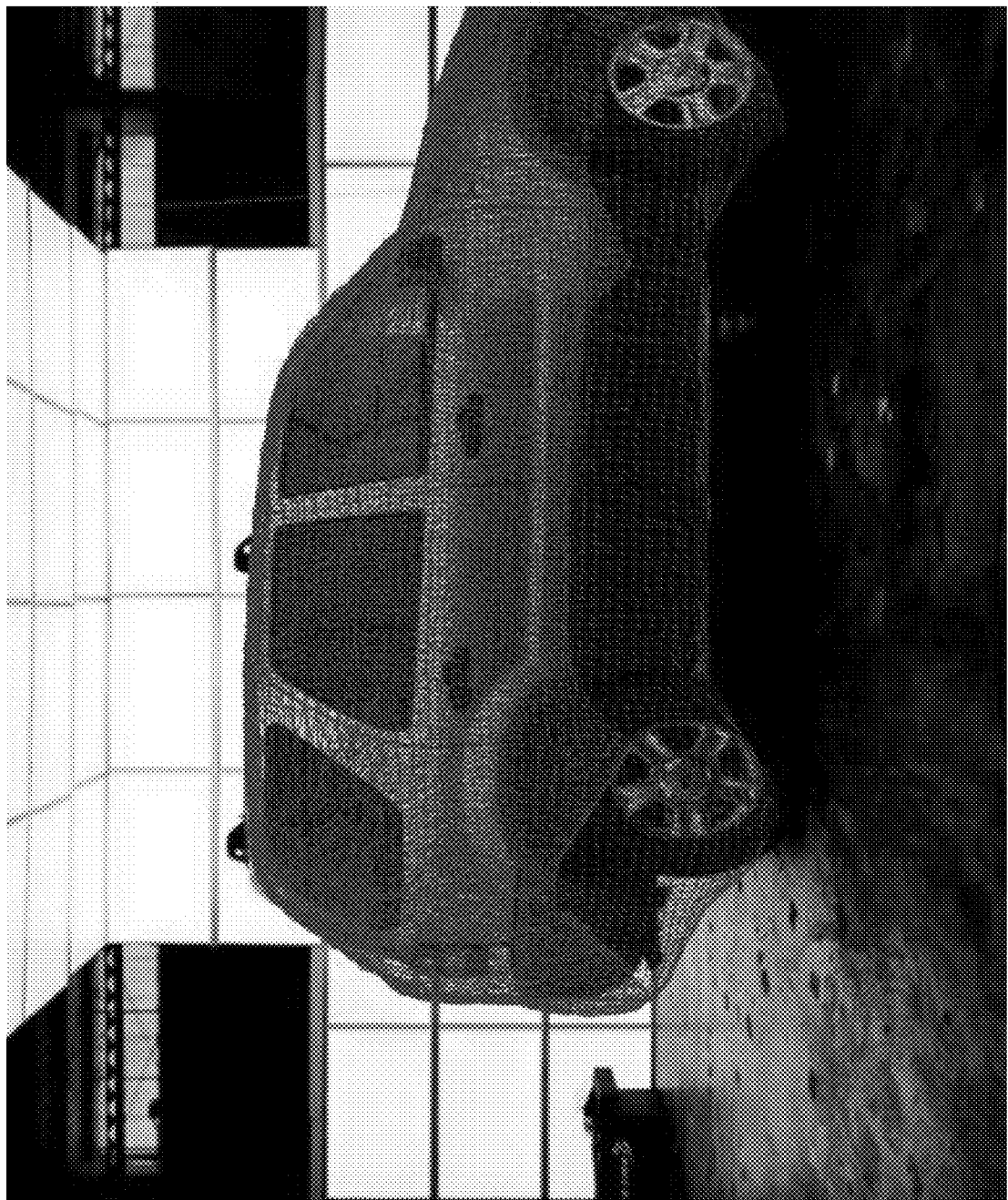
Figure 36:
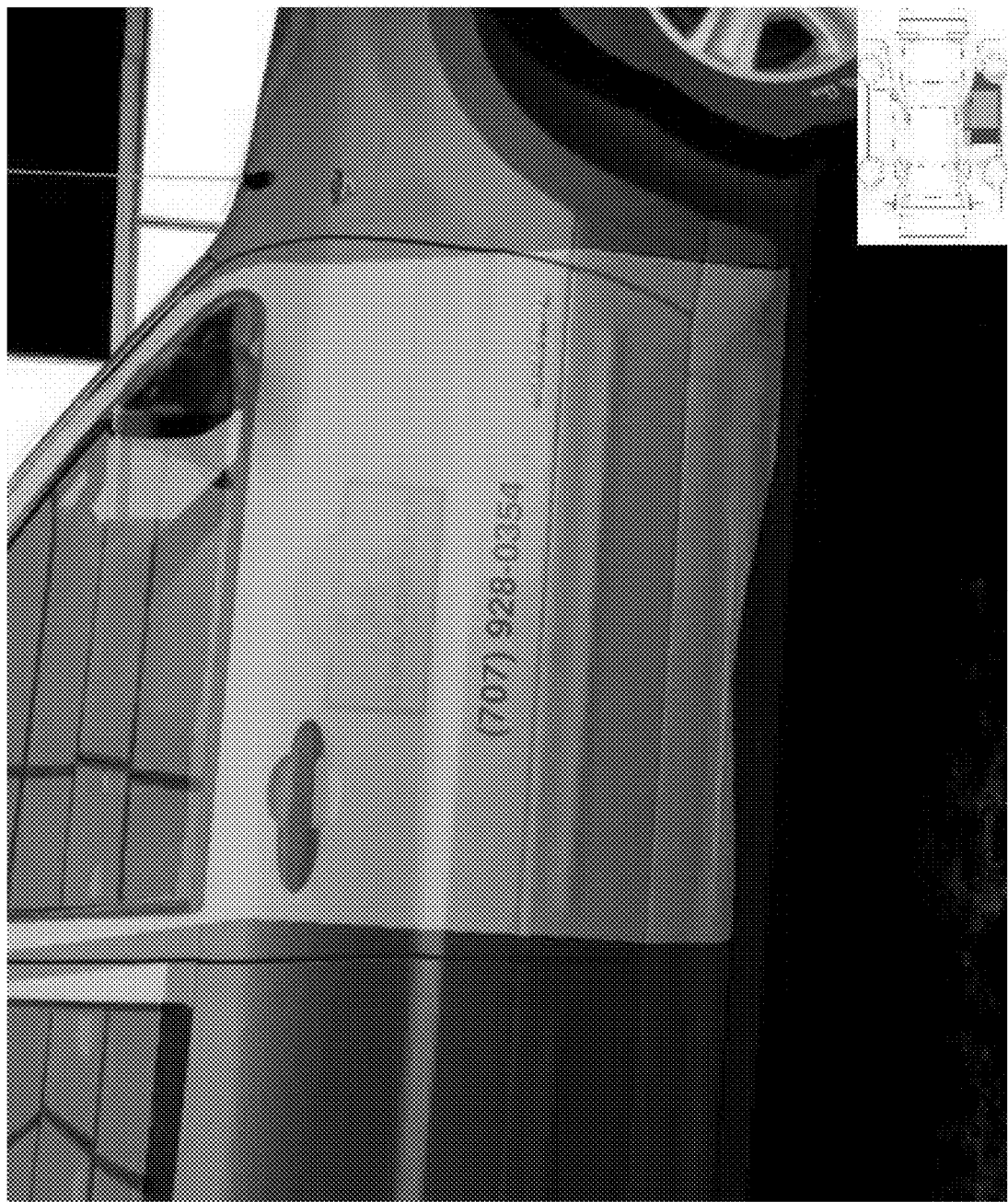
FIGS. 36-41 illustrate examples of a component analysis applied to the semantic mesh, performed in accordance with one or more embodiments.
Figure 37:
Figure 38:
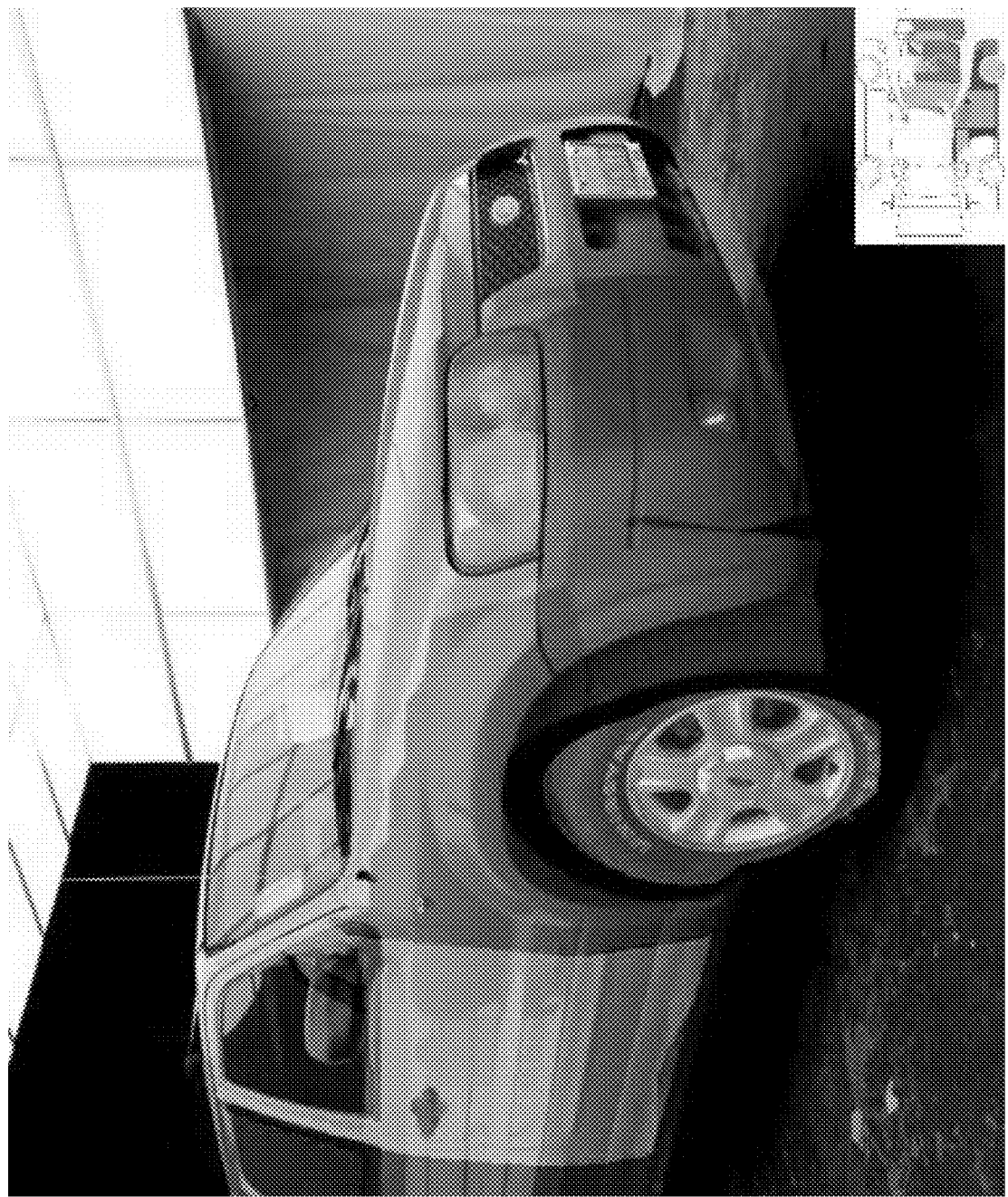
Figure 39:
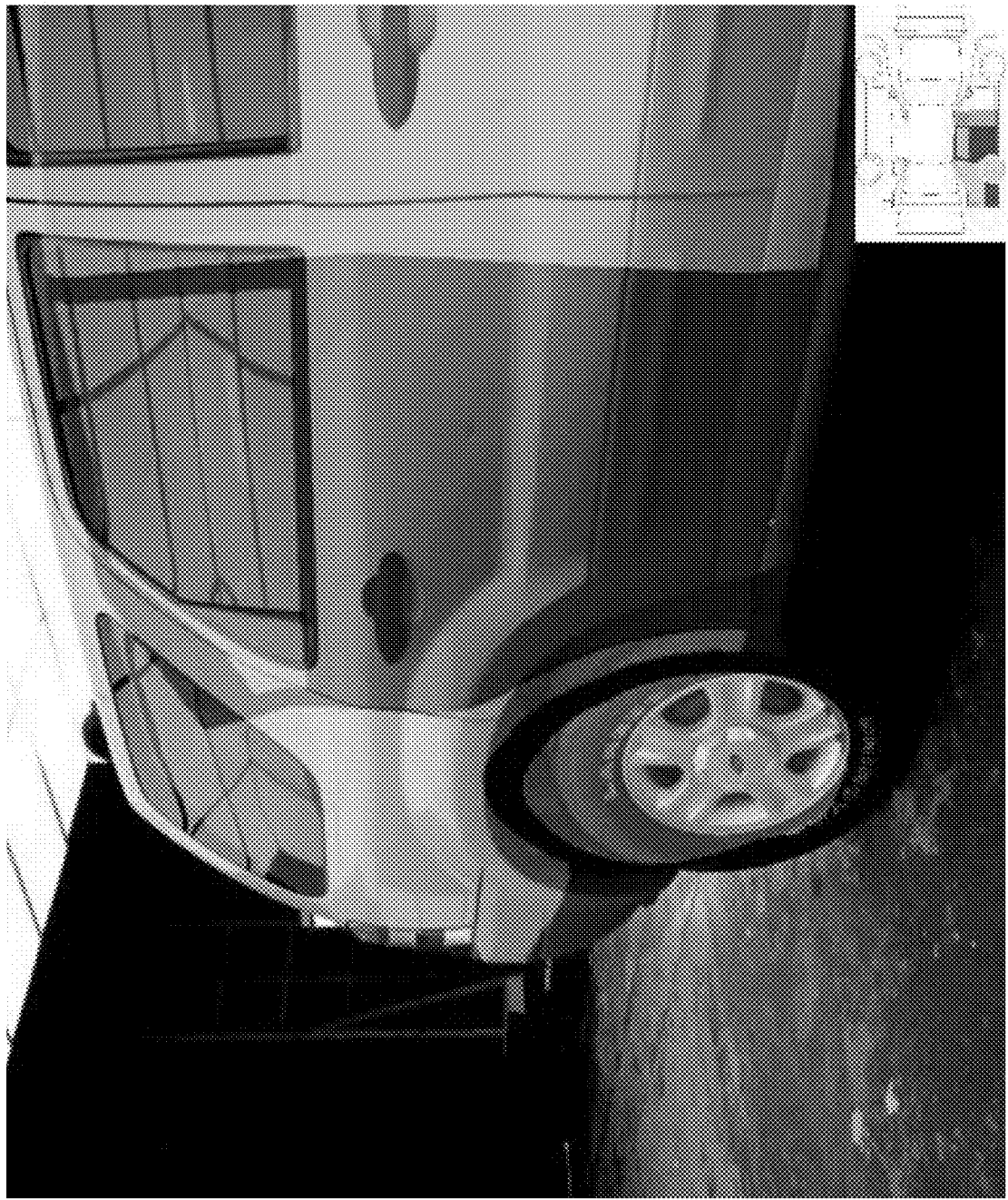
Figure 40:
Figure 41:

FIG. 31 illustrates a method 3100 for localized MVIDMR generation, performed in accordance with one or more embodiments. The method 3100 may be performed at any suitable computing device. For instance, the method 3100 may be performed at a computing device in communication with a mobile phone or a damage detection portal.

A request to generate a localized MVIDMR of an object portion is received at 3102. In some implementations, the request may be generated based on user input. Alternatively, or additionally, a request may be generated automatically. For example, the method 3100 may be performed to generate a localized MVIDMR of an area of an object identified as being damaged. For instance, the method 3000 discussed with respect to FIG. 30 may result in the identification of one or more components of an object that have been damaged. Then, a localized MVIDMR may be automatically generated.

According to various embodiments, the object portion may be identified in any of various ways. For instance, the object portion may be identified as an area or component on an object model associated with the object. The object model could be a two-dimensional top-down view, a three-dimensional skeleton, or any suitable object model.

A set of images that includes the object portion is selected at 3104 based on a mapping from the object model. In some implementations, the images may be collected as the object passes through a damage detection portal. Alternatively, or additionally, one or more images may be captured by a handheld device such as a mobile phone. The images may be mapped to the object model. Then, the correspondence between the images and the object model may be used to determine which images include the identified portion of the object.

One or more of the selected images may be optionally cropped around the object portion at 3106. In some implementations, cropping an image may involve first identifying a portion of the image that corresponds to the identified object component. The identification may involve performing object identification on the identified image. Alternatively, or additionally, the object component mapping may be used to identify the portion of the image that maps to the identified portion of the object.

In particular embodiments, an image may be cropped so that the image is centered around the object portion of interest. Alternatively, or additionally, an image may be cropped so that the object portion of interest occupies the majority of the frame.

One or more synthetic images of the object portion may be optionally generated at 3108. In some implementations, synthetic image generative may involve a light field technique. For instance, each of a plurality of two-dimensional images may be elevated into a respective multi-plane images. The multiplane images around the synthetic viewpoint may be combined to generate a synthetic multiplane image at the synthetic viewpoint. The synthetic multiplane image may then be projected back into a two-dimensional image. A synthetic image may provide for a more seamless transition between frames.

A localized multi-view interactive digital media representation (MVIDMR) is generated at 3110. The localized MVIDMR is then stored at 3112, which may involve storing the localized MVIDMR on a local storage device and/or transmitting the localized MVIDMR to a remote location. According to various embodiments, the MVIDMR may be generated in accordance with techniques and mechanisms throughout the application as filed.

Figure 42:
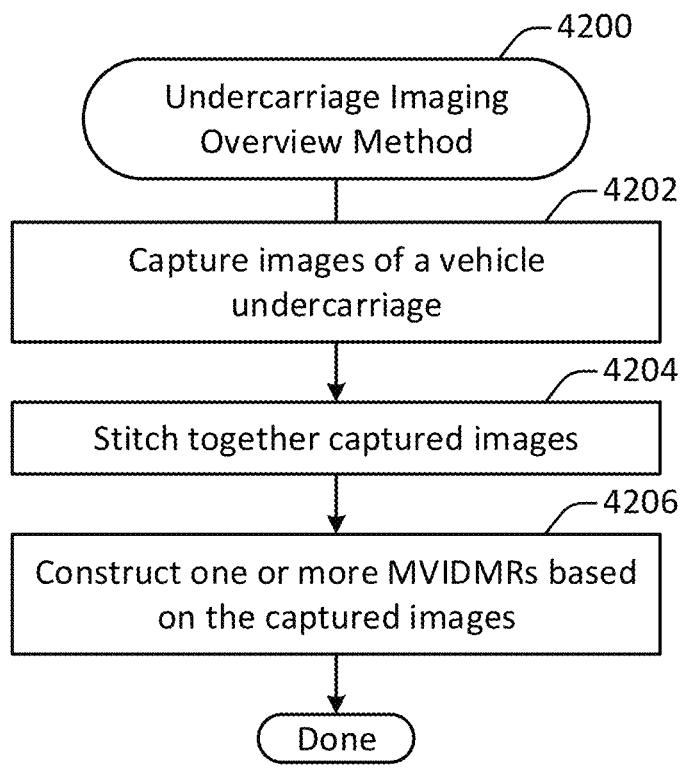
FIG. 42 illustrates an overview method, performed in accordance with one or more embodiments.

FIG. 42 illustrates an overview method 4200, performed in accordance with one or more embodiments. The method 4200 may be performed at a computing device in communication with an undercarriage imaging system. The undercarriage imaging system may be integrated with a damage detection portal.

Images of a vehicle undercarriage are captured at 4202. According to various embodiments, the images may be captured as the vehicle moves over one or more cameras that are arranged beneath the vehicle. For example, the vehicle may be driven over the cameras, or may be moved over the cameras via a belt or other such system. Examples of an undercarriage imaging system are discussed in additional detail with respect to FIG. 43, and throughout the application.

In particular embodiments, the undercarriage imaging system may operate as part of, or in communication with, a vehicle imaging system that may be configured as a gate, tunnel, or gantry. For example, the vehicle imaging system may read a vehicle identifier such as a vehicle identification number (VIN), a license plate number, another type of placard having an identification number and arranged on or in the vehicle (e.g., in the vehicle's windshield area), an RFID tag, or any other suitable mechanism for identifying the vehicle. As another example, the vehicle imaging system may be used to capture vehicle position information, which may be synchronized with undercarriage imaging data captured by the undercarriage imaging system.

In particular embodiments, the undercarriage imaging system may communicate with a communication device such as a tablet, mobile phone, laptop computer, or other such system. For instance, a user may enter a vehicle's identification number on an application running on a mobile phone, which may then communicate with the undercarriage imaging system to capture image data of the vehicle's undercarriage.

Some or all of the captured images are stitched together at 4204. In some implementations, the images may be stitched together in any of various ways. For example, feature points may be identified in successive images and then matched to one another. Then, successive images may be stitched together based on the matching feature points. As another example, images may be used to construct a three-dimensional model such as a point cloud of the vehicle undercarriage. Then, the three-dimensional model may be used to stitch together different images. Examples of techniques for stitching together captured images are discussed in additional detail with respect to the methods 4800 and 4900 shown in FIGS. 48 and 49.

One or more MVIDMRs are constructed based on the images at 4206. According to various embodiments, an MVIDMR may be constructed based on images captured from a single camera. Alternatively, images captured from multiple cameras may be used to construct the MVIDMR. Techniques for constructing MVIDMRs are discussed throughout the application.

According to various embodiments, any of a variety of camera configurations may be possible. In some embodiments, a single camera may be used. Such a camera may be positioned in an upward facing direction. The camera may be equipped with a fisheye lens. Alternatively, or additionally, the camera may be a 360-degree camera, a 180-degree camera, an ultrawide camera, a conventional camera, line-scan camera, conventional camera configured to operate as a line-scan camera, and/or any other suitable image or data capture device.

In some embodiments, multiple cameras may be configured on the ground in a line across which a vehicle travels. Alternatively, multiple cameras may be configured on the ground in a different pattern. For instance, a "+" pattern or a grid pattern may be used. Including cameras in a configuration in which there is variation in two dimensions may help to improve image stitching, particularly for vehicles with relatively uniform undercarriages and few feature points. Hardware and/or software may be used to trigger synchronized camera capture.

In some embodiments, a mirror strip may be used in conjunction with a single camera. In such a configuration, the mirror may be angled so that the undercarriage is imaged in the mirror.

In some embodiments, a mirror strip may be used in conjunction with multiple cameras. In such a configuration, the mirror may be angled so that the undercarriage is imaged in the mirror. Using multiple mirrors may provide for multiple perspective viewpoints of the same portion of the vehicle undercarriage, which may provide for various MVIDMR construction possibilities.

In some embodiments, a mirror and camera configuration may be used in conjunction with one or more additional mirrors not configured to employ the mirror. For example, one or more mirrors may be placed behind or beside the mirror. The additional cameras may be used to perform operations such as stitching together images of the sides of the vehicle not easily visible in the mirror. Alternatively, or additionally, the additional cameras may be used to help with feature point tracking and matching, for instance if the images from the mirror provide insufficient feature points.

In some embodiments, one or more cameras may be used in conjunction with a ramp. For example, multiple cameras may be positioned on the ground pointing upwards as the vehicle travels up and over the ramp.

In some embodiments, one or more line sensors may be used. A line sensor is similar to a scanner technology in which image data is captured by an image sensor in a line configuration.

In some embodiments, one or more laser scanners, time-of-flight sensors, and/or structured light sensors may be used. According to various embodiments, such sensors may help to model the undercarriage in three dimensions, and may be used instead of or in conjunction with one or more traditional cameras.

Figure 43:
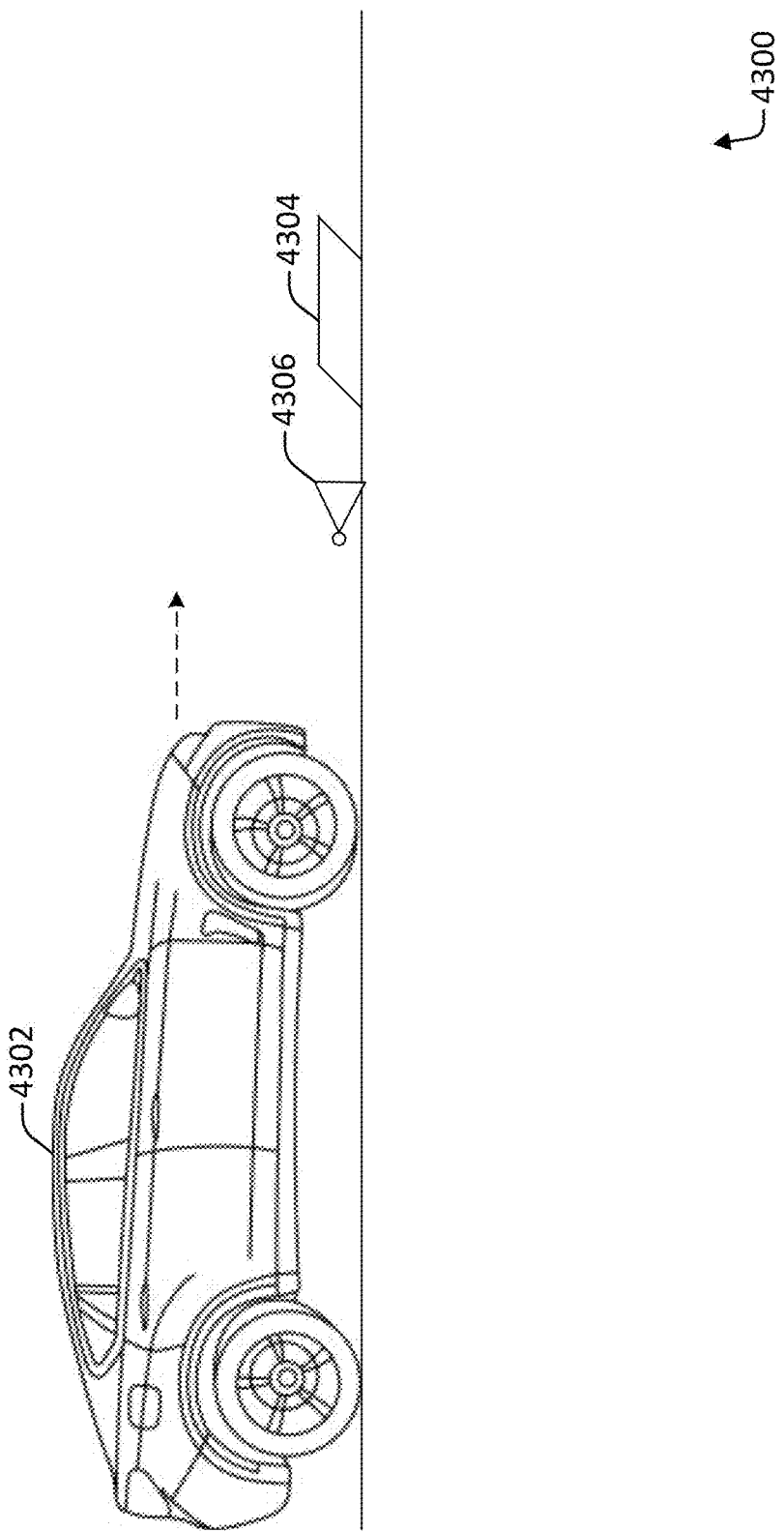
FIG. 43 illustrates an undercarriage imaging system, configured in accordance with one or more embodiments.

FIG. 43 illustrates an undercarriage imaging system 4300, configured in accordance with one or more embodiments. The undercarriage imaging system 4300 may be integrated into a damage detection portal, such as the portals shown in FIGS. 8, 9, and 13. The undercarriage imaging system 4300 includes a vehicle 4302 that travels over a camera 4306 and a mirror 4304.

According to various embodiments, the mirror 4304 may be a rectangular strip having a vertical height lower than the undercarriage. Various configurations may be used. For example, the mirror may be configured to be more narrow than the width of the vehicle wheels so that the vehicle may drive over it. As another example, the mirror may be configured so that it depresses flat if and when the vehicle's wheels pass over it, and then springs back into position after the vehicle's wheel or wheels have moved off of it. As yet another example, the mirror may be configured to include multiple depressible panels so that a portion of the mirror over which a vehicle's wheel passes is depressed while a different portion of the mirror over which the vehicle's wheel does not pass remains in the angular position.

According to various embodiments, one or more cameras may be configured in a fixed or variable orientation. For instance, a fixed orientation of 45 degrees may be used. In this way, the camera 4306 may be configured to capture a relatively vertical image of the undercarriage of the vehicle.

In some implementations, one or more cameras and/or one or more lights may be configured on a convex or concave surface or orientation. For example, convexity or concavity may allow visual angles that would not be accessible on a flat surface or orientation.

In some implementations, the camera 4306 may capture one or more images or image portions of the undercarriage of the vehicle from a relatively vertical angle by reflection on the mirror 4304. Alternatively, or additionally, the camera 4306 may capture one or more images or image portions of the undercarriage of the vehicle from a relatively horizontal angle. For instance, the camera 4306 may directly capture one or more images of the undercarriage of the vehicle 4302 from an oblique or relatively horizontal angle as the vehicle travels over the camera.

Figure 44:
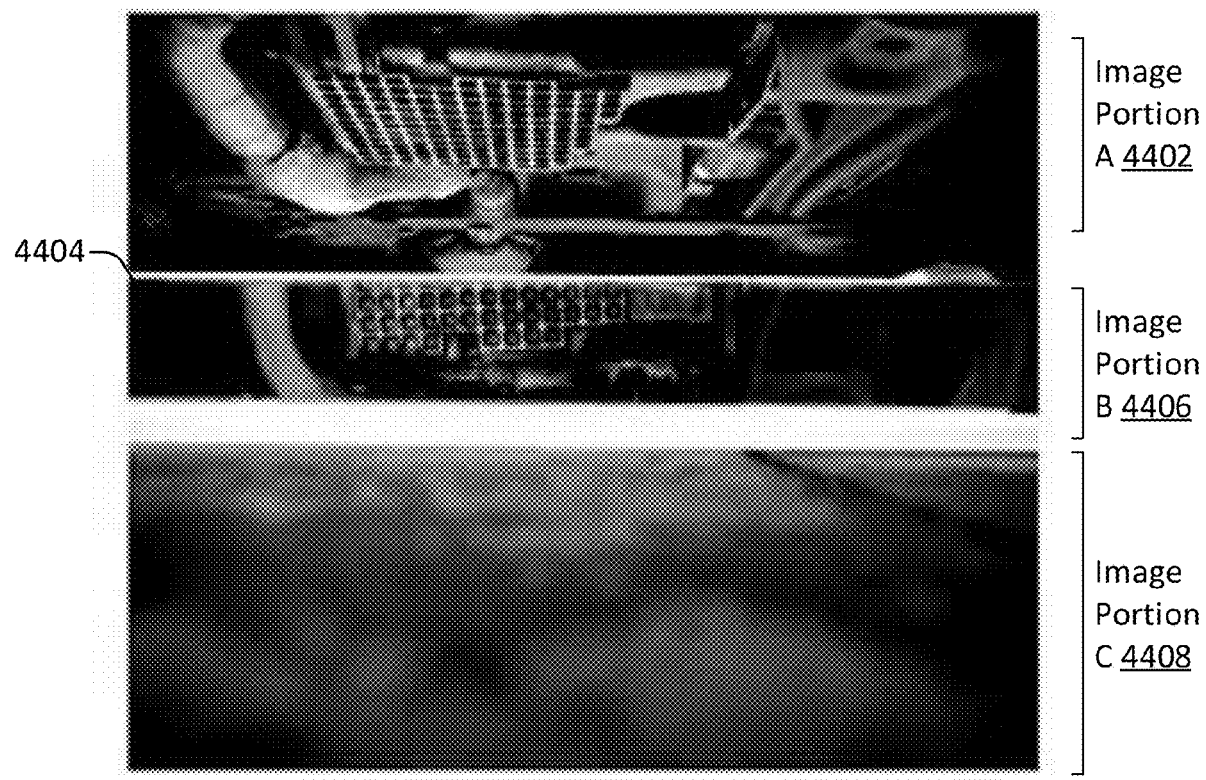
FIG. 44 illustrates an image captured by a single camera in a mirror configuration, generated in accordance with one or more embodiments.

FIG. 44 illustrates an image captured by a single camera in a mirror configuration, generated in accordance with one or more embodiments. Such an image is effectively split into different portions given the field of view captured by the camera. The image portion A 4402 corresponds to the portion of the undercarriage visible in the camera's field of view above the mirror. The top of the mirror is visible at 4404. The image portion B 4406 is the portion of the image that is captured by reflection in the mirror, and illustrates some of the same features shown in the image portion A but from a more vertical angle. The image portion C 4408 corresponds to the ground.

According to various embodiments, as part of the image stitching process, an image such as that shown in FIG. 44 may be cropped to eliminate the image portion C 4408 and to separate the image portion A 4402 from the image portion B 4406. Then, one or both of the separated images may be used to form a stitched image.

Figure 45A:
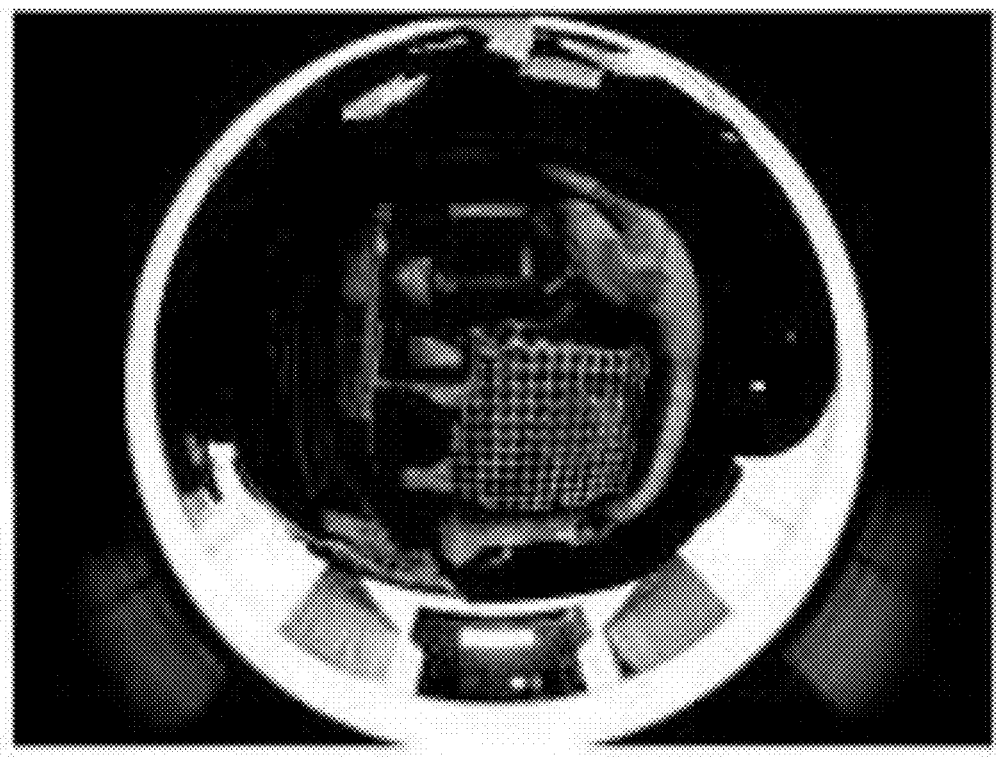
FIGS. 45A and 45B illustrate images generated by an undercarriage imaging system configured in accordance with one or more embodiments.
Figure 45B:
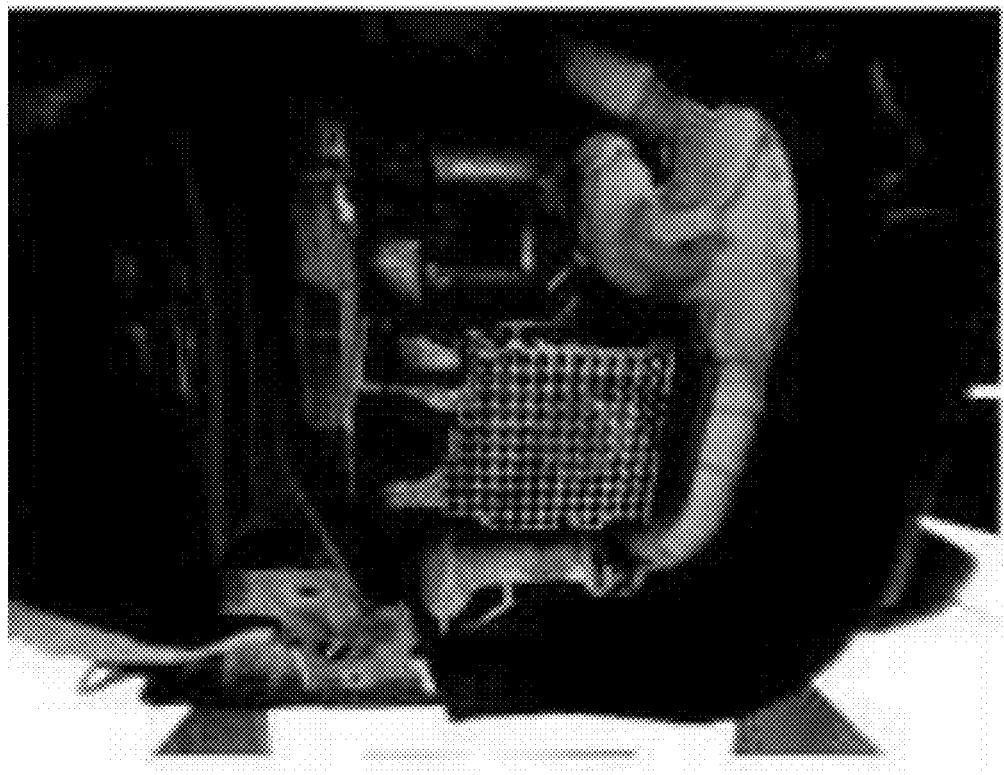

FIGS. 45A and 45B illustrate images generated by an undercarriage imaging system configured in accordance with one or more embodiments. FIG. 45A illustrates a single image of the vehicle undercarriage captured by a camera having a low focal length, which is commonly referred to as a fisheye lens. FIG. 45B illustrates the same image after being transformed from a fisheye perspective to a flat projection perspective.

Figure 46A:
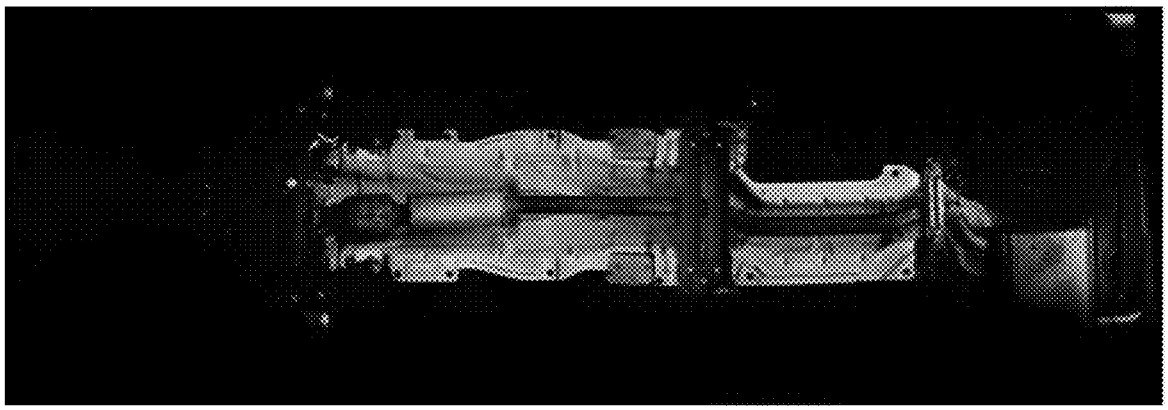
FIGS. 46A, 46B, and 46C illustrate stitched images captured of the undercarriage of a vehicle by undercarriage capture systems configured in accordance with one or more embodiments.
Figure 46B:
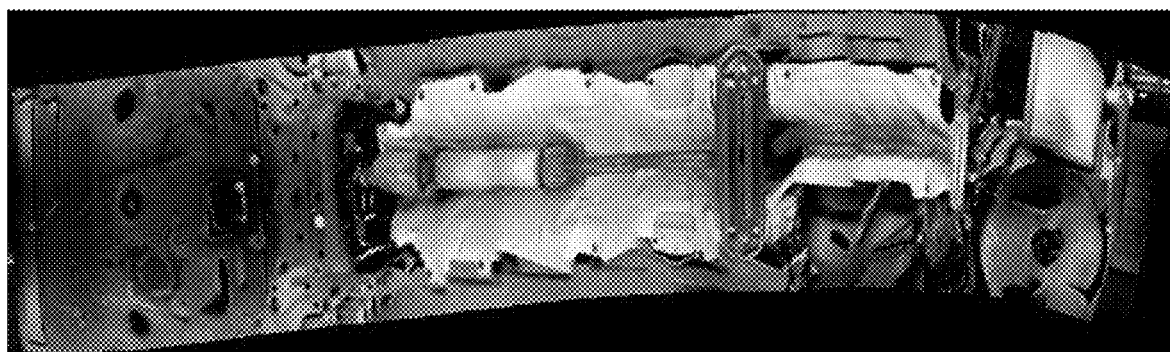
Figure 46C:
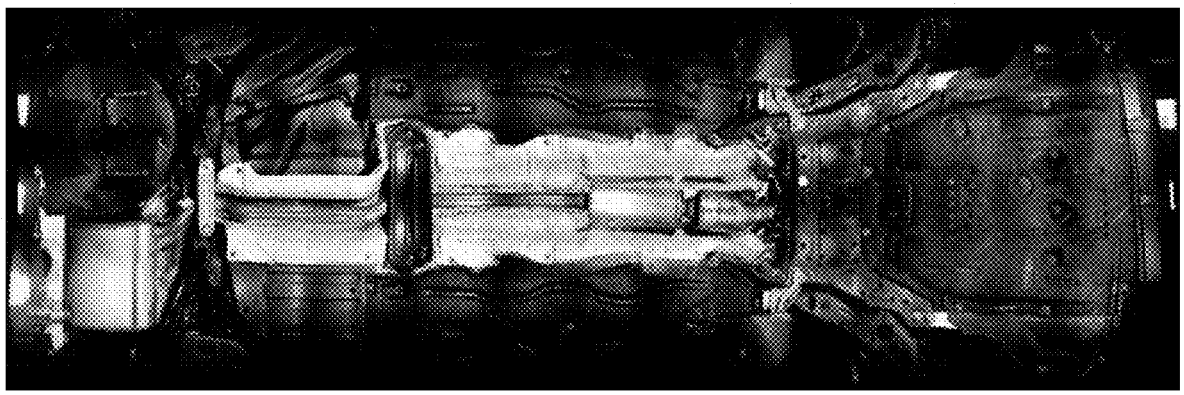

FIGS. 46A, 46B, and 46C illustrate stitched images captured of the undercarriage of a vehicle by undercarriage capture systems configured in accordance with one or more embodiments. FIG. 46A illustrates an undercarriage image stitched from individual images captured in a single camera and mirror configuration. FIG. 46B illustrates an undercarriage image stitched from individual images captured in a single fisheye camera configuration. FIG. 46C illustrates an undercarriage image stitched from individual images captured in a wide-angle camera configuration.

Figure 47A:
FIGS. 47A and 47B illustrate images generated by an undercarriage imaging system configured in accordance with one or more embodiments.
Figure 47B:
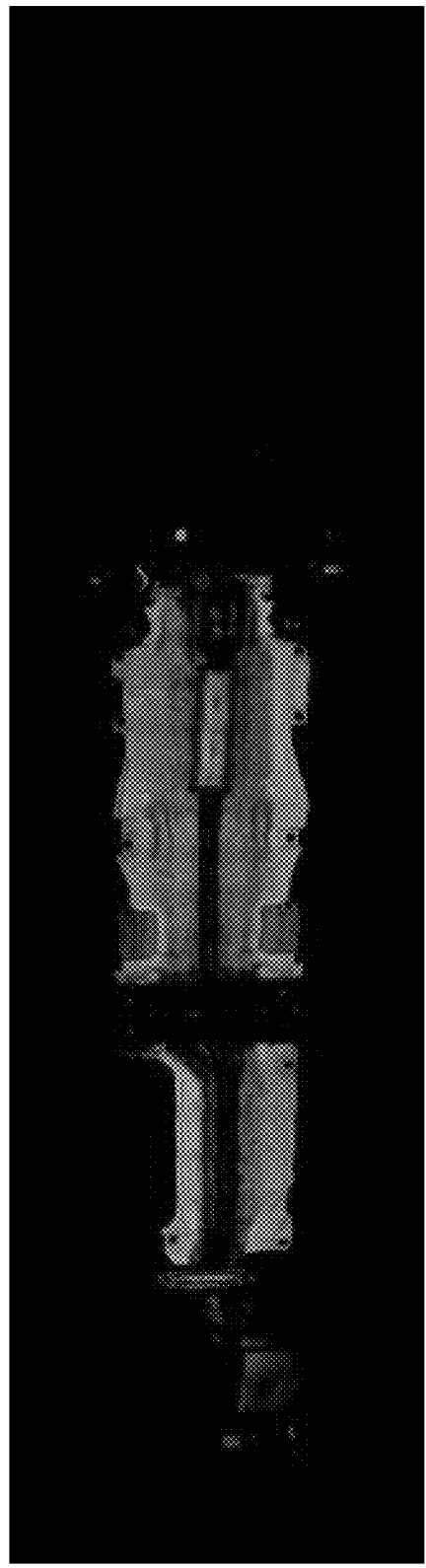

FIGS. 47A and 47B illustrate images generated by an undercarriage imaging system configured in accordance with one or more embodiments. FIG. 47A illustrates a single image of a slide of the vehicle undercarriage captured by a 360-degree camera. FIG. 47B illustrates a stitched image of the entire vehicle undercarriage constructed by stitching together a sequence of images captured by the 360-degree camera.

According to various embodiments, an undercarriage capture system may include various types and combinations of sensors. In a first example, two or more cameras may be directed at a mirror, as discussed with respect to FIG. 43. Such cameras may be arranged in parallel. An example of such a configuration is shown in FIG. 55A, which the cameras 5502, 5504, and 5506 are arranged in parallel and directed at the mirror 5508. Alternatively, or additionally, two or more cameras may be arranged at different angles, for instance to capture the same portion of the undercarriage from different perspectives. An example of such a configuration is shown in FIG. 55A, which the cameras 5512, 5514, and 5516 are arranged at different angles and directed at the mirror 5518.

In a second example, one or more camera equipped with a fish-eye lens may be used to detect vehicle motion, while one or more line cameras may be used to capture data for constructing a stitched image.

In a third example, one or more cameras may be configured to capture thermal images. Then, image data from the thermal image may be presented together with or separate from visual-spectrum image data. For instance, thermal image data may be presented as an overlay (e.g., a heatmap) on top of visual-spectrum image data.

In a fourth example, one or more cameras may be arranged in a portable configuration. For instance, one or more cameras may be arranged on a fold-out panel that can be arranged on a roadway.

In a fifth example, one or more lighting sources such as LED-driven panels may be employed. Such an arrange may provide for lower exposure times for image acquisition.

According to various embodiments, any or all of the example configurations described herein may be employed in various arrangements or combinations.

Figure 48:
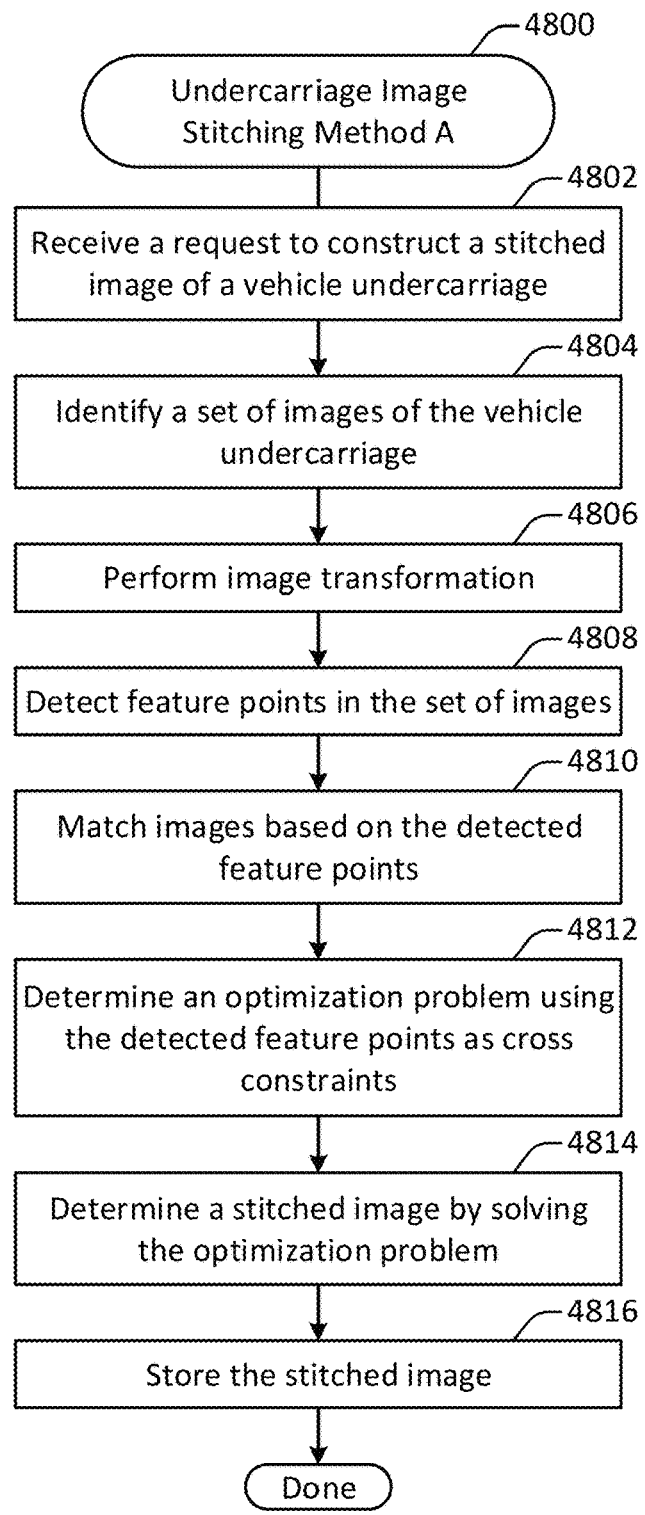
FIG. 48 illustrates a method A for stitching an undercarriage image, performed in accordance with one or more embodiments.

FIG. 48 illustrates a method A 4800 for stitching an undercarriage image, performed in accordance with one or more embodiments. The method 4800 may be performed at a computing device in communication with an undercarriage imaging system.

A request to construct a stitched image of a vehicle undercarriage is received at 4802. According to various embodiments, the request may be generated manually based on user input. Alternatively, the request may be generated automatically, for instance after a vehicle traverses an undercarriage imaging system.

A set of images of the vehicle undercarriage is identified at 4804. According to various embodiments, the set of images may be captured by one or more cameras configured as discussed herein. The images may be captured as the vehicle passes over the one or more cameras.

In particular embodiments, two or more of the images may be captured in a time-synchronized fashion. For instance, different cameras arranged in a known configuration may be configured to capture images at specific times. For example, images may be captured by multiple cameras at the same time. As another example, images may be captured by multiple cameras at a designated temporal offset.

One or more image transformations are optionally performed at 4806. According to various embodiments, any of a variety of suitable image transformations may be performed. For example, in the case of a fisheye lens, the image may be transformed via a fisheye projection from a wide panoramic or hemispherical image to a rectilinear image.

Feature points in the set of images are detected at 4808. According to various embodiments, feature points may be detected by analyzing each image to identify recognizable points. For example, feature points may include lines, edges, points, corners, or other geometric figures. As another example, feature points may include words, color regions, or other visual elements. As yet another example, feature points may include pipes, cables, structures, or other recognizable physical components.

Images are matched based on the detected feature points at 4810. In some implementations, image matching may include linking feature points in different images. For instance, a word, edge, corner, or cable in one image may be linked to the corresponding word, edge, corner, or cable in another image. The linkable of multiple feature points across two images may provide for the creation of a transformation for stitching together the two images.

An optimization problem using the detected feature points as cross constraints is determined at 4812. A stitched image is determined by solving the optimization problem at 4814. According to various embodiments, the solution to the optimization problem may include one or more transformations for linking images. For instance, images may be translated, expanded, shrunk, sheared, or otherwise transformed so that the feature points of the different images align.

Figure 53:
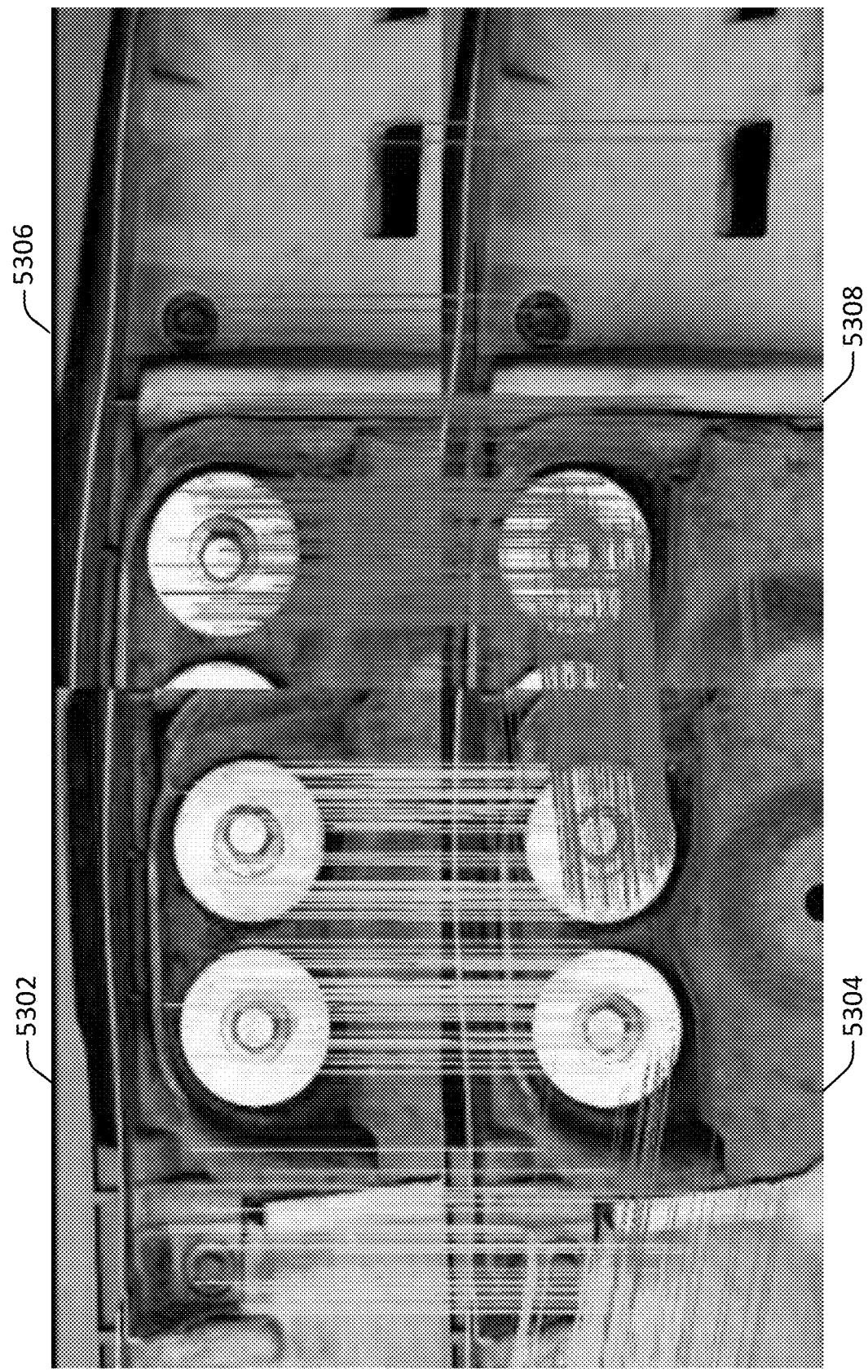
FIG. 53 shows the determination of a correspondence between images captured by the undercarriage system in accordance with one or more embodiments.

As an example, FIG. 53 shows the determination of a correspondence between images captured by the undercarriage system in accordance with one or more embodiments. In FIG. 53, the images 5302 and 5304 are captured by a first camera, while the images 5306 and 5308 are captured by a second camera, as a vehicle moves over the cameras. Colored lines indicate correspondences between tracking points in the image. The average of the correspondences may allow the creation of a transformation for linking the images. For instance, a transformation may be determined based on factors such as confidence in the detected features and matches and/or a cost function associated with one or more parameters such as image differences and/or reprojection errors.

The stitched image is stored at 4816. According to various embodiments, stitched images may be stored on a local storage device. Alternatively, or additionally, stitched images may be transmitted to a remote machine via a network.

In particular embodiments, one or more operations shown in FIG. 48 may be omitted. For instance, instead of detecting feature points and matching images at operation 4808, a transformation may be determined between neighboring images by analyzing the absolute difference between the successive images.

Figure 49:
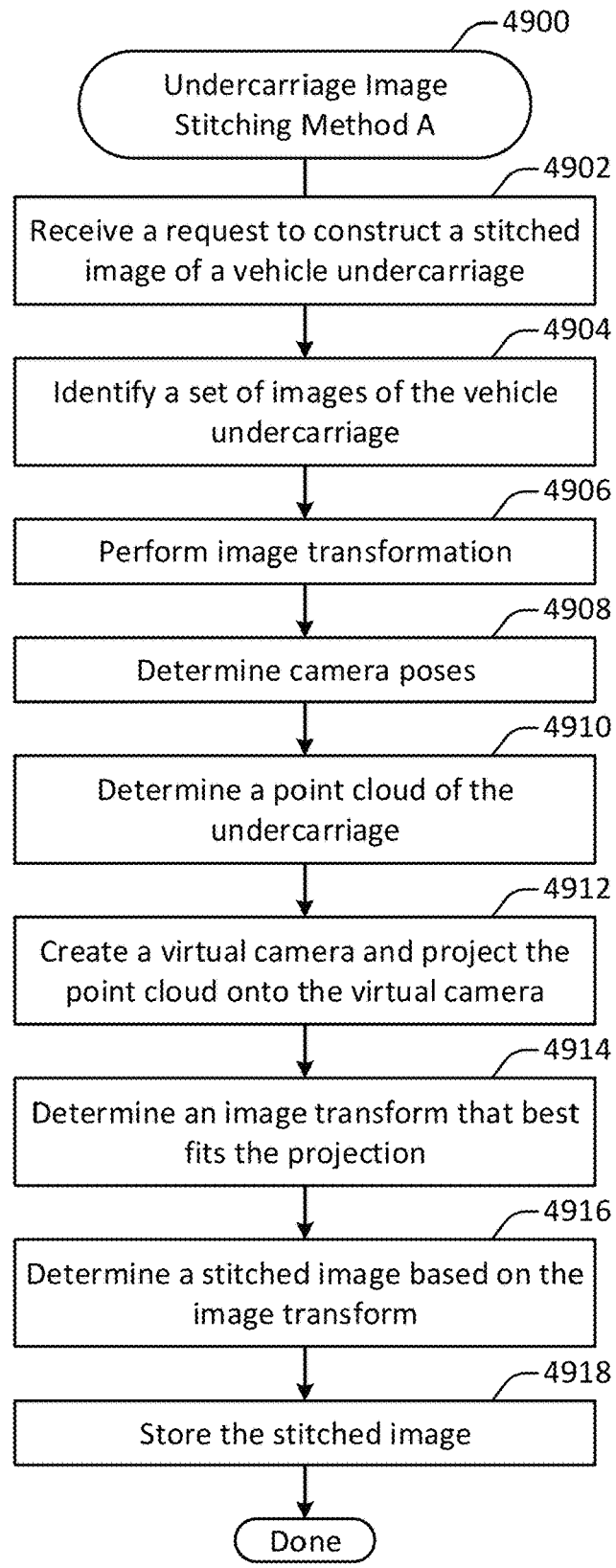
FIG. 49 illustrates a method B for stitching an undercarriage image, performed in accordance with one or more embodiments.

FIG. 49 illustrates a method B 4900 for stitching an undercarriage image, performed in accordance with one or more embodiments. The method 4900 may be performed at a computing device in communication with an undercarriage imaging system.

A request to construct a stitched image of the vehicle undercarriage is received at 4902. A set of images of the vehicle undercarriage is identified at 4904. One or more image transformations are performed at 4906. According to various embodiments, the operations 4902-4906 may be substantially similar to the operations 4802-4806 discussed with respect to the method 4800 shown in FIG. 48.

One or more camera poses are determined at 4908. In some implementations, the pose of a camera may include information such as the distance from the camera to the undercarriage and the angular position of the camera with respect to the undercarriage.

In some embodiments, a camera pose may be determined in two dimensions. For example, when a camera is positioned at a fixed location and calibrated, the pose of the camera relative to the vehicle may need to be determined only in x and y dimensions, since the camera's orientation may be known. A two-dimensional camera pose may be supplemented with a distance measure z between the camera and the vehicle to provide a three-dimensional camera pose.

In some embodiments, a camera pose may be determined in up to six dimensions. For example, the camera's location relative to the vehicle may be specified in three dimensions, while the camera's orientation may be specified in another three dimensions (e.g., roll, pitch, and yaw). Such an arrangement may be particularly useful in, for instance, a mobile configuration in which camera calibration may be difficult.

According to various embodiments, a camera pose may be determined via any of various techniques. For example, one or more cameras may be calibrated so that a pose is known in advance. As another example, the pose for a camera may be determined by analyzing image data to determine a position and angle of the camera with respect to the vehicle undercarriage. As yet another example, calibration data may be used in combination with image data to determine a pose for a camera.

In particular embodiments, the angular position of a camera may be known based on calibration data. The distance from the camera to the undercarriage may then be determined. For instance, the distance may be determined by analyzing image data and/or data from a distance sensor such as a time-of-flight sensor.

A point cloud of the undercarriage is determined at 4910. In some implementations, a point cloud may be determined by identifying undercarriage features in an image, as discussed with respect to the identification of feature points in operation 4808. Then, the features may be positioned in three-dimensional space. For example, depth sensor information may be used to determine an approximate distance from the camera for each feature. As another example, image data may be analyzed to estimate depth information.

In particular embodiments, one or more of various types of depth sensors may be used. For instance, a depth sensor may be implemented as a time-of-flight and/or structured light sensor.

According to various embodiments, a point cloud may be determined separately for individual images or groups of images. Then, the different point clouds may be merged, for instance by linking features identified in each image, as discussed with respect to the operations 4810-4814 in FIG. 48.

A virtual camera is created at 4912, and the point cloud is projected onto the virtual camera. The virtual camera may be represented by a point in space from which the image is taken. Alternatively, the virtual camera may be represented by a virtual image plane. For instance, the point cloud may be projected onto a two-dimensional plane, which may be used as a canvas for creating the image.

An image transform that best fits the projection is determined at 4914. A stitched image is determined at 4916 based on the identified transform. According to various embodiments, the transform may be selected so as to match image features corresponding to points in the point cloud as positioned in accordance with the projection determined at 4912.

According to various embodiments, information captured by sensors is frequently referred to herein as images or image data. However, it should be noted that a wide variety of information may be captured by sensors. For instance, the captured information may include distance or depth information captured by LIDAR or other types of sensors. When such information is captured, it may be used to construct and/or merge point clouds.

According to various embodiments, the capture of image data may be aided by lights. Lights used in conjunction with an undercarriage imaging system may include LEDs, tube lights, flat sheet lights, or other suitable lighting. Lights may be used in conjunction with reflectors, mirrors, or other such devices to shape the light intensity.

The stitched image is stored at 4916. According to various embodiments, stitched images may be stored on a local storage device. Alternatively, or additionally, stitched images may be transmitted to a remote machine via a network.

Figure 50:
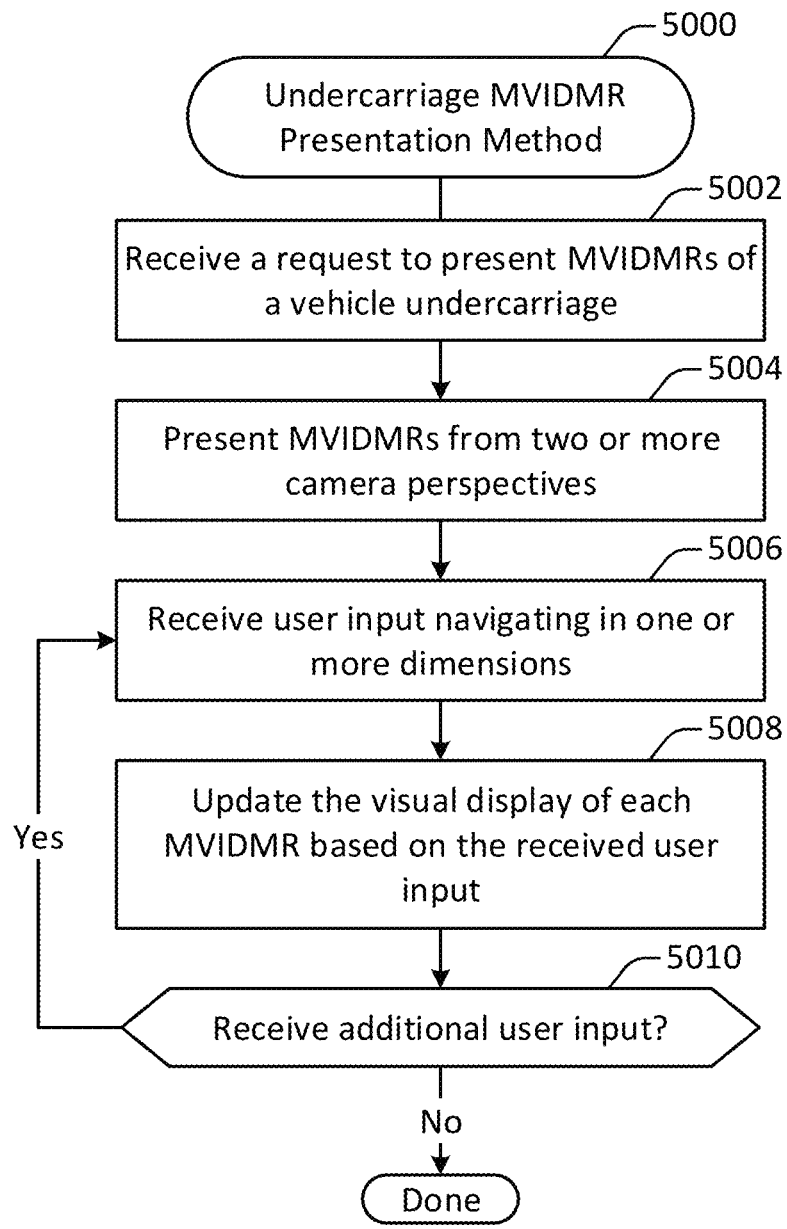
FIG. 50 illustrates a method performed in accordance with one or more embodiments.

FIG. 50 illustrates a method 5000 performed in accordance with one or more embodiments. According to various embodiments, the method 5000 may be performed on a computing device having a display screen and a user input mechanism. For instance, the method 5000 may be performed on a laptop computer, a desktop computer, or a mobile phone.

A request to present MVIDMRs of a vehicle undercarriage is received at 5002. In some implementations, the request may be generated as part of a request to load a user interface for accessing visual data associated with a vehicle. For instance, the request may be generated in a native application or on a web browser loading a web page.

MVIDMRs from two or more camera perspectives are presented at 5004. In some embodiments, each MVIDMR may include multiple perspectives of the vehicle undercarriage. In some MVIDMRs, each image may be captured from the same camera. Alternatively, a single MVIDMR may include images captured by different cameras. For instance, images from a row or column of cameras may be stitched together, and the stitched images used to create an MVIDMR.

Figure 51:
FIGS. 51 and 52 show examples of presenting multiple MVIDMRs, provided in accordance with one or more embodiments.
Figure 52:
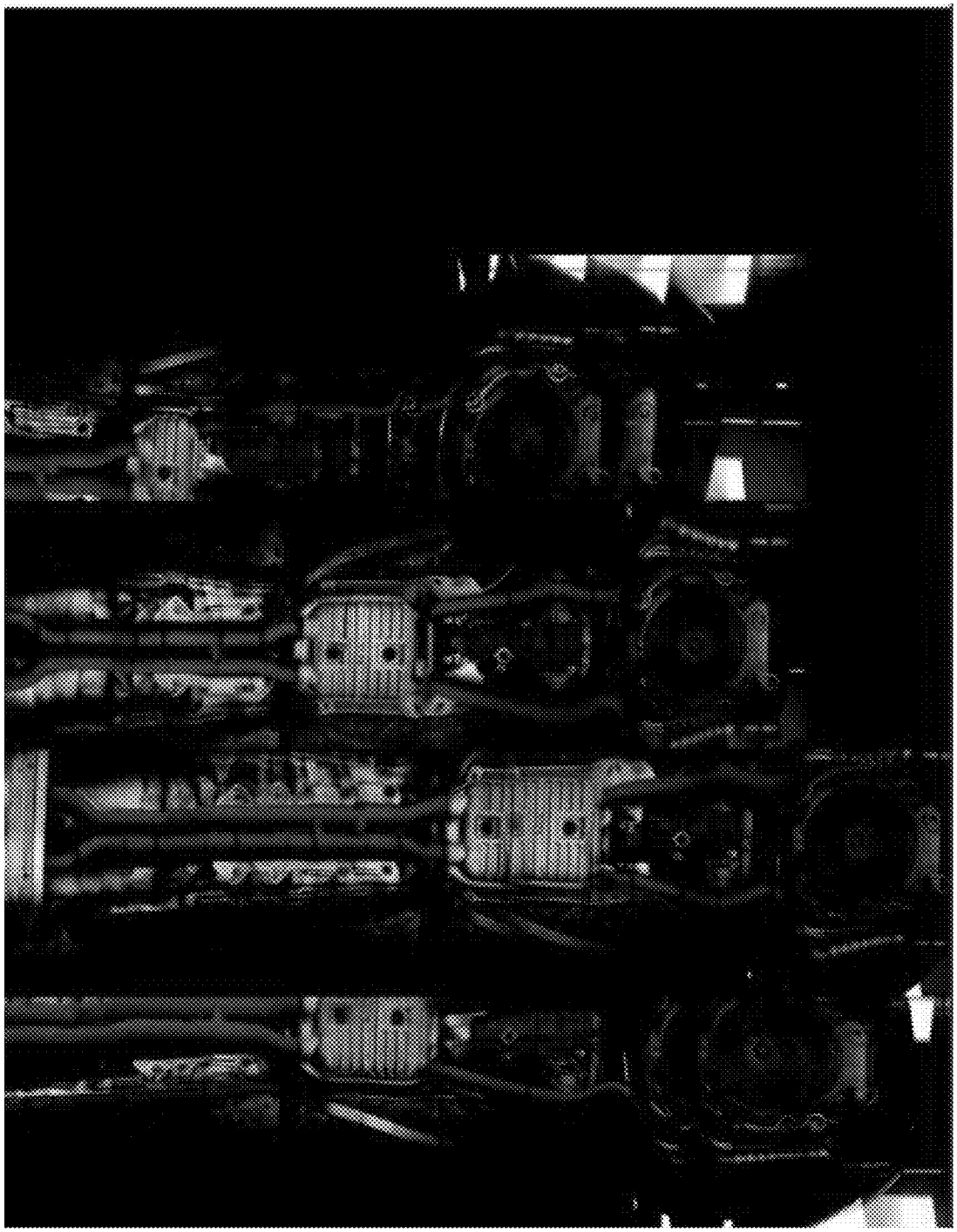

FIGS. 51 and 52 show examples of presenting multiple MVIDMRs, provided in accordance with one or more embodiments. In FIGS. 51 and 52, four different MVIDMRs of a vehicle undercarriage are presented, each being captured from a different camera. In this way, the same portion of the undercarriage can be viewed from different angles. Because the undercarriage is three-dimensional, presenting the undercarriage from different perspectives allows seeing portions of the undercarriage from one perspective that are occluded by an obstruction in another perspective.

Figure 54:
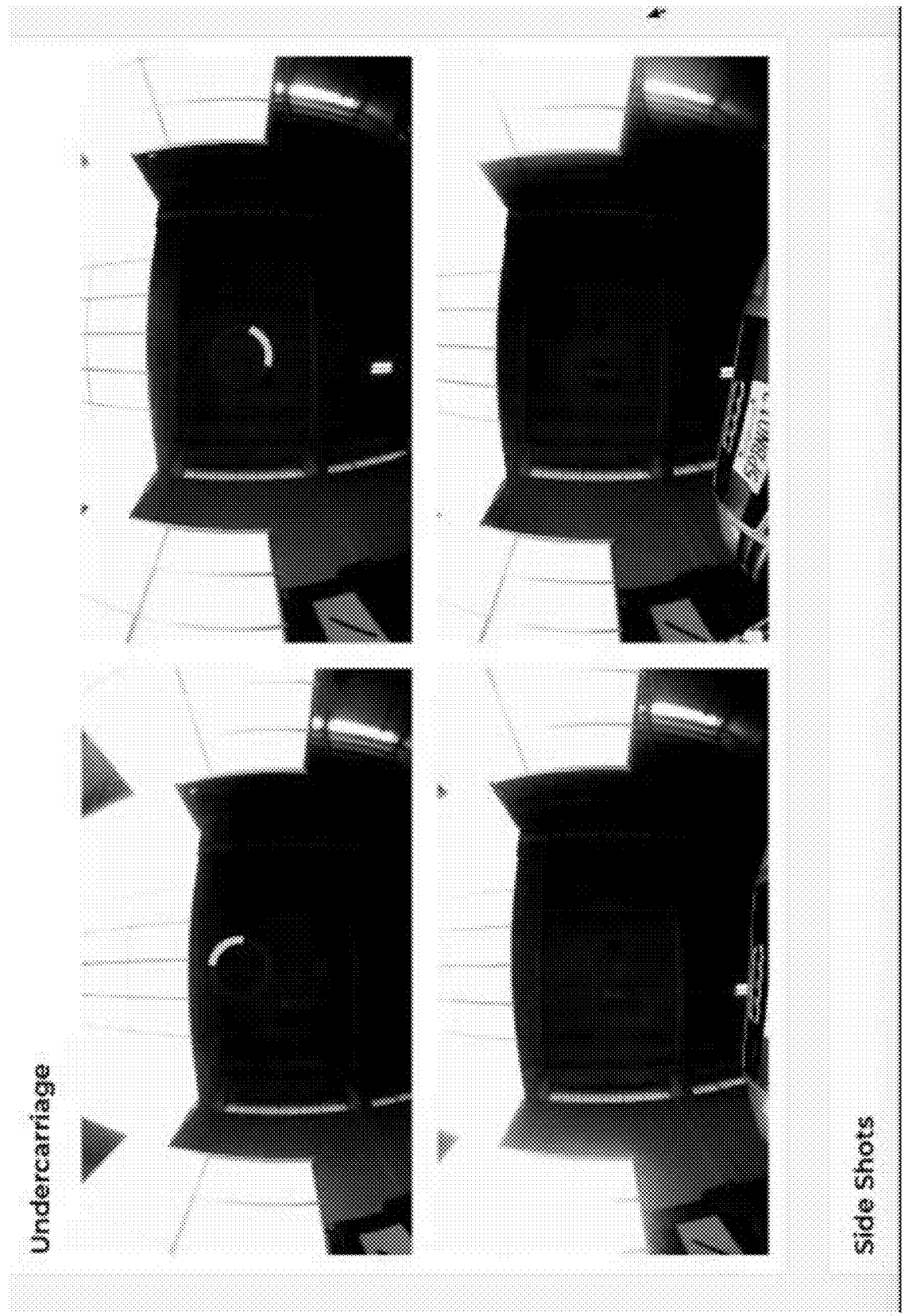
FIG. 54 shows another example of presenting multiple MVIDMRs in accordance with one or more embodiments.

FIG. 54 shows another example of presenting multiple MVIDMRs. In FIG. 54, four different MVIDMRs are presented, initially presented in a state just prior to a vehicle driving over the cameras.

According to various embodiments, MVIDMRs captured from different perspectives may be presented in a single view. In this way, user input may be employed to allow navigation of the MVIDMR in two or more dimensions. In a first dimension, the MVIDMR perspective may be shifted front-to-back and back-to-front to reflect the passage of the vehicle over the cameras. In a second dimension, the MVIDMR perspective may be shifted left-to-right and right-to-left to view image data captured from different cameras arranged across the vehicle undercarriage. In a third dimension, the MVIDMR perspective may be zoomed in or out. In particular embodiments, navigating an undercarriage MVIDMR in two or more dimensions may allow a user to zoom in, zoom out, look at, and/or look behind components that are included in a vehicle's undercarriage.

User input navigating in one or more dimensions is received at 5006. According to various embodiments, the user input may be provided via any of a variety of suitable user input devices. For example, on a mobile phone or tablet computer the user input may include swiping in a designated direction with a finger on a touch screen. As another example, on a desktop or laptop computer the user input may include dragging with a mouse cursor.

The visual display of each MVIDMR is updated at 5008 based on the received user input. According to various embodiments, the visual display may be updated by moving each MVIDMR to a different image. For instance, dragging a mouse cursor downward may cause the vehicle's undercarriage to appear to move up the display screen. That is, the vehicle would appear to be traveling in a forward direction in the image sequence. In contrast, dragging the mouse cursor upward may cause the vehicle's undercarriage to appear to move down the display screen. That is, the vehicle would appear to be moving in reverse.

A determination is made at 5010 as to whether to receive additional user input. According to various embodiments, additional user input may continue to be received so long as the MVIDMRs are being presented. For instance, additional user input may continue to be received so long as the web browser or native application in which the MVIDMRs are displayed continue to be open.

The invention claimed is:

1. A method comprising:
   capturing a plurality of images of an undercarriage of a vehicle, the images captured via one or more cameras, each camera being arranged in a respective fixed position, the images being captured as the vehicle moves over the one or more cameras;
   determining a designated point cloud based on the plurality of images via a processor, the designated point cloud including a plurality of points positioned in a virtual three-dimensional space;
   determining a designated stitched image based on the designated point cloud via the processor, wherein the stitched image is determined by projecting the designated point cloud onto a virtual camera view, wherein determining the stitched image comprises identifying a plurality of correspondence points, each of the correspondence points indicating a visual feature included in two or more of the plurality of images, wherein determining the stitched image further comprises identifying a plurality of point correspondence transformations, each of the point correspondence transformations identifying a respective spatial relationship between a first location of a designated one of the correspondence points in a first one of the images and a second location of the designated correspondence point in a second one of the images; and
   storing the designated stitched image on a storage device.

2. The method recited in claim 1, wherein the virtual camera view is a two-dimensional plane in the virtual three-dimensional space.

3. The method recited in claim 1, wherein the virtual camera view is a point in the virtual three-dimensional space.

4. The method recited in claim 1, wherein determining the designated point cloud comprises determining a plurality of point clouds.

5. The method recited in claim 4, wherein the one or more cameras includes a plurality of cameras, and wherein each of the point clouds corresponds with a respective one of the cameras.

6. The method recited in claim 4, wherein each of the point clouds corresponds with a respective one of the images.

7. The method recited in claim 1, wherein the designated point cloud is determined based at least in part on depth information captured from one or more depth sensors.

8. The method recited in claim 1, wherein determining the stitched image further comprises determining an image correspondence providing a mathematical transformation between the first and second images in a two or three dimensional coordinate space based on the plurality of correspondence transformations.

9. The method recited in claim 8, wherein the image correspondence is a numerical average of one or more of the point correspondence transformations, the numerical average determined based on a cost function.

10. The method recited in claim 1, wherein the designated stitched image is one of a plurality of stitched images determined based on the designated point cloud.

11. The method recited in claim 1, the method further comprising generating a multi-view interactive digital media representation that includes the plurality of stitched images, the multi-view interactive digital media representation being navigable in one or more dimensions.

12. The method recited in claim 11, wherein the multi-view interactive digital media representation being navigable in three dimensions.

13. A system comprising:
   one or more cameras configured to capture a plurality of images of an undercarriage of a vehicle, each camera being arranged in a respective fixed position, the images being captured as the vehicle moves over the one or more cameras;
   a processor configured to determine a designated point cloud based on the plurality of images and determine a designated stitched image based on the designated point cloud, the designated point cloud including a plurality of points positioned in a virtual three-dimensional space, wherein the stitched image is determined by projecting the designated point cloud onto a virtual camera view, wherein determining the stitched image comprises identifying a plurality of correspondence points, each of the correspondence points indicating a visual feature included in two or more of the plurality of images, wherein determining the stitched image further comprises identifying a plurality of point correspondence transformations, each of the point correspondence transformations identifying a respective spatial relationship between a first location of a designated one of the correspondence points in a first one of the images and a second location of the designated correspondence point in a second one of the images; and
   a storage device configured to store the designated stitched image.

14. The system recited in claim 13, wherein determining the stitched image further comprises determining an image correspondence providing a mathematical transformation between the first and second images in a two or three dimensional coordinate space based on the plurality of correspondence transformations, and wherein the image correspondence is a numerical average of one or more of the point correspondence transformations, the numerical average determined based on a cost function.

15. The system recited in claim 13, wherein the processor is further operable to generate a multi-view interactive digital media representation that includes the plurality of stitched images, the multi-view interactive digital media representation being navigable in one or more dimensions.

16. The system recited in claim 13, wherein determining the designated point cloud comprises determining a plurality of point clouds, and wherein the one or more cameras includes a plurality of cameras, and wherein each of the point clouds corresponds with a respective one of the cameras.

17. The method recited in claim 1, wherein the virtual camera view is a two-dimensional plane of a point in the virtual three-dimensional space.

18. One or more non-transitory computer readable media having instructions stored thereon for performing a method, the method comprising:

capturing a plurality of images of an undercarriage of a vehicle, the images captured via one or more cameras, each camera being arranged in a respective fixed position, the images being captured as the vehicle moves over the one or more cameras;

determining a designated point cloud based on the plurality of images via a processor, the designated point cloud including a plurality of points positioned in a virtual three-dimensional space;

determining a designated stitched image based on the designated point cloud via the processor, wherein the stitched image is determined by projecting the designated point cloud onto a virtual camera view, wherein determining the stitched image comprises identifying a plurality of correspondence points, each of the correspondence points indicating a visual feature included in two or more of the plurality of images, wherein determining the stitched image further comprises identifying a plurality of point correspondence transformations, each of the point correspondence transformations identifying a respective spatial relationship between a first location of a designated one of the correspondence points in a first one of the images and a second location of the designated correspondence point in a second one of the images; and storing the designated stitched image on a storage device.

* * * * *

UNITED STATES PATENT AND TRADEMARK OFFICE
CERTIFICATE OF CORRECTION

| | | |
|---|---|---|
| PATENT NO. | : 11,605,151 B2 | Page 1 of 1 |
| APPLICATION NO. | : 17/190268 | |
| DATED | : March 14, 2023 | |
| INVENTOR(S) | : Holzer et al. | |

It is certified that error appears in the above-identified patent and that said Letters Patent is hereby corrected as shown below:

On the Title Page

Item (72) remove the inventor:
Blake McConnell, San Francisco, CA (US)

Signed and Sealed this
Eighth Day of August, 2023

*Katherine Kelly Vidal*

Katherine Kelly Vidal
*Director of the United States Patent and Trademark Office*